US008380782B2

(12) United States Patent
Kakuta et al.

(10) Patent No.: US 8,380,782 B2
(45) Date of Patent: Feb. 19, 2013

(54) APPARATUS FOR COMMUNICATING PRESENCE INFORMATION

(75) Inventors: Jun Kakuta, Kawasaki (JP); Masahiko Murakami, Kawasaki (JP); Kazuki Matsui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 340 days.

(21) Appl. No.: 12/336,032

(22) Filed: Dec. 16, 2008

(65) Prior Publication Data

US 2009/0157861 A1    Jun. 18, 2009

(30) Foreign Application Priority Data

Dec. 17, 2007 (JP) ................................ 2007-325217

(51) Int. Cl.
*G06F 15/16* (2006.01)
*G06F 15/173* (2006.01)
*H04W 24/00* (2009.01)
(52) U.S. Cl. .............. 709/201; 709/223; 455/456.1
(58) Field of Classification Search .......... 709/201, 709/203, 456.1
See application file for complete search history.

(56) References Cited

U.S. PATENT DOCUMENTS

| | | | | |
|---|---|---|---|---|
| 7,536,437 B2 * | 5/2009 | Zmolek | .......... | 709/206 |
| 7,720,952 B2 * | 5/2010 | Miyata et al. | .......... | 709/223 |
| 2008/0108372 A1 * | 5/2008 | Breed | .......... | 455/456.1 |
| 2009/0005061 A1 * | 1/2009 | Ward et al. | .......... | 455/456.1 |

FOREIGN PATENT DOCUMENTS

| | | |
|---|---|---|
| JP | 2004-240624 A | 8/2004 |
| JP | 2006-209193 A | 8/2006 |
| JP | 2006-209193 A | 8/2006 |
| JP | 2007-150442 A | 6/2007 |

OTHER PUBLICATIONS

Fujitsu, "Fujitsu, Start of Sale of Software Flairinc Which Realizes Push-Type Information Delivery Corresponding to Situation of User", Dec. 2, 2002, Partial English translation.
Japanese Office Action mailed Jan. 31, 2012 for corresponding Japanese Application No. 2007-325217, with Partial English-language Translation.
Japanese Office Action mailed Oct. 2, 2012 for corresponding Japanese Application No. 2007-325217, with Partial English-language Translation.

* cited by examiner

*Primary Examiner* — Ranodhi Serrao
(74) *Attorney, Agent, or Firm* — Fujitsu Patent Center

(57) ABSTRACT

An information communication method includes: accepting first presence information transmitted from a first terminal device which is connected so as to be communicable through a network; specifying a second terminal device as a notification destination to which the first presence information is destined; mapping the notification destination to a transmission source of the first presence information; deciding whether or not an alteration of the notification destination is required according to a state of the notification destination as indicated by second presence information accepted from the second terminal device; selecting, if alteration is required, a third terminal device to succeed the second terminal device; and notifying the first presence information to the third terminal device corresponding to the altered notification destination.

7 Claims, 44 Drawing Sheets

FIG. 9

| WATCHER ID | PRESENTITY ID | DISPLAY NAME | EXISTENCE OF HANDOVER |
|---|---|---|---|
| USER 1 | USER 5 | USER 5 | — |
|  | USER 6 | USER 6 | — |
|  | USER 7 | USER 7 | — |
| USER 2 | USER 8 | USER 8 | — |
| USER 3 | USER 7 | USER 7 | — |

FIG. 12

| PRESENTITY ID | PRESENCE INFORMATION | WATCHER ID | HANDOVER SOURCE WATCHER ID |
|---|---|---|---|
| USER 5 | TOMORROW, PLEASE RENDER BATHING SERVICE | USER 1 | — |
| USER 6 | PLEASE APPLY FOR DAY CARE AT END OF COMING WEEK | USER 1 | — |
| USER 7 | TODAY, SUPPER SERVICE IS UNNECESSARY | USER 2 | — |
| | | USER 3 | — |
| USER 8 | TOMORROW, PLEASE RENDER SUPPER SERVICE | USER 2 | — |

FIG. 14

| WATCHER ID | PRESENCE INFORMATION |
|---|---|
| USER 1 | PRESENT |
| USER 2 | UNDER BUSINESS TRIP |
| USER 3 | PRESENT |
| USER 4 | BUSY |

FIG. 15

| WATCHER ID (PRESENTITY ID) | PRESENCE INFORMATION |
|---|---|
| USER 1 | ABSENT |
| | UNDER BUSINESS TRIP |
| USER 2 | ABSENT |
| USER 3 | ABSENT |
| | BUSY |
| | UNDER BUSINESS TRIP |
| USER 4 | ABSENT |

FIG. 16

| WATCHER ID (PRESENTITY ID) | ATTRIBUTE |
|---|---|
| USER 1 | PERSON IN CHARGE OF SECTION-1, DEPARTMENT-A |
| USER 2 | PERSON IN CHARGE OF SECTION-1, DEPARTMENT-A |
| USER 3 | CHIEF OF SECTION-1, DEPARTMENT-A |
| USER 4 | CHIEF OF DEPARTMENT-A |

FIG. 19

| HANDOVER SOURCE WATCHER ID | HANDOVER DESTINATION WATCHER ID | PRESENTITY ID |
|---|---|---|
| USER 1 | USER 3 | USER 5 |
| | USER 3 | USER 6 |

FIG. 23

| WATCHER ID | PRESENTITY ID | DISPLAY NAME | EXISTENCE OF HANDOVER |
|---|---|---|---|
| USER 1 | USER 5 | USER 5 | — |
| | USER 6 | USER 6 | — |
| | USER 7 | USER 7 | — |
| USER 2 | USER 8 | USER 8 | — |
| | USER 5 | USER 5 | YES |
| USER 3 | USER 6 | USER 6 | YES |
| | USER 7 | USER 7 | — |

FIG. 24

| PRESENTITY ID | PRESENCE INFORMATION | WATCHER ID | HANDOVER SOURCE WATCHER ID |
|---|---|---|---|
| USER 5 | TOMORROW, PLEASE RENDER BATHING SERVICE | USER 1 | — |
| | | USER 3 | USER 1 |
| USER 6 | PLEASE APPLY FOR DAY CARE AT END OF COMING WEEK | USER 1 | — |
| | | USER 3 | USER 1 |
| USER 7 | TODAY, SUPPER SERVICE IS UNNECESSARY | USER 2 | — |
| | | USER 3 | — |
| USER 8 | TOMORROW, PLEASE RENDER SUPPER SERVICE | USER 2 | — |

FIG. 25

| PRESENTITY ID | ADDITIONAL INFORMATION |
|---|---|
| USER 5 | I HAVE FELT PAIN IN MY LEFT SHOULDER THESE SEVERAL DAYS. AS REGARDS MEAL, MY FAVORITE IS FISH |
| USER 6 | — |

FIG. 27

| WATCHER ID | PRESENTITY ID | DISPLAY NAME | HANDOVER |
|---|---|---|---|
| USER 1 | USER 5 | USER 5 | — |
|  | USER 6 | USER 6 | — |
| USER 2 | USER 7 | USER 7 | — |
|  | USER 8 | USER 8 | — |
| USER 3 | USER 7 | USER 7 | — |
|  | USER 5 | USER 5 | YES |
| USER 4 | USER 6 | USER 6 | YES |
|  | USER 7 | USER 7 | YES |

FIG. 28

| PRESENTITY ID | PRESENCE INFORMATION | WATCHER ID | HANDOVER SOURCE WATCHER ID |
|---|---|---|---|
| USER 5 | TOMORROW, PLEASE RENDER BATHING SERVICE | USER 1 | — |
| | | USER 4 | USER 1 |
| USER 6 | PLEASE APPLY FOR DAY CARE AT END OF COMING WEEK | USER 1 | — |
| | | USER 4 | USER 1 |
| USER 7 | TODAY, SUPPER SERVICE IS UNNECESSARY | USER 2 | — |
| | | USER 4 | USER 3 |
| USER 8 | TOMORROW, PLEASE RENDER SUPPER SERVICE | USER 2 | — |

FIG. 30

| WATCHER ID | PRESENTITY ID | PRESENCE INFORMATION |
|---|---|---|
| USER 1 | USER 5 | TOMORROW, PLEASE RENDER BATHING SERVICE |
|  | USER 6 | PLEASE DO SHOPPING ON FRIDAY |
|  | USER 7 | PLEASE APPLY FOR DAY CARE SERVICE AT WEEKEND |
| USER 2 | USER 8 | TOMORROW, SUPPER SERVICE IS UNNECESSARY |
|  | USER 7 | TOMORROW, PLEASE RENDER SUPPER SERVICE |
| USER 3 | USER 7 | TOMORROW, SUPPER SERVICE IS UNNECESSARY |

FIG. 32

| PRESENTITY ID | GRANTED WATCHER ID | REJECTED WATCHER ID |
|---|---|---|
| USER 5 | USER 1<br>USER 3 | USER 2 |
| USER 6 | USER 1<br>USER 2 | |
| USER 7 | USER 3 | |
| USER 8 | USER 2 | |

FIG. 39A

| WATCHER ID | PRESENTITY ID | DISPLAY NAME | EXISTENCE OF HANDOVER |
|---|---|---|---|
| USER 1 | MACHINE A | FACILITY A | — |
| | MACHINE C | FACILITY C | — |
| | MACHINE D | FACILITY D | — |
| USER 2 | MACHINE B | FACILITY B | — |

FIG. 39B

| PRESENTITY ID | PRESENCE INFORMATION | WATCHER ID | HANDOVER SOURCE WATCHER ID |
|---|---|---|---|
| MACHINE A | COOLING WATER TEMPERATURE IS RISING. PLEASE PAY ATTENTION. | USER 1 | — |
| MACHINE B | UNDER NORMAL OPERATION | USER 2 | — |
| MACHINE C | UNDER NORMAL OPERATION | USER 1 | — |
| MACHINE D | TODAY IS PERIODICAL MAINTENANCE DAY OF PURIFICATION TANK | USER 1 | — |

FIG. 40A

| WATCHER ID (PRESENTITY ID) | PRESENCE INFORMATION |
|---|---|
| USER 1 | AT WORK |
|  | HOLIDAY |
| USER 2 | AT WORK |
| ⋮ | ⋮ |

FIG. 40B

| PRESENTITY ID | OPERATORS IN CHARGE (GRANTED WATCHER IDS) |
|---|---|
| MACHINE A | USER 1<br>USER 2<br>USER 4 |
| MACHINE B | USER 2<br>⋮ |
| ⋮ | ⋮ |

FIG. 43A

| WATCHER ID | PRESENTITY ID | DISPLAY NAME | EXISTENCE OF HANDOVER |
|---|---|---|---|
| USER 1 | MACHINE A | FACILITY A | — |
| | MACHINE C | FACILITY C | — |
| | MACHINE D | FACILITY D | — |
| USER 2 | MACHINE A | FACILITY A | YES |
| | MACHINE B | FACILITY B | — |

FIG. 43B

| PRESENTITY ID | PRESENCE INFORMATION | WATCHER ID | HANDOVER SOURCE WATCHER ID |
|---|---|---|---|
| MACHINE A | COOLING WATER TEMPERATURE IS RISING. PLEASE PAY ATTENTION. | USER 1 | — |
| | | USER 2 | USER 1 |
| MACHINE B | UNDER NORMAL OPERATION | USER 2 | — |
| MACHINE C | UNDER NORMAL OPERATION | USER 1 | — |
| MACHINE D | TODAY IS PERIODICAL MAINTENANCE DAY OF PURIFICATION TANK. | USER 3 | USER 1 |
| | | USER 1 | — |
| | | USER 3 | USER 1 |

APPARATUS FOR COMMUNICATING PRESENCE INFORMATION

CROSS-REFERENCE TO RELATED APPLICATIONS

This application claims the benefit of priority from Japanese Patent Application No. 2007-325217 filed on Dec. 17, 2007, which is herein incorporated by reference in its entirety.

BACKGROUND

1. Field

At least one embodiment of the present invention relates to an information communication system in which various presence information items such as existence or nonexistence information, attribute information and positional information of persons, things, equipments and the like is automatically notified from a central device to a granted terminal device.

2. Description of the Related Art

Owing to the spread of a communication infrastructure, the full-time connection of a communication device to a network has become possible.

Accordingly, there has been built an information communication system called a "presence system" wherein presence information regarding a person who uses a communication device connected to the network can be notified to other communication devices connected to the network. For example, a type of presence information describes availability of such a user (e.g., online, offline, away, etc.) and willingness of such a user to communicate via set of communication services.

In the presence system, in a case where the presence information indicating a present state of a subject object, e.g., a person, a thing, a piece of equipment or the like has been updated, a notification of such an update is notified in real time to a subscriber object which has made a request for an alteration notification vis-à-vis the presence information of the subject object and for which the request has been granted.

Here, the subject object which provides the presence information and which grants or rejects requests for alteration notification vis-à-vis its presence information is called a "presentity". The subject object which has made the request for the alteration notification (and, if approved, receives the same) can be described as watching the presence information of the presentity, and so is called a "watcher".

In addition, the watcher is described as having a "subscription to the presence information." To become a watcher, the subscriber object subscribes, via submission of a subscription request, to presence information and alteration notifications regarding the presentity notified In recent years, paths/schemes for transmitting and receiving information items through a network in real time have increased. By way of examples, there can be a case where information items are exchanged between persons, a case where information in a certain system is transmitted to another system, a case where information is transmitted to a system when a thing has been detected by utilizing an RFID (Radio Frequency IDentification) tag, etc.

It is expected to expand the applications of a presence system to multifarious systems by utilizing the point that information items can be transmitted and received in real time.

In a presence system according to the related art, in a case where a watcher subscribes to the presence of a presentity, an inquiry about the propriety of the presence subscription is made to the pertinent presentity. In this case, the presentity judges the propriety of the subscription inquiry from each watcher, and he/she responds to the inquiry about the subscription propriety. Where the presentity has granted the presence subscription, the presence information is notified to the watcher each time the presentity thereafter updates the presence information. In a case where the presentity has rejected the presence subscription, the presence information is not notified to the watcher even when the presentity has thereafter updated the presence information.

As stated above, in the presence system, the watchers make requests for the subscriptions to the presence information items of the presentities beforehand, and the presence information items are notified to only the watchers to whom the presentities have granted the subscriptions in compliance with the requests. On the other hand, in such a case where a communication device which the watcher uses is not operating, e.g., because it is not online, or where the watcher is absent, the pertinent watcher does not accept the presence information. In this case, the presence information is not reliably notified even when the content thereof is to be confirmed in real time. According to one related art method, when the watcher shifts into a state in which he/she does not accept the presence information, the notification destination to which it is desired for the presence information to be sent is altered to another proxy notification destination.

Japanese Patent Application Laid-Open No. 2006-209193 discloses a technique wherein, before the watcher falls into the state in which he/she does not accept the presence information, he/she selects the proxy notification destination to which it is desired that the presence information be sent and issues a notification destination alteration request. Accordingly, having accepted the notification destination alteration request, the presence system decides the propriety of this notification destination alteration request on the basis of an alteration propriety condition set beforehand. In this case, the notification destination to which it is desired that the presence information be sent is altered when the presence system has decided the alteration to be proper, in compliance with the notification destination alteration request.

With this technique, the watcher can designate an alteration time period in issuing the notification destination alteration request. In this regard, there is disclosed a technique wherein, when the alteration time period has lapsed after the issue of the notification destination alteration request, the notification destination is reverted to the original watcher.

With the above technique, however, each time the watcher shifts into the state in which he/she does not accept the presence information, he/she needs to designate the next proxy notification destination and to notify the alteration request by himself/herself. This technique is relatively labor-intensive, and thus troublesome, for the watcher.

Besides, Non-patent Document 1 (Fujitsu Kabushiki-Kaisha: "Start of Sale of Software which realizes Push-type Information Delivery corresponding to Situation of User 'FLAIRINC (registered trademark)'", [online], dated Dec. 2, 2002 [searched for on Oct. 2, 2007] discloses a technique wherein, in a case where the watcher is in the state in which he/she does not accept the presence information, the presence information is transferred to a mail address designated by the watcher.

In this case, before the watcher falls into the state in which he/she does not accept the presence information, he/she designates the mail address so as to transfer the presence information to another communication device of his/her own or another watcher. Thus, even in the state in which the watcher does not accept the presence information, the presence information is notified to any watcher.

SUMMARY

At least one embodiment of the present invention provides An information communication method includes: accepting first presence information transmitted from a first terminal device which is connected so as to be communicable through a network; specifying a second terminal device as a notification destination to which the first presence information is destined; mapping the notification destination to a transmission source of the first presence information; deciding whether or not an alteration of the notification destination is required according to a state of the notification destination as indicated by second presence information accepted from the second terminal device; selecting, if alteration is required, a third terminal device to succeed the second terminal device; and notifying the first presence information to the third terminal device corresponding to the altered notification destination.

It is to be understood that both the foregoing summary description and the following detailed description are explanatory as to some embodiments of the present invention, and not restrictive of the present invention as claimed.

BRIEF DESCRIPTION OF THE DRAWINGS

Embodiments are illustrated by way of example and not limited by the following figures.

FIG. 9 depicts a content example of a buddy list which is stored in a storage unit of a presence server device according to an example of an embodiment of the present invention.

FIG. 12 depicts a content example of a notification destination list which is stored in a storage unit of a presence server device according to an example of an embodiment of the present invention.

FIG. 14 depicts a content example of presence information items which are notified from a watcher terminal devices according to an example of an embodiment of the present invention.

FIG. 15 depicts a content example of alteration conditions which are stored in a storage unit of a presence server device according to an example of an embodiment of the present invention.

FIG. 16 depicts a content example of an attribute list of watchers as stored in a storage unit of a presence server device according to an example of an embodiment of the present invention.

FIG. 19 depicts a content example of a handover completion wait table which is stored by a control unit of a presence server device according to an example of an embodiment of the present invention.

FIG. 23 depicts a content example in a case where a buddy list in a storage unit of a presence server device has been updated by an alteration of a notification destination according to an example of an embodiment of the present invention.

FIG. 24 depicts a content example in the case where a notification destination list in a storage unit of a presence server device has been updated by the alteration of a notification destination, according to an example of an embodiment of the present invention.

FIG. 25 depicts a content example of additional information which is stored in a storage unit of a presence server device according to an example of an embodiment of the present invention.

FIG. 27 depicts a content example of a buddy list in a case where a notification destination has been further altered from a watcher terminal device being a handover destination according to an example of an embodiment of the present invention.

FIG. 28 depicts a content example of a notification destination list in the case where a notification destination has been further altered from a watcher terminal device being a handover destination according to an example of an embodiment of the present invention.

FIG. 30 depicts a content example of a notification history which is stored in a storage unit of a presence server device according to an example of an embodiment of the present invention.

FIG. 32 depicts a content example of an alteration propriety table which is stored in a storage unit of a presence server device according to an example of an embodiment of the present invention.

FIGS. 39A and 39B depict content examples of a buddy list and a notification destination list, respectively, which are stored in a storage unit of a presence server device according to an example of an embodiment of the present invention.

FIGS. 40A and 40B depict content examples of alteration conditions and a charge assignment table, respectively, which are stored in a storage unit of a presence server device according to an example of an embodiment of the present invention.

FIGS. 43A and 43B depict content examples in the cases where a buddy list and a notification destination list, respectively, in a storage unit of a presence server device have been updated by alterations of notification destinations, according to an example of an embodiment of the present invention.

DETAILED DESCRIPTION OF EXAMPLES OF EMBODIMENTS

Figure 1:
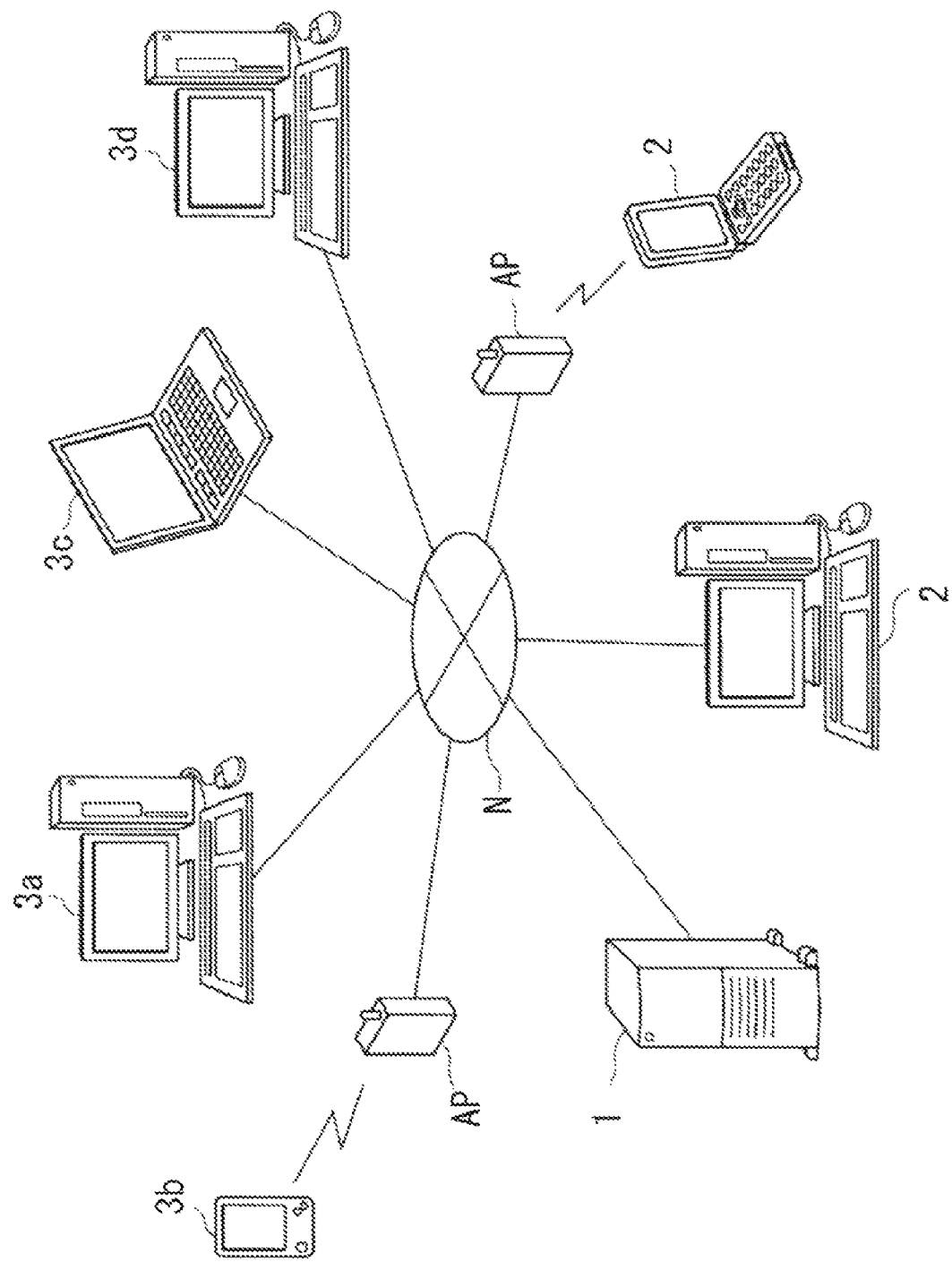
FIG. 1 depicts a configuration of a care support system according to an example of an embodiment of the present invention.

In the figures, dimensions and/or proportions may be exaggerated for clarity of illustration. It will also be understood that when an element is referred to as being "connected to" another element, it may be directly connected or indirectly connected, i.e., intervening elements may also be present. Further, it will be understood that when an element is referred to as being "between" two elements, it may be the only element between the two elements, or one or more intervening elements may also be present. Like reference numerals refer to like elements throughout.

When studying the related art, the inventors recognized (among other things) that, though presence information is transferred to the next notification destination designated by the watcher, there is a shortcoming, namely that an inquiry about the propriety of the notification of the presence information to the next notification destination is not made to the presentity. Accordingly, at least one embodiment of the present invention overcomes such a shortcoming.

FIG. 1 depicts a configuration of a care support system. In FIG. 1, an example context is assumed in which an information communication system is applied to a care support system utilized for a care service, and in which the state of a user who is a care-receiver should desirably be reliably notified to (i.e., provided to or communicated to) a service provider in real time.

The care support system of FIG. 1 configures a presence system by including a presence server device 1 which is connected to a network N such as the Internet, presence terminal devices 2, 2, ..., and a plurality of watcher terminal devices 3a, 3b, 3c, 3d, .... The care support system is utilized, for example, in order that a helper (caregiver) in the care service may grasp the situation of the care-receiver, or that he/she may contact the care-receiver (or his/her care assistant). Watchers in the care support system are the service providers which include the helpers rendering the service to the individual users, and a manager managing the helpers. Watcher IDs are respectively allocated to the watchers which become the service providers.

In FIG. 1, the watcher IDs of the service providers are "user1", "user2", "user3" and "user4", and the respective watchers use the watcher terminal devices 3a, 3b, 3c and 3d. Presentities in the care support system of FIG. 1 are the care-receivers who are the users of the care service. The presentity IDs of the care-receivers are "user5", "user6", "user7", "user8", ....

Incidentally, processes are executed in accordance with the presence information items of the service providers as will be stated later. The service providers are watchers and also presentities.

The presentity information items of the watchers are also published from the watcher terminal devices 3a, 3b, 3c and 3d to the presence server device 1. The presence information items include not only existence and nonexistence, but also the states and attributes of the users and the service providers.

The presence terminal devices 2, 2, . . . for notifying the presence information items of the care-receivers can be, e.g., a PC (Personal Computer), a PDA (Personal Digital Assistant), a portable telephone and the like computer device which the care-receivers (or care assistants) possess. The watcher terminal devices 3a, 3b, 3c, 3d, . . . can be, e.g., a PC, a PDA, a portable telephone and the like computer device which are managed by the service providers, and they are used by the helpers, their manager, et al. who are the service providers.

The presence terminal devices 2, 2, . . . and the watcher terminal devices 3a, 3b, 3c, 3d, . . . can be connected to the network N, and they can communicate with the presence server device 1, respectively. In a case where the presence terminal devices 2, 2, . . . and the watcher terminal devices 3a, 3b, 3c, 3d, . . . are portable terminal devices capable of radio communications, they are connected to the network N through access points AP.

The presence information of the care-receiver is first published from the presence terminal device 2 to the presence server device 1, and it is notified to the watcher terminal devices 3a, 3b, 3c, 3d, . . . via the presence server device 1.

On this occasion, the presence information is not always notified to all the watcher terminal devices 3a, 3b, 3c, 3d, . . . .

That is, the presence information is notified to that any of the watcher terminal devices 3a, 3b, 3c, 3d, . . . for which the notification of the presence information is granted.

By way of example, the service provider (watcher ID "user1") who ought to grasp the situation of the care-receiver (presentity ID "user5"), namely, the helper who is in charge of this care-receiver, makes a subscription request for the presence information of the care-receiver of whom the service provider takes charge, by employing the watcher terminal device 3a which he/she uses.

The subscription request for the presence information as transmitted from the watcher terminal device 3a is accepted by the presence server device 1 through the network N.

In addition, the presence server device 1 executes a process for inquiring of the presence terminal device 2 which the care-receiver uses, about whether the subscription request is granted or rejected.

In a case where the reply of the subscription grant to the inquiry has been received from the presence terminal device 2 which the care-receiver uses, the subscription request for the presence information as made by the watcher terminal device 3a is granted. Thenceforth, the presence information of the presentity ID "user5" is notified to the watcher terminal device 3a which the watcher ID "user1" uses.

In this manner, the presence information of the care-receiver is notified to the watcher terminal device 3b for which the subscription request has been granted.

By way of example, information indicating a request for care to the helper in charge is added to the presence information of the care-receiver, whereby the care service in which the request for the care can be notified in real time from the care-receiver to the helper in charge is realizable.

Meanwhile, in a case where the power source of the watcher terminal device for which the subscription request has been granted is turned OFF, or in a case where the helper in charge, to whom the watcher terminal device of the granted subscription request is allotted, is nonexistent by way of example, the watcher terminal devices 3a, 3b, 3c, 3d, . . . of the watchers for whom the subscription request has been granted cannot accept the notification of the presence information.

In addition, the presence information is not notified to the watcher terminal device for which the subscription is not granted. Therefore, a situation can occur where the presence information of the care-receiver is not notified to any of the watcher terminal devices 3a, 3b, 3c, 3d, . . . of the watchers.

In this case, undesirably a state where the care-receiver cannot enjoy the care service takes place until the helper in charge returns into a state where he/she accepts the presence information.

In the care support system of FIG. 1, in a case where the watcher terminal device 3a for which the notification of the presence information of the care-receiver is granted is in a state incapable of accepting the notification of the presence information, the presence server device 1 executes a process for altering the notification destination of the presence information, in order that the notification destination may be appropriately handed over to any of the other watcher terminal devices 3b, 3c, 3d, . . . .

Thus, the situation where the presence information of the care-receiver is not notified can be avoided.

Now, there will be described the details of the configuration and processes of the care support system for realizing the appropriate handover of the notification destination among the watcher terminal devices 3a, 3b, 3c, 3d, . . . .

Figure 2:
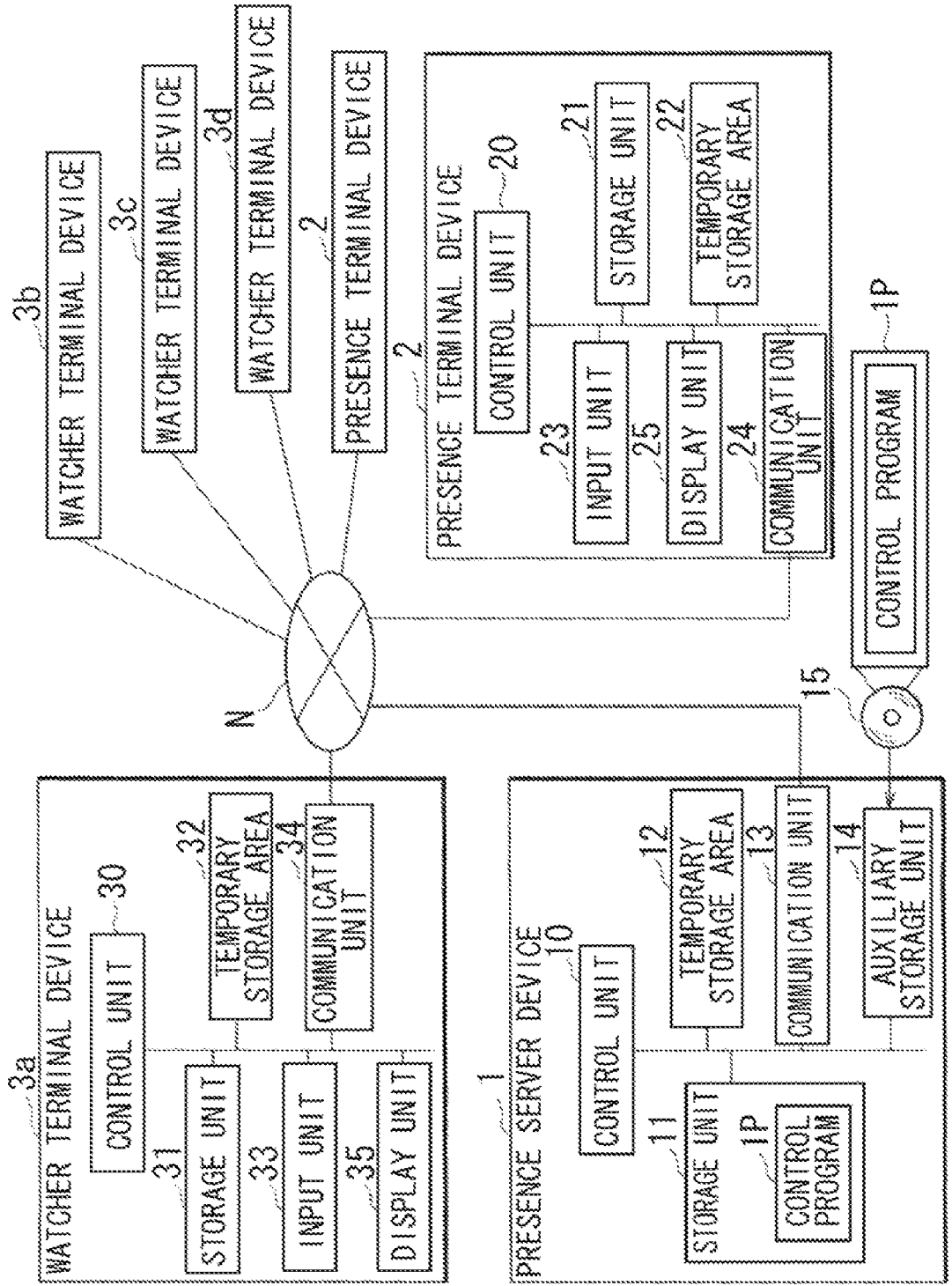
FIG. 2 depicts internal configuration of a presence server device, a presence terminal device and a watcher terminal device of a care support system according to an example of an embodiment of the present invention.

FIG. 2 depicts internal configurations of the presence server device 1, presence terminal device 2 and watcher terminal device 3a which comprise a care support system.

Since the internal configuration of each of the watcher terminal devices 3b, 3c, 3d, . . . is the same as that of the watcher terminal device 3a, it shall be omitted from detailed description.

The presence server device 1 is configured of a server computer device, and it includes a control unit 10, a storage unit 11, a temporary storage area 12, a communication unit 13, and an auxiliary storage unit 14 utilizing a disk drive.

The control unit 10 serves to control the individual constituent units, and it is, for example, a CPU or an MPU (Micro Processing Unit).

As the storage unit 11, it is possible to employ a storage medium such as a hard disk or an EEPROM (Electronically Erasable and Programmable Read Only Memory).

The temporary storage area 12 serves to temporarily store various information items which are generated by the processes of the control unit 10. Any of various memories such as a DRAM (Dynamic Random Access Memory), an SRAM (Static Random Access Memory) and the EEPROM can be employed as the temporary storage area 12.

The communication unit 13 serves to realize communications through the network N, and a network card (Network Interface Card), for example, can be employed.

A control program 1P for operating the server computer device as an information communication system according to this embodiment, that is, as the presence server device 1, is stored in the storage unit 11 of the presence server device 1.

The control unit 10 loads the control program 1P from the storage unit 11 into the temporary storage area 12 and runs this control program 1P, thereby to operate the server computer device as the presence server device 1.

The control program 1P may be acquired from a portable storage medium 15 such as a CD-ROM or a DVD-ROM, into the auxiliary storage unit 14 by the control unit 10, or it may well be acquired from another device through the network N.

The control unit 10 of the presence server device 1 accepts subscription requests for presence information, from the watcher terminal devices 3a, 3b, 3c, 3d, . . . to-be-stated-later by the communication unit 13, it makes inquiries to the presence terminal devices 2, 2, . . . about the accepted subscription requests.

In accordance with responses to the inquiries, information on the watcher terminal devices 3a, 3b, 3c, 3d, . . . for which the subscription requests have been granted or rejected is stored. In a case where the presence information items published from the presence terminal devices 2, 2, . . . have been received by the communication unit 13, they are notified to the granted watcher terminal devices 3a, 3b, 3c, 3d, . . . .

The lists of watcher IDs and presentity IDs are stored in the storage unit 11 of the presence server device 1. In addition, a buddy list and a notification destination list indicating the watcher terminal devices 3a, 3b, 3c, 3d, . . . from which the requests for the subscriptions have been made and the watcher terminal devices 3a, 3b, 3c, 3d, . . . to which the presence information items are to be notified, are stored in the storage unit 11. The buddy list and the notification destination list will be described in more detail below.

The control unit 10 of the presence server device 1 also accepts the publications of the presence information items of the watchers from the watcher terminal devices 3a, 3b, 3c, 3d . . . . . That is, also the watcher terminal devices 3a, 3b, 3c, 3d, . . . operate as presence terminal devices 2. In other words, each of the watcher terminal devices 3a, 3b, 3c, 3d, . . . has a configuration equivalent to that of the presence terminal device 2.

The control unit 10 decides whether or not the alteration of the notification destination is required, by comparing the presence information of the watcher with an alteration condition. In a case where the control unit 10 has decided that the alteration is required, it determines a handover destination candidate, and in a case where the control unit 10 has judged that the candidate has no problem, it alters the notification destination of the presence information to the handover destination candidate.

The control unit 10 executes a process for making inquiries about the propriety of the alteration to the presence terminal devices 2, 2, . . . , in order to suppress the notification of the presence information to any person not intended by the care-receiver (or care assistant).

The presence terminal device 2 includes a control unit 20, a storage unit 21, a temporary storage unit 22, an input unit 23, a communication unit 24 and a display unit 25. The control unit 20 serves to control the individual constituent units, and it is, for example, a CPU or an MPU (Micro Processing Unit). As the storage unit 21, it is possible to employ a storage medium such as a hard disk or an EEPROM (Electronically Erasable and Programmable Read Only Memory). The temporary storage area 22 serves to temporarily store various information items which are generated by the processes of the control unit 20. Any of various memories such as a DRAM, an SRAM and the EEPROM can be employed as the temporary storage area 22.

The input unit 23 serves to accept an input manipulation, and it accepts the inputs of signals from various input devices, for example, a keyboard, a mouse and manipulation keys. The communication unit 24 serves to realize communications through the network N, and a network card (Network Interface Card), for example, can be employed. The display unit 25 serves to output signals for displaying various information items, to a display device. Incidentally, the display device may be configured integrally with the presence terminal device 2, or it may well be configured separately from the presence terminal device 2 as an external device.

The control unit 20 of the presence terminal device 2 loads a presence application program for care-receivers as stored in the storage unit 21, into the temporary storage area 22. Then, it runs this presence application program, thereby to operate a PC, a PDA, a portable telephone or the like computer device as the presence terminal device 2. Accordingly, the control unit 20 controls the display unit 25 to display a screen with which the care-receiver (or protector) browses or inputs various information items. The control unit 20 of the presence terminal device 2 accepts, through the input unit 23, the input manipulation of the presence information which contains the service request of the care-receiver by the care-receiver himself/herself (or care assistant). In a case where the control unit 20 has accepted the input of the presence information of the care-receiver through the input unit 23, it transmits the inputted presence information to the presence server device 1 through the network N by the communication unit 24.

In a case where the control unit 20 has received an inquiry about the propriety of a subscription request from the presence server device 1, or where it has executed an inquiry process for the propriety of an alteration, it displays an inquiry content through the display unit 25 to facilitate the care-receiver (or care assistant) confirming the inquiry content. The control unit 20 accepts through the input unit 23, an input which concerns a response to the inquiry by the care-receiver, and it responds to the presence server device 1 on the basis of the inputted information.

The watcher terminal device 3a includes a control unit 30, a storage unit 31, a temporary storage area 32, an input unit 33, a communication unit 34 and a display unit 35. The control unit 30 serves to control the individual constituent units, and it is, for example, a CPU or an MPU (Micro Processing Unit). As the storage unit 31, it is possible to employ a storage medium such as a hard disk, an EEPROM (Electronically Erasable and Programmable Read Only Memory), etc.

The temporary storage area 32 serves to temporarily store various information items which are generated by the processes of the control unit 30. Any of various memories such as a DRAM, an SRAM, an EEPROM, etc., can be employed as the temporary storage area 32.

The input unit 33 serves to accept an input manipulation, and it accepts the inputs of signals from various input devices, for example, a keyboard, a mouse and manipulation keys. The communication unit 34 serves to realize communications through the network N, and a network card (Network Interface Card), for example, can be employed. The display unit 35 serves to output signals for displaying various information items, to a display device. Incidentally, the display device may be configured integrally with the watcher terminal device 3, or it may well be configured separately from the watcher terminal device 3 as an external device.

A presence application program for helpers, for operating a PC, a PDA or a portable telephone as the watcher terminal device 3a, is stored in the storage unit 31 of the watcher terminal device 3a. The control unit 30 loads the helper presence application program stored in the storage unit 31, into the temporary storage area 32, and it runs this presence application program, thereby to display through the display unit 35, a screen with which a service provider such as the care helper browses various information items containing presence information, a screen with which he/she inputs various information items for a subscription request, or the like.

The control unit 30 of the watcher terminal device 3a transmits the subscription request for the presence information, to the presence server device 1 by the communication unit 34. The control unit 30 receives the presence information notified via the presence server device 1, by the communication unit 34. The control unit 30 transmits the presence information of a watcher to the presence server device 1 through the network N by the communication unit 34.

The presence information of the watcher may be one which the control unit 30 automatically transmits by the communication unit 34 as will be described below in accordance with the start/end of the helper presence application, and it may well be one as which the input of the presence information by the service provider has been accepted through the input unit 33.

In the care support system configured as stated above, there will be first described a process in the case where subscription requests for the presence information items of care-receivers are made by the watcher terminal devices 3a, 3b, 3c, 3d, . . . .

Figure 3:
FIG. 3 depicts a screen example which is displayed via a display unit of a watcher terminal device according to an example of an embodiment of the present invention.

FIG. 3 depicts a screen example which is displayed through the display units 35 of the watcher terminal devices 3a, 3b, 3c, 3d, . . . .

The screen example shown in the explanatory diagram of FIG. 3 is displayed in such a way that the control unit 30 loads a presence application program for helpers as stored in the storage unit 31 of each of the watcher terminal devices 3a, 3b, 3c, 3d, . . . and then runs this presence application program.

In a case where the control unit 30 has displayed through the display unit 35, an input screen for a watcher ID which identifies a watcher (care helper), the watcher ID is inputted by the helper or his/her manager. When the inputted watcher ID has been transmitted to the presence server device 1 and has been authenticated, the screen example shown in the explanatory diagram of FIG. 3 is displayed through the display unit 35.

On this occasion, the control unit 30 stores the authenticated watcher ID in the temporary storage area 32 so as to retain the watcher ID until the screen is closed by the end of the helper presence application.

Incidentally, the screen example shown in the explanatory diagram of FIG. 3 may well be displayed through the display unit 35 on the basis of screen data which are transmitted to the watcher terminal devices 3a, 3b, 3c, 3d, . . . by the operation of the presence server device 1 in a case where the watcher has logged into the care support system with his/her watcher ID by one of the watcher terminal devices 3a, 3b, 3c, 3d, . . . .

The screen example shown in the explanatory diagram of FIG. 3 is configured of a tool bar 301 and a presence information display area 302. In the presence information display area 302, the list of the newest information items of the presence information items which are granted to be notified to the watcher ID having logged in is updated and displayed in real time. In the screen example in FIG. 3, there are displayed the newest presence information items representing request contents from the care-receiver "user5" whose presentity ID is "user5", and the care-receiver "user6" whose presentity ID is "user6". Besides, the dates and hours of the updates are displayed in association with the respective presence information items. Incidentally, the presence information indicated by bold characters is one updated periodically, namely within a desired time period, for example, within the latest 24 hours.

Buttons for accepting input manipulations by the helper are displayed in the tool bar 301. A "register" button 303, a "message" button 304 and an "end" button 305 are displayed in the screen example shown in FIG. 3. The "register" button 303 in the screen example in FIG. 3 is the button which is used when the service provider being the watcher makes a request for a subscription to the presence information of the care-receiver. The service provider can perform the input manipulation for the subscription request for the presence information of the desired care-receiver, in such a way that he/she manipulates a mouse or the like connected to the control unit 30 through the input unit 33, so as to press the "register" button 303. The "message" button 304 in the screen example in FIG. 3 is the button with which the service provider being the watcher transmits a message to the care-receiver.

The service user can input the transmission destination of the message and the content thereof in such a way that he/she manipulates the mouse or the like connected to the control unit 30 through the input unit 33, so as to press the "message" button 304. The "end" button 305 in the screen example in FIG. 3 is the button with which the instruction of the end of the helper presence application is given to the control unit 30 by disconnecting a connection with the presence server device 1.

Figure 4:
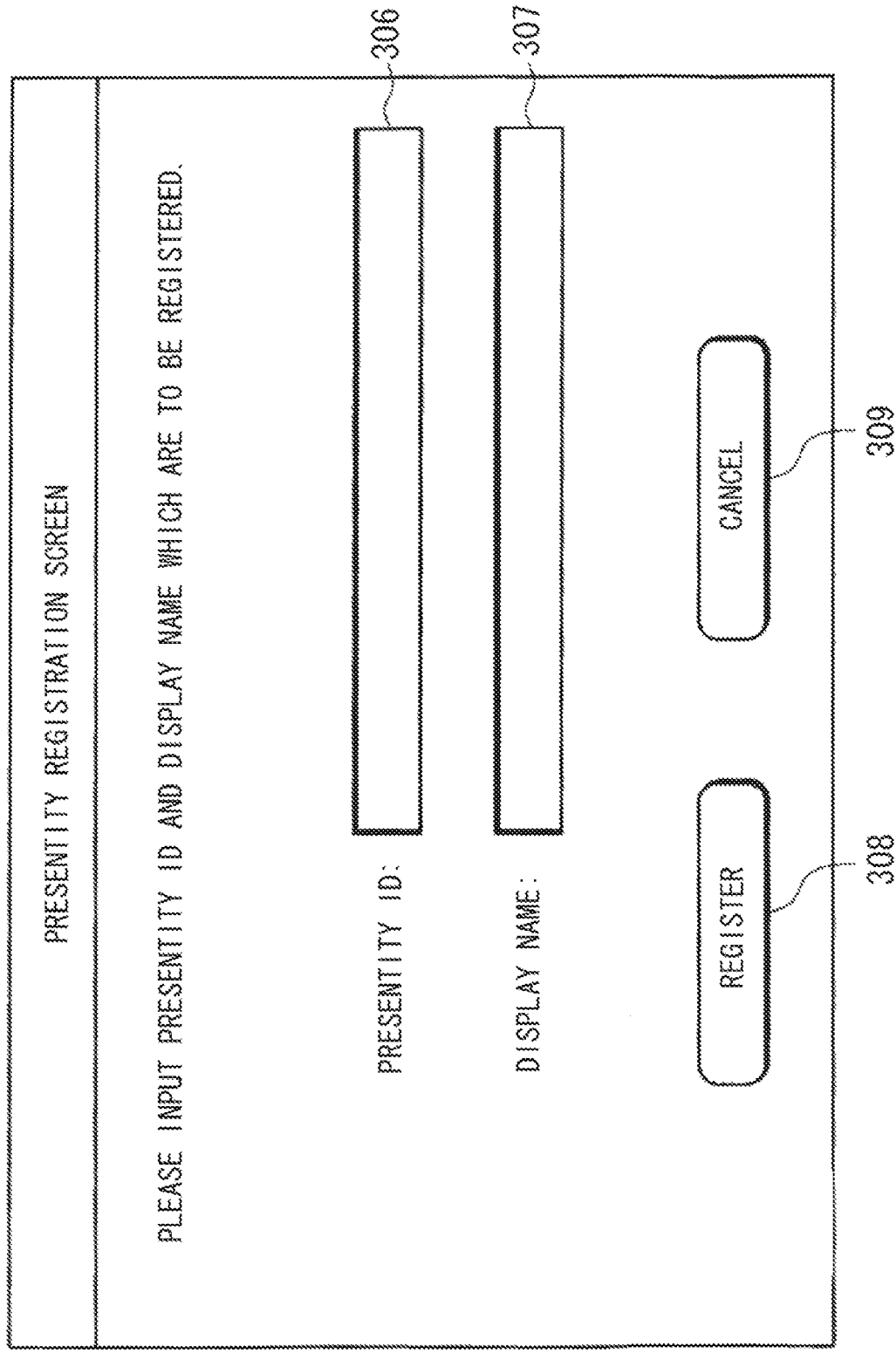
FIG. 4 depicts a screen example which is displayed in response to a subscription request for presence information, via a display unit of a watcher terminal device according to an example of an embodiment of the present invention.

FIG. 4 depicts a screen example which is displayed at a subscription request for presence information, through the display units 35 of the watcher terminal devices 3a, 3b, 3c, 3d, . . . .

The screen example shown in the explanatory diagram of FIG. 4 is displayed in a case where the control unit 30 has detected the press of the "register" button 303 in the screen example in FIG. 3, through the input unit 33. In the screen example in FIG. 4, there are displayed an edit box 306 for inputting the presentity ID of a care-receiver to whom the request for a subscription to the presence information, an edit box 307 for inputting a display name (presentity name) in the case where this display name is displayed in the presence information display area 302, a "register" button 308 for giving the instruction of the subscription request for the presence information, to the control unit 30, and a "cancel" button 309 for giving the stop of a "register" process to the control unit 30.

A service provider inputs to the edit box 306, the presentity ID of the care-receiver to whom the request for the subscription to the presence information. Subsequently, he/she inputs to the edit box 306, the display name in the case of displaying the presence information. Thereafter, he/she presses the "register" button 308. Thus, he/she can cause the control unit 30 to execute a subscription request process as to the presence information of the care-receiver of the inputted presentity ID.

In a case where the control unit 30 has detected the press of the "register" button 308, through the input unit 33, it acquires the character strings of the presentity ID inputted into the edit box 306, and the display name inputted into the edit box 307. The control unit 30 executes the subscription request process in which the watcher ID and the acquired presentity ID and display name stored in the temporary storage area 32 are transmitted to the presence server device 1 by the communication unit 34, together with a presence subscription request command. Besides, the control unit 30 closes the screen example in FIG. 4 and restores the display to the screen example shown in the explanatory diagram of FIG. 3.

Incidentally, the watcher ID which is transmitted together with the presence subscription request command is that watcher ID of the service provider which has been inputted to the input screen displayed through the display unit 35, which has been authenticated by the presence server device 1 and which is stored in the temporary storage area 32, as stated before with reference to the explanatory diagram of FIG. 3. In a case where the control unit 30 has detected the press of the "cancel" button 309 through the input unit 33, it directly closes the screen example in FIG. 4 and restores the display to the screen example shown in the explanatory diagram of FIG. 3.

The control unit 30 of the watcher terminal device 3 keeps the connection with the presence server device 1 until it detects that the "end" button in the screen example shown in FIG. 3 has been pressed with the input device which is connected to the control unit 30 through the input unit 33. Besides, while keeping the connection with the presence server device 1, the control unit 30 continues a process in which the notification of the presence information as granted by the presence server device 1 is accepted by the communication unit 34, and in which the accepted presence information is displayed in the presence information display area 302 shown in the screen display in FIG. 3.

Figure 5:
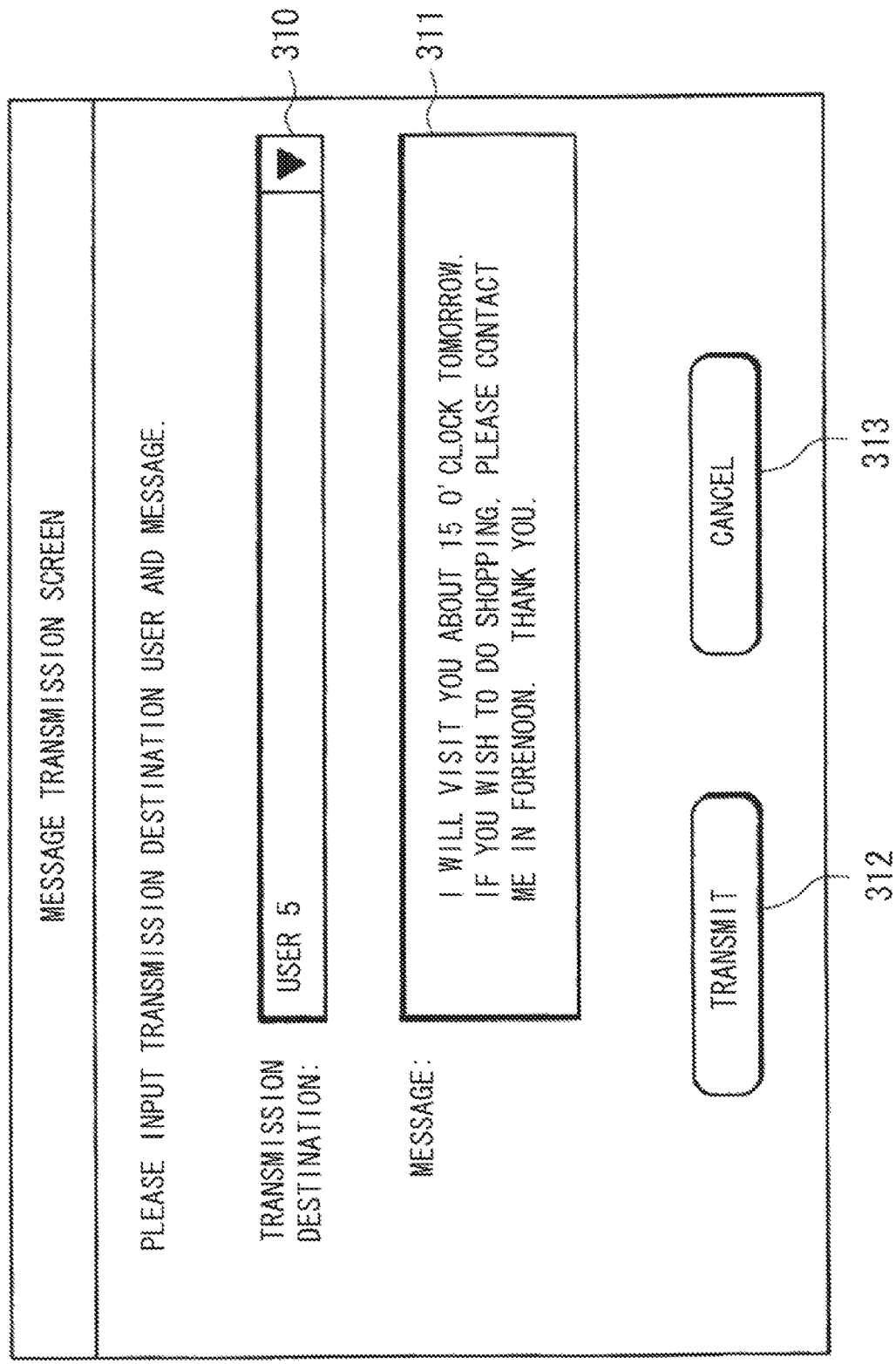
FIG. 5 depicts a screen example which is displayed when attempting to transmit a message via a display unit of a watcher terminal device according to an example of an embodiment of the present invention.

FIG. 5 depicts a screen example which is displayed at the transmission of a message, through the display units 35 of the watcher terminal devices 3a, 3b, 3c, 3d, . . . .

The screen example shown in the explanatory diagram of FIG. 5 is displayed in a case where the control unit 30 has detected that the "message" button 304 in the screen example in FIG. 3 had been pressed by employing the input device connected to the control unit 30 through the input unit 33. In the screen example in FIG. 5, there are displayed a dropdown menu 310 (selection box) for selecting the presentity ID of a care-receiver who is the transmission destination of the message, an edit box 311 for inputting the content of the message, a "transmit" button 312 for executing a transmission process for the message, and a "cancel" button 313 for stopping the transmission process for the message. A service provider selects the transmission destination of the message from within the dropdown menu 310, inputs the content of the message to the edit box 311 and presses the "transmit" button 312, whereby he/she can transmit the message of the inputted content to the care-receiver.

In a case where the control unit 30 has detected the press of the "transmit" button 312 through the input unit 33, it acquires the selected presentity ID and the message. The control unit 30 transmits a watcher ID and the acquired presentity ID and message as stored in the temporary storage area 32, to the presence server device 1 by the communication unit 34, together with a transmission request command for the message. In addition, the control unit 30 closes the screen example in FIG. 5 and restores the display to the screen example in FIG. 3. In a case where the control unit 30 has detected the press of the "cancel" button 313 through the input unit 33, it directly closes the screen example in FIG. 5 and restores the display to the screen example in FIG. 3.

In a case where the control unit 10 of the presence server device 1 has received the transmission request command for the message, from any of the watcher terminal devices 3a, 3b, 3c, 3d, . . . , it acquires the watcher ID, presentity ID and message which have been transmitted together with the transmission request command. The control unit 10 transmits the message to one of the presence terminal devices 2, 2, . . . as corresponds to the acquired presentity ID. Incidentally, on this occasion, only the message from a watcher for whom a presence subscription is granted may well be transmitted to one of the presence terminal devices 2, 2, . . . as used by a presentity having granted the presence subscription, by a process to be described below.

Next, there will be described the process in the case where the presence information of a care-receiver is published from the presence terminal device 2.

Figure 6:
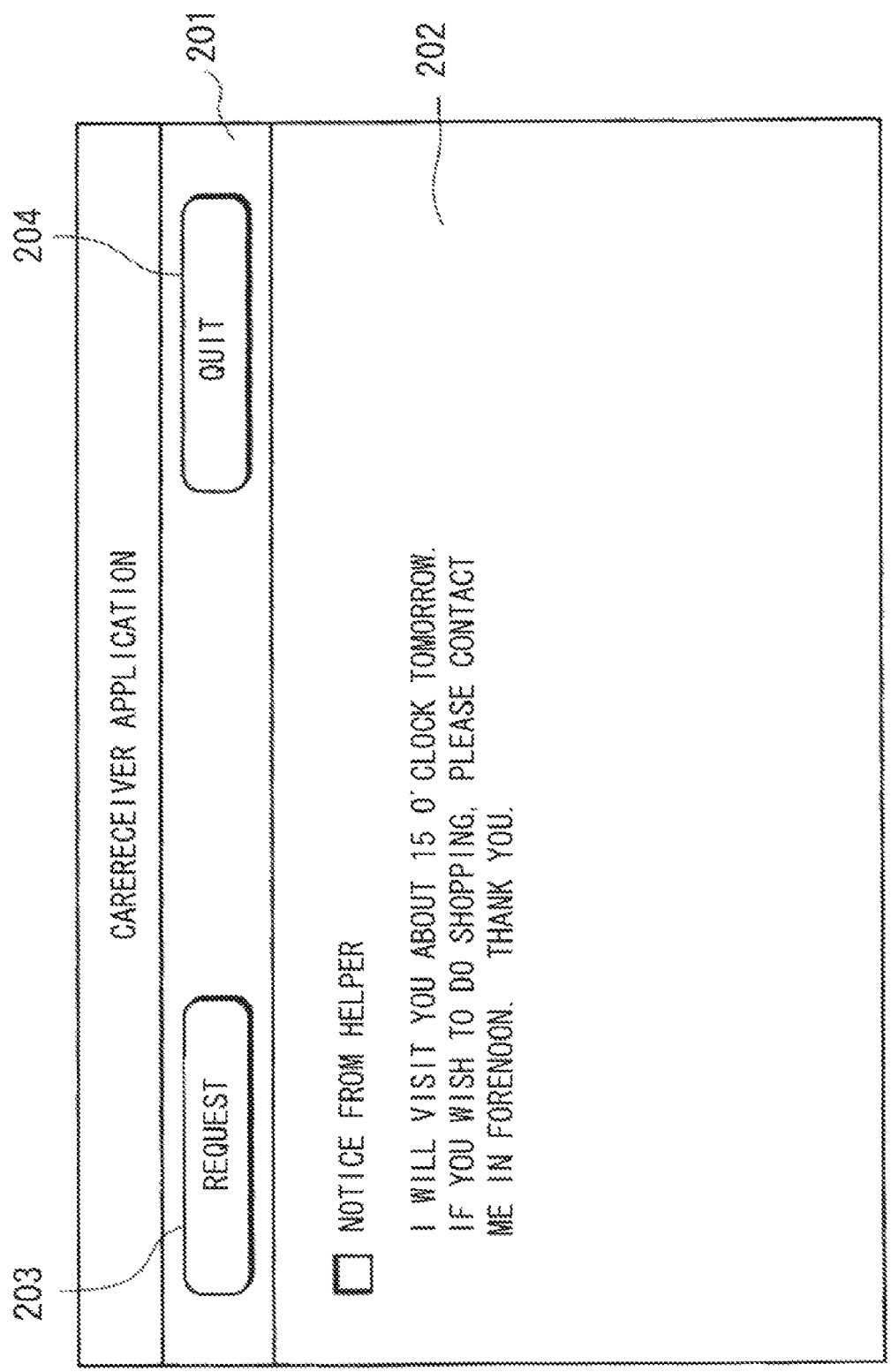
FIG. 6 depicts a screen example which is displayed through a display unit of a presence terminal device according to an example of an embodiment of the present invention.

FIG. 6 depicts a screen example which is displayed through the display unit 25 of the presence terminal device 2.

The screen example shown in the explanatory diagram of FIG. 6 is displayed in such a way that the control unit 20 loads and runs a presence application program for care-receivers as stored in the storage unit 21 of the presence terminal device 2. Incidentally, likewise to the screen example in the watcher terminal devices 3a, 3b, 3c, 3d, . . . as shown in the explanatory diagram of FIG. 3, the screen display shown in the explanatory diagram of FIG. 6 may well be displayed through the display unit 25 when a presentity ID inputted by the care-receiver (or care assistant) has been transmitted to and authenticated by the presence server device 1 in a case where the control unit 20 had displayed the input screen of the presentity ID for identifying the care-receiver, through the display unit 25. Besides, the screen example may well be displayed on the basis of screen data which are transmitted from the presence server device 1 in a case where the care-receiver (or care assistant) has logged into the care service. Incidentally, on this occasion, the control unit 20 stores the authenticated presentity ID in the temporary storage area 22.

The screen example shown in the explanatory diagram of FIG. 6 is configured of a tool bar 201 and a message display area 202. In the message display area 202, the message transmitted through the presence server device 1 from the service provider is displayed. In the screen example in FIG. 6, there is shown the content which is displayed in the case where the message shown in the explanatory diagram of FIG. 5 has been transmitted. Incidentally, the message display area 202 may display only the newest message, or it may well display the list of past messages.

Buttons for accepting input manipulations by the care-receiver (or care assistant) are displayed in the tool bar 201. A "request" button 203 and an "end" button 204 are displayed in the screen example shown in the explanatory diagram of FIG. 6.

The "request" button 203 in the screen example in FIG. 6 is the button which is used in setting a service request content to be notified from the care-receiver to the service provider or the state of the care-receiver. That is, in this case, the service request content or the state of the care-receiver is presence information. The care-receiver (or care assistant) presses the "request" button 203 by manipulating the mouse or the like which is connected to the control unit 20 through the input unit 23, whereby he/she can perform the input manipulation for setting the request content. The "end" button 204 in the screen example in FIG. 6 is the button with which the instruction of the end of the care-receiver presence application is given to the control unit 20 by disconnecting a connection with the presence server device 1.

Figure 7:
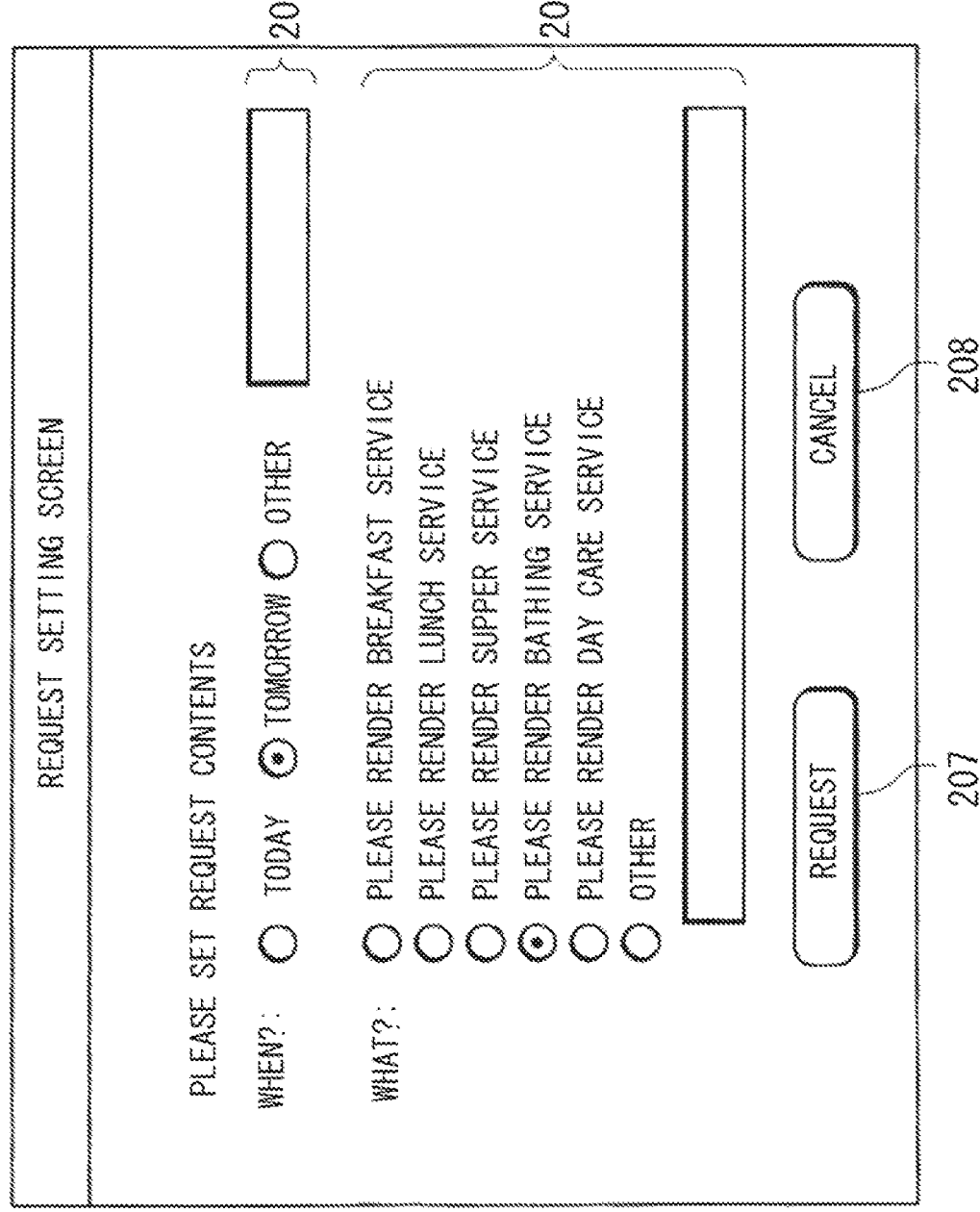
FIG. 7 depicts a screen example which is displayed at a notification of presence information through a display unit of a presence terminal device according to an example of an embodiment of the present invention.

FIG. 7 depicts a screen example at the publication of presence information as displayed through the display unit 25 of the presence terminal device 2.

The screen example shown in the explanatory diagram of FIG. 7 is displayed in a case where the control unit 20 has detected through the input unit 23, the manipulation that the "request" button 203 in the screen example in FIG. 6 has been pressed. In the screen example in FIG. 7, there are displayed a radio button 205 for accepting the selection of a desired date concerning a request content, a radio button 206 for accepting the selection of the request content, a "request" button 202 for transmitting the request content, and a "cancel" button 208 for giving the instruction of the stop of a "request" process to the control unit 20.

A care-receiver (or care assistant) can select the desired date and the request content of a service with the radio button 205 and the radio button 206, respectively. By the way, in a case where "Other" among choices indicated in each of the radio buttons 205 and 206 is selected, a content can be input into an edit box.

In the screen example in FIG. 7, it is indicated that "Tomorrow" is selected as the desired date, while a "bathing service" is selected as the request content. The care-receiver (or care assistant) selects the desired date and the request content or inputs the contents thereof and then presses the "request" button 207, whereby he/she can cause the control unit 20 to execute the process for publishing the presence information which contains the inputted request content.

In a case where the control unit 20 has detected the press of the "request" button 207 through the input unit 23, it acquires the desired date and the request content selected with the radio buttons 205 and 206, or the desired date and the request content inputted into the edit boxes, when the "Other" items are selected. The control unit 20 sets the acquired desired date and request content as the presence information, and it transmits the presence information to the presence server device 1 through the communication unit 24, together with a presence setting command and a presentity ID stored in the temporary storage area 22. Besides, the control unit 20 closes the screen example in FIG. 7 and restores the display to the screen example in FIG. 6.

In a case where the control unit 20 has detected the press of the "cancel" button 208 through the input unit 23, it directly closes the screen example shown in FIG. 7 and restores the display to the screen example in FIG. 6.

Next, there will be described processes which are respectively executed in the presence server device 1 in compliance with the presence subscription request command transmitted from any of the watcher terminal devices 3a, 3b, 3c, 3d, . . . and the presence setting command transmitted from the presence terminal device 2 as stated above.

Figure 8:
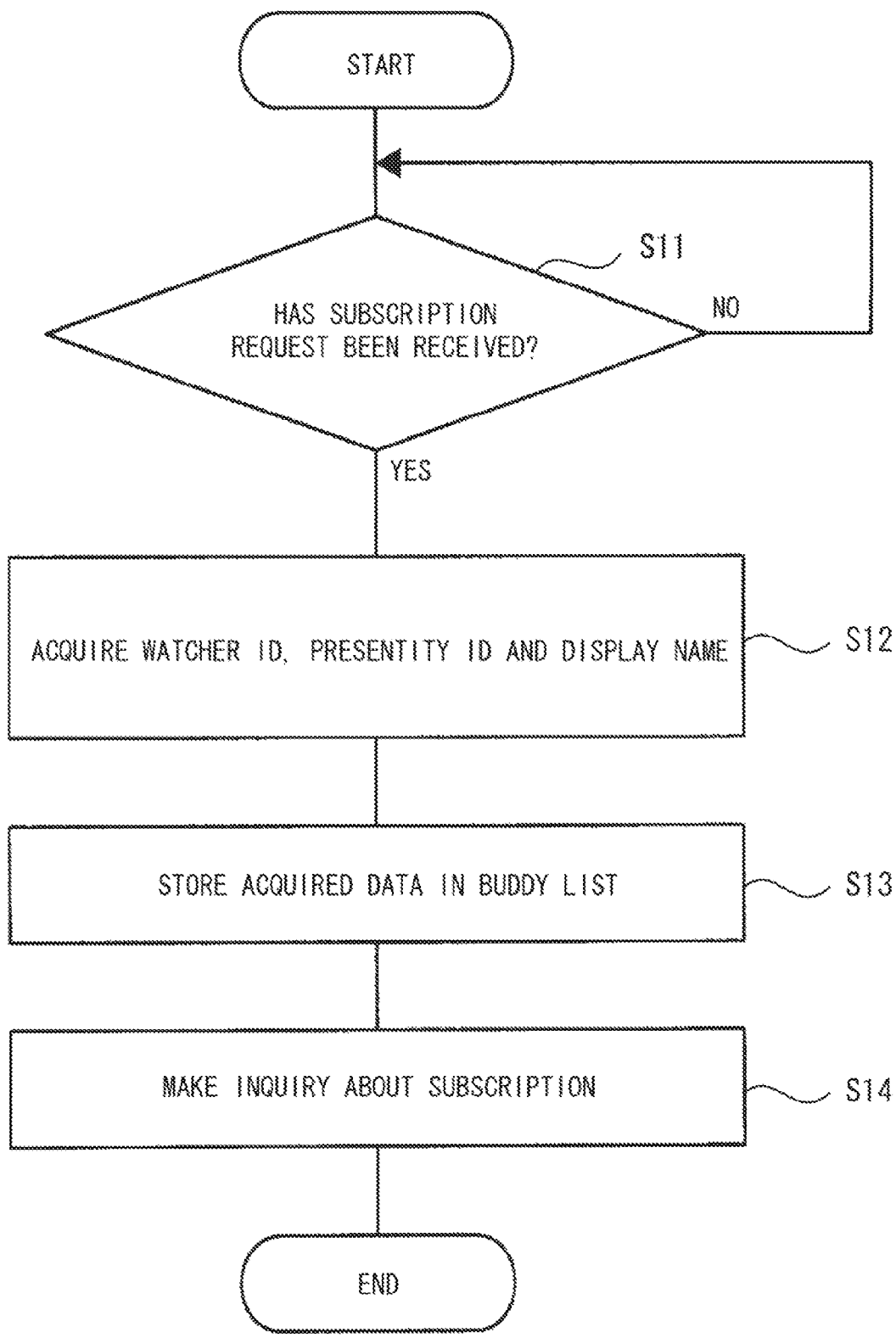
FIG. 8 depicts a processing procedure in the case where a control unit of a presence server device has received a subscription request according to an example of an embodiment of the present invention.

FIG. 8 is a flow chart showing an example of a processing procedure in the case where the control unit 10 of the presence server device 1 has received a subscription request.

The control unit 10 judges whether or not the subscription request has been received, depending upon whether or not the presence subscription request command has been received from any of the watcher terminal devices 3a, 3b, 3c, 3d, . . . by the communication unit 13 (step S11). Subject to the judgment that the subscription request has not been received (S11: NO), the control unit 10 returns the processing to the step S11.

Subject to the judgment that the subscription request has been received (S11: YES), the control unit 10 acquires a watcher ID, a presentity ID and a display name which are transmitted together with the presence subscription request command (step S12). Subsequently, the control unit 10 stores the acquired watcher ID, presentity ID and display name in the buddy list of the storage unit 11 (step S13), and it executes a process for making an inquiry about the propriety of a subscription to the presence terminal device 2 which corresponds to the presentity ID (step S14).

By the way, in the inquiry process for the propriety of the subscription at the step S14, the control unit 10 transmits the watcher ID of a watcher who has made the request for the presence subscription, together with a presence subscription propriety inquiry command. In addition, the control unit 10 ends the process in the case where the presence subscription request command has been received.

FIG. 9 depicts the content example of a buddy list which is stored in the storage unit 11 of the presence server device 1 in Embodiment 1.

The buddy list is a list where the presentity IDs of presentities having presence information items are mapped to which watchers identified by individual watcher IDs subscribe are stored for the respective watcher IDs.

In the example shown in the explanatory diagram of FIG. 9, it is indicated that the watcher specified by the watcher ID "user1" subscribes to the presence information items specified by the presentity IDs "user5" and "user6". In FIG. 9, it is indicated that the watcher of the watcher ID "user2" subscribes to the presence information items of the presentity IDs "user7" and "user8". Further, it is indicated that the watcher specified by the watcher ID "user3" subscribes to the presence information specified by the presentity ID "user7". Presentity names corresponding to the respective presentity IDs are associated as display names.

Furthermore, an item "existence of handover" is further contained in the buddy list shown in the explanatory diagram of FIG. 9. The "existence of handover" indicates whether or not a notification destination is handed over from another watcher (yes: under handover) for the reason that the other watcher is in a state where he/she cannot accept the presence information as will be described below. It should be recognized in the content example shown in the explanatory diagram of FIG. 9 that none of the watchers has the notification destination handed over from the other watcher.

Figure 10:
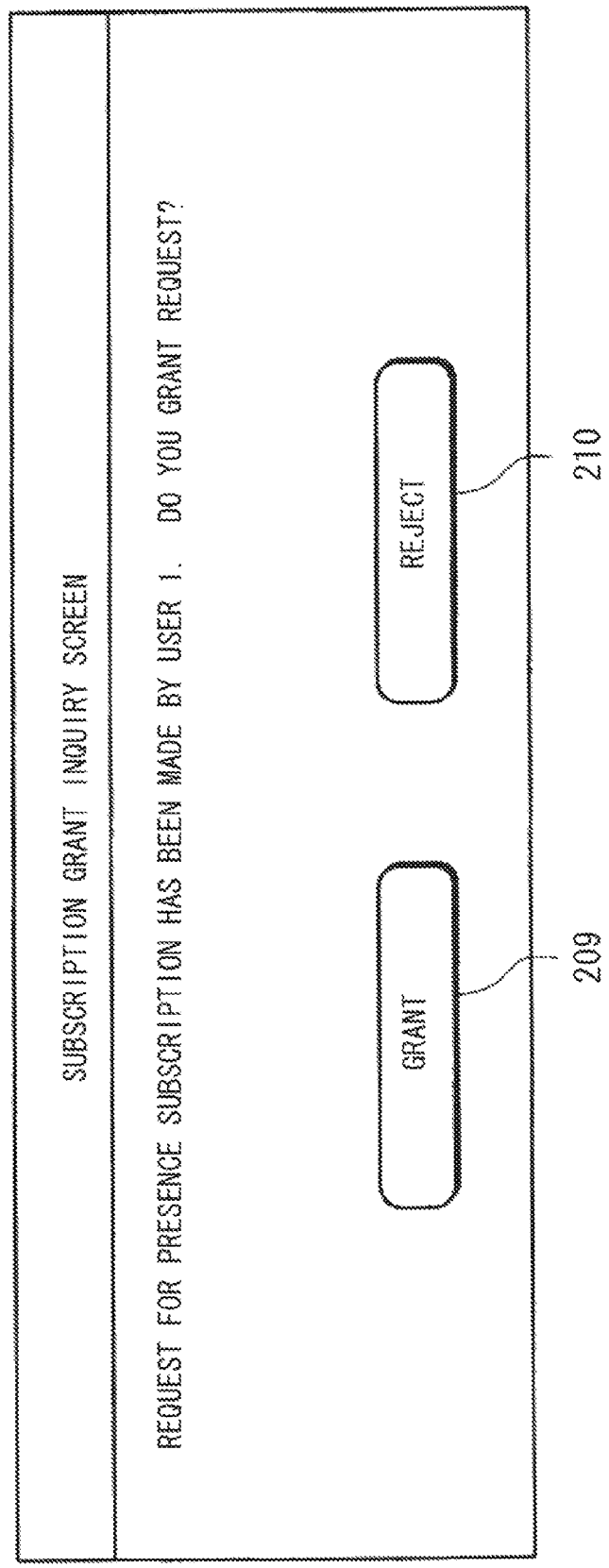
FIG. 10 depicts a screen example which is displayed through a display unit at a response to an inquiry about the propriety of a subscription in a presence terminal device according to an example of an embodiment of the present invention.

FIG. 10 depicts a screen example which is displayed through the display unit 25 at a response to an inquiry about the propriety of a subscription in the presence terminal device 2.

In a case where the control unit 20 of the presence terminal device 2 has received by the communication unit 24, a presence subscription propriety inquiry command and a watcher ID which have been transmitted by the control unit 10 of the presence server device 1, it displays through the display unit 25, a presence subscription propriety inquiry screen as shown by the screen example in FIG. 10. In the screen example in FIG. 10, there are displayed a "grant" button 209 which is utilized in case of giving a grant for the inquiry about the subscription propriety, and a "reject" button 210 which is utilized in case of giving a rejection.

Besides, in the screen example in FIG. 10, there is displayed a message which asks the propriety by indicating a watcher ID ("user1") that has been received together with the presence subscription propriety inquiry command by the control unit 20 of the presence terminal device 2. A care-receiver (or care assistant) can respond to the inquiry about the subscription propriety by performing the manipulation of pressing the "grant" button 209 or the "reject" button 210.

In a case where the care-receiver (or care assistant) has pressed the "grant" button 209 by employing the input device connected to the control unit 20 through the input unit 23, the control unit 20 detects the press, and it transmits the content "grant" of the response, the presentity ID of the care-receiver (or care assistant) and the watcher ID of a watcher to whom the subscription request is granted, to the presence server device 1 by the communication unit 24, together with a presence subscription response command.

In a case where the care-receiver (or care assistant) has pressed the "reject" button 210 by employing the input device connected to the control unit 20 through the input unit 23, the control unit 20 detects the press, and it transmits the "rejection" of the response, the presentity ID of the care-receiver (or care assistant) and the watcher ID of a watcher to whom the subscription request is rejected, to the presence server device 1 by the communication unit 24, together with a presence subscription response command.

In both the case where the "grant" button 209 has been pressed and the case where the "reject" button 210 has been pressed, the presence subscription propriety inquiry screen shown by the screen example in FIG. 10 is closed.

Figure 11:
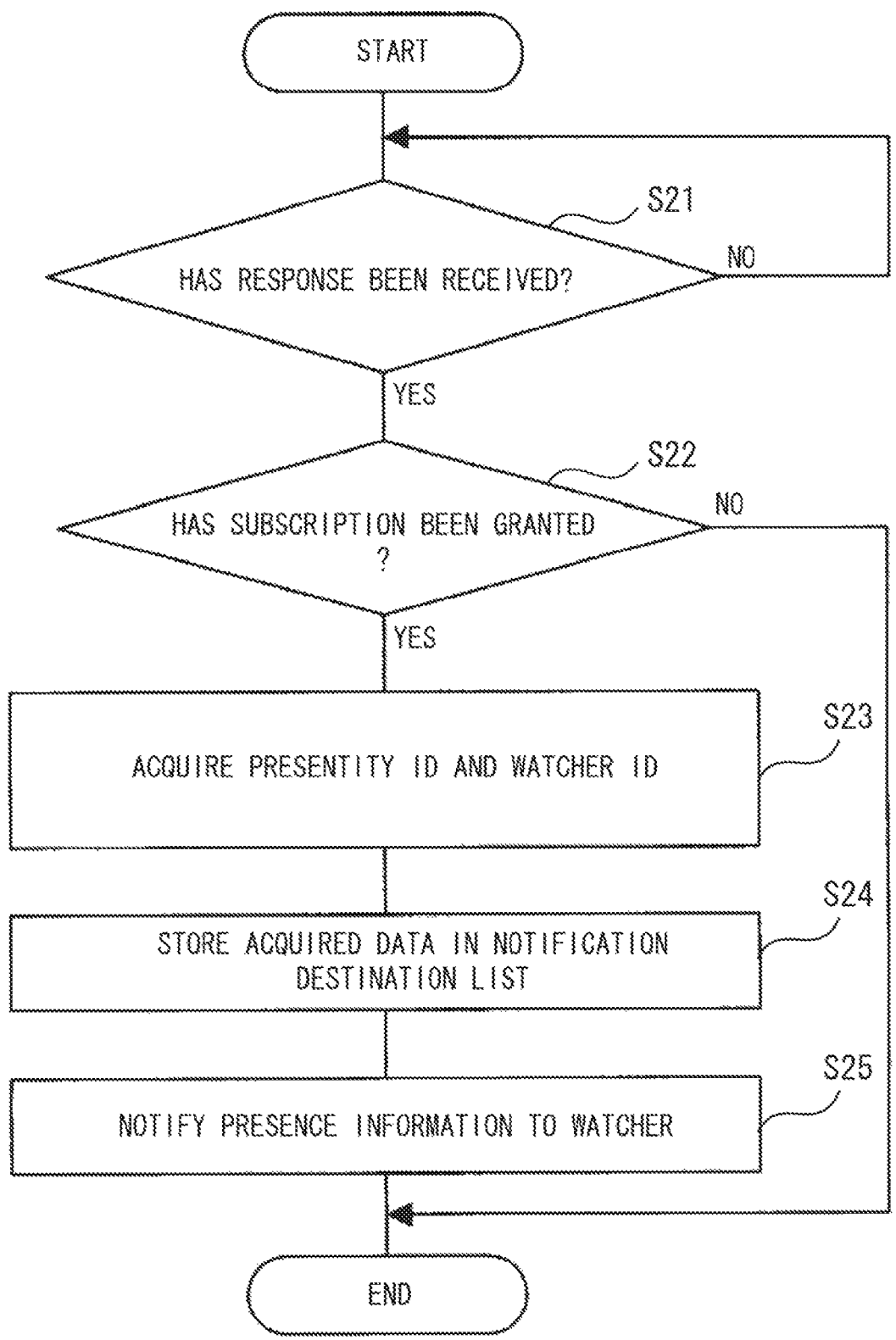
FIG. 11 depicts a processing procedure in the case where a control unit of a presence server device has received a response to an inquiry about the propriety of a subscription according to an example of an embodiment of the present invention.

FIG. 11 is a flow chart showing an example of a processing procedure in the case where the control unit 10 of the presence server device 1 has received a response to an inquiry about the propriety of a subscription.

The control unit 10 judges whether or not the response has been received, depending upon whether or not a presence subscription response command transmitted from the presence terminal device 2 has been received by the communication unit 13 (step S21). Subject to the judgment that the response has not been received (S21: NO), the control unit 10 returns the processing to the step S21, and it waits till the judgment that the response has been received.

Subject to the judgment that the response has been received (S21: YES), the control unit 10 acquires the content of the response as transmitted together with the presence subscription response command, so as to judge whether a subscription request has been granted or rejected (step S22).

In a case where the control unit 10 has judged the rejection from the content of the acquired response (S22: NO), it ends the processing in the case where the response to the inquiry about the subscription propriety has been received.

Incidentally, on this occasion, the control unit 10 may well notify to the effect that the subscription request has been rejected, to one of the watcher terminal devices 3a, 3b, 3c, 3d, . . . as is a subscription request source.

In a case where the control unit 10 has judged the grant from the content of the acquired response (S22: YES), it acquires a presentity ID and a watcher ID which have been transmitted together with the presence subscription response command (step S23).

The control unit 10 stores the acquired presentity ID and watcher ID in a notification destination list (step S24), it provides presence information to one of the watcher terminal devices 3a, 3b, 3c, 3d, . . . as corresponds to the watcher ID acquired at the step S23 (step S25), and it ends the process in the case where the response to the inquiry about the subscription propriety has been received.

FIG. 12 depicts a content example of a notification destination list which is stored in the storage unit 11 of the presence server device 1 in Embodiment 1.

The notification destination list is a list where presentity IDs for identifying individual presentities, the contents of the newest presence information items, and the watcher IDs of watchers to whom the notifications of the presence information items have been granted are stored for the respective presentities.

In the content example shown in the explanatory diagram of FIG. 12, it is indicated that the newest presence information of a care-receiver specified by the presentity ID "user5" is the request content; "TOMORROW, PLEASE RENDER BATHING SERVICE", and that the notification destination of the pertinent presence information is the watcher specified by the watcher ID "user1".

Accordingly, the presence information of the care-receiver of the presentity ID "user5" ought to be notified to the watcher terminal device 3a which the corresponding watcher uses.

Likewise, it is indicated that the notification destination of the presence information specified by the presentity ID "user6" is the watcher specified by the watcher ID "user1", that the notification destinations of the presence information specified by the presentity ID "user7" are the watchers specified by the watcher IDs "user2" and "user3", and that the notification destination of the presence information specified by the presentity ID "user8" is the watcher specified by the watcher ID "user2".

Incidentally, an item "handover source watcher ID" is further contained in the notification destination list shown in the explanatory diagram of FIG. 12.

The "handover source watcher ID" is information for identifying the watcher of the original notification destination (handover source) in a case where a notification destination has been altered and handed over to another watcher as will be stated below.

Since the "handover source watcher ID" is stored in association in the notification destination list, it is indicated that the watcher being the present notification destination is the notification destination under the handover, and the control unit 10 can recognize the watcher ID of the handover source in case of returning the presence information to the notification destination before being altered.

Next, there will be described a process for judging which of the watcher terminal devices 3a, 3b, 3c, 3d, . . . is to be notified to, on the basis of the notification destination list in the storage unit 11 shown in the explanatory diagram of FIG. 12, in a case where presence information has been notified from any of the presence terminal devices 2, 2, . . . .

Figure 13:
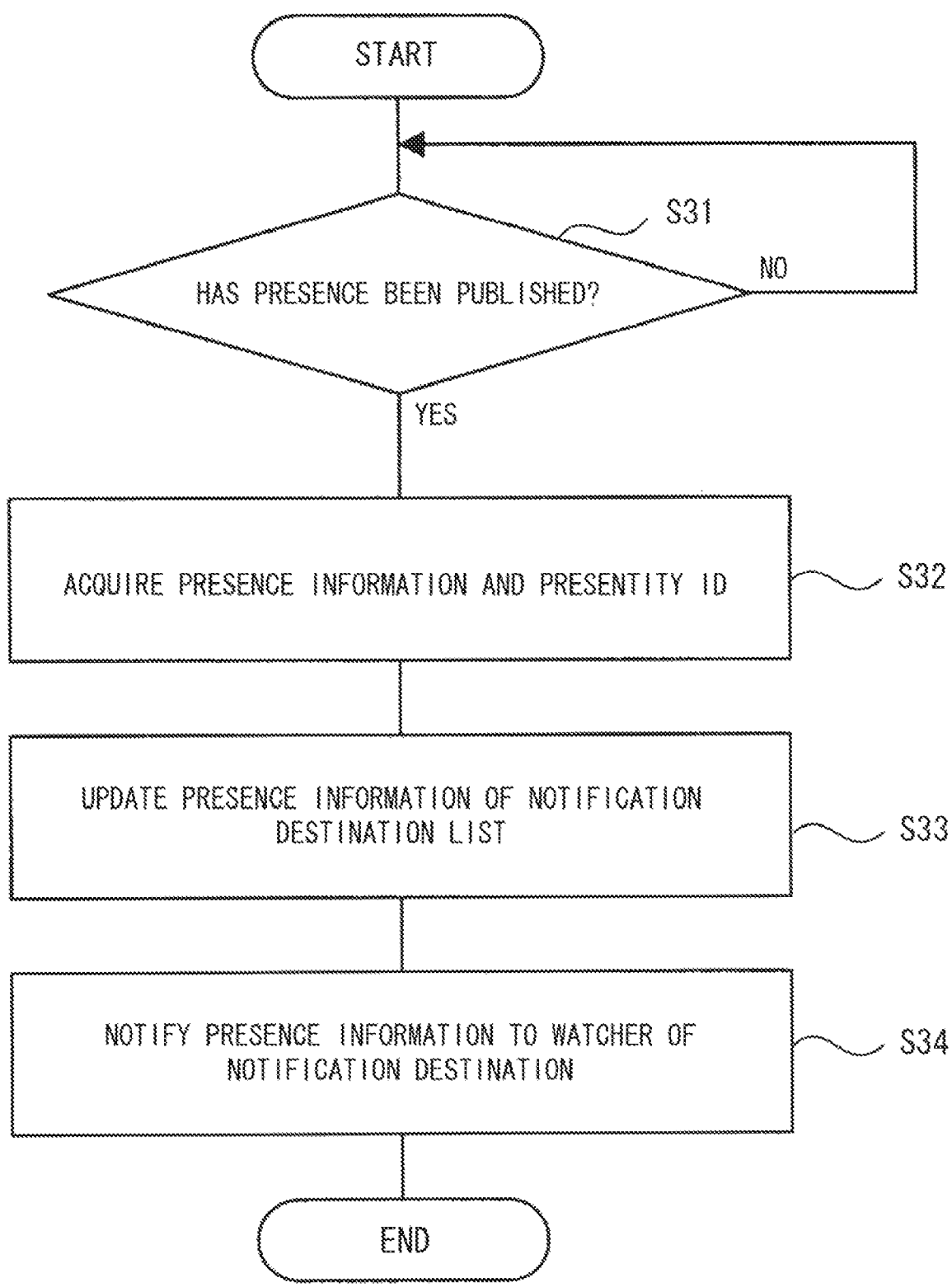
FIG. 13 depicts a processing procedure by a control unit of a presence server device, in the case where presence information has been notified by a presence terminal device according to an example of an embodiment of the present invention.

FIG. 13 is a flow chart showing an example of a processing procedure by the control unit 10 of the presence server device 1, in the case where the presence information has been notified by any of the presence terminal devices 2, 2, . . . .

The control unit 10 judges whether or not the presence information has been published, depending upon whether or not a presence setting command transmitted from the presence terminal device 2 has been received by the communication unit 13 (step S31). Subject to the judgment that the presence information has not been published (S31: NO), the control unit 10 returns the processing to the step S31, and it waits till the judgment that the presence information has been published. Subject to the judgment that the presence information has been published (S31: YES), the control unit 10 acquires the presence information and a presentity ID content which have been transmitted together with the presence setting command (step S32).

The control unit 10 updates the presence information of the notification destination list on the basis of the acquired presence information (step S33), it provides the presence information to any of the watcher terminal devices 3a, 3b, 3c, 3d, . . . as corresponds to a watcher ID stored in the notification destination list (step S34), and it ends the process in the case where the presence information has been notified.

In this manner, in accordance with the presence subscription requests from the watchers, the presentity IDs of the presentities whose presence information items are subscribed to by the respective watchers are stored in the buddy list of the presence server device 1, and the inquiries about the proprieties of the subscriptions for the respective watchers are made. Besides, the notification destinations granted for the respective presentities are stored in the notification destination list of the presence server device 1 on the basis of the responses to the inquiries.

Each time the control unit 10 accepts the publication of the presence information, the presence server device 1 stores the newest presence information in the notification destination list, and it provides the presence information to any of the watcher terminal devices 3a, 3b, 3c, 3d, . . . as is the granted notification destination stored in the notification destination list.

Owing to the care support system which utilizes the presence system as described above, the helper (watcher ID "user1") who is in charge of the care-receiver specified by the presentity ID "user5", for example, can confirm the request content and newest state of the care-receiver (presentity) specified by the presentity ID "user5", in real time. Here, in some cases, the helper specified by the watcher ID "user1" falls into a state where he/she does not accept the presence information. In such a case, the request content and state of the care-receiver specified by the presentity ID "user5" should be monitored by another helper (watcher ID "user2"), the manager (watcher IDs "user3" and "user4"), or the like.

Next, there will be described a process in which, in the case where the helper specified by the watcher ID "user1" is in the state in which he/she does not accept the presence information, and so the control unit 10 of the presence server device 1 automatically alters the notification destination, whereby the notification destination of the presence information as specified by the presentity ID "user5" is handed over to another watcher.

First, there will be described information which serves as a criterion at the time when the control unit 10 of the presence server device 1 decides whether or not the alteration of the notification destination is required.

The control unit 10 accepts the presence information items of individual watchers. That is, the respective watchers are also presentities. In a case, for example, where a presence application program for helpers has been run by the control unit 30 of any of the watcher terminal devices 3a, 3b, 3c, 3d, . . . and where the connection thereof with the presence server device 1 has been established, presence information which indicates "being present" is published by the control unit 30.

Besides, in a case where the "quit" (end) button 305 of the screen shown in the explanatory diagram of FIG. 3 is pressed so as to disconnect the connection with the presence server device 1, presence information which indicates "being absent" is published by the control unit 30 of any of the watcher terminal devices 3a, 3b, 3c, 3d, . . . .

In addition, the control unit 30 accepts the setting of presence information such as "being present", "being absent", "being under business trip" or "being busy", by the watcher. In a case where the helper presence application program is started or quitted (ended) or where the setting of the presence information by the watcher has been accepted, the control unit 30 transmits the presence information and watcher ID of the watcher to the presence server device 1 by the communication unit 13, together with a presence setting command.

FIG. 14 is depicts a content example of presence information items which are published from the watcher terminal devices 3a, 3b, 3c, 3d, . . . .

In the content example shown of FIG. 14, it is indicated that a watcher specified by a watcher ID "user1" is "present", that a watcher specified by a watcher ID "user2" is "under a business trip", and that a watcher specified by a watcher ID "user3" is "present", but that a watcher specified by a watcher ID "user4" is "busy".

These presence information items are stored in a notification destination list in which the respective watchers are presentities, and they are notified to the respective watcher terminal devices 3a, 3b, 3c, 3d, . . . by the presence server device 1. Thus, the presence information items can be monitored one another among the watchers. The control unit 10 of the presence server device 1 decides whether or not an alteration is required, in the light of alteration conditions corresponding to the presence information items of the respective watchers.

FIG. 15 depicts a content example of alteration conditions which are stored in the storage unit 11 of the presence server device.

As shown in FIG. 15, presence information items indicating statuses where notification destinations are to be altered are associated with the respective watcher IDs (which are also presentity IDs in this case) of individual watchers as the alteration conditions. There, the presence information whose notification destination is the watcher of the watcher ID "user1" ought to have this notification destination altered in a case where the presence information of the watcher is "absent" or "under a business trip".

Likewise in FIG. 15, it is indicated that the presence information whose notification destination is the watcher specified by the watcher ID "user2" ought to have this notification destination altered in a case where the presence information of the watcher is "absent", that the presence information whose notification destination is the watcher specified by the watcher ID "user3" ought to have this notification destination altered in a case where the presence information of the watcher is "absent", "busy" or "under a business trip", and that the presence information whose notification destination is the watcher specified by the watcher ID "user4" ought to have this notification destination altered in a case where the presence information of the watcher is "absent".

In a case where the control unit 10 of the presence server device 1 has decided that the alteration is required, in the light of the alteration condition, it extracts and determines a handover destination candidate. For example, the control unit 10 refers to the attribute list of the individual watchers as a criterion for extracting a handover candidate.

FIG. 16 depicts a content example of the attribute list of watchers as stored in the storage unit 11 of the presence server device 1.

In the content example shown in the explanatory diagram of FIG. 16, it is indicated that the attributes of the watcher specified by a watcher ID "user1" and the watcher specified by a watcher ID "user2" are "persons in charge of Section-1, Department-A".

Besides, it is indicated that the attribute of the watcher specified by a watcher ID "user3" is the "chief of Section-1, Department-A", and that the attribute of the watcher specified by a watcher ID "user4" is the "chief of Department-A".

The control unit 10 creates a handover destination candidate list by referring to the attribute list of the individual watchers.

The control unit 10 determines a handover destination candidate on the basis of the created handover destination candidate list.

In case of creating the handover destination candidate list, the control unit 10 may well create the list in such a way that the watchers are ranked as handover destinations by reference to a buddy list and on the basis of the number of the presence subscriptions of the watchers being the individual handover destination candidates, or the number of the notification destinations handed over from the other watchers, and that the watcher of the highest rank becomes the head.

Besides, the control unit 10 may bestow a higher rank on the watcher having the attribute of a manager, on the basis of the attribute list, or it may well store priority levels at which the watchers are determined as the handover destinations, in association with the individual watchers in the attribute list of the respective watchers, so as to rank the watchers as the handover destinations on the basis of the priority levels.

Subsequently, the control unit 10 of the presence server device 1 refers to the alteration condition in accordance with the presence information of each watcher, and it decides whether or not the alteration of the notification destination is required. In a case where the alteration is required, the control unit 10 determines the next notification destination candidate and makes an inquiry.

Figure 17:
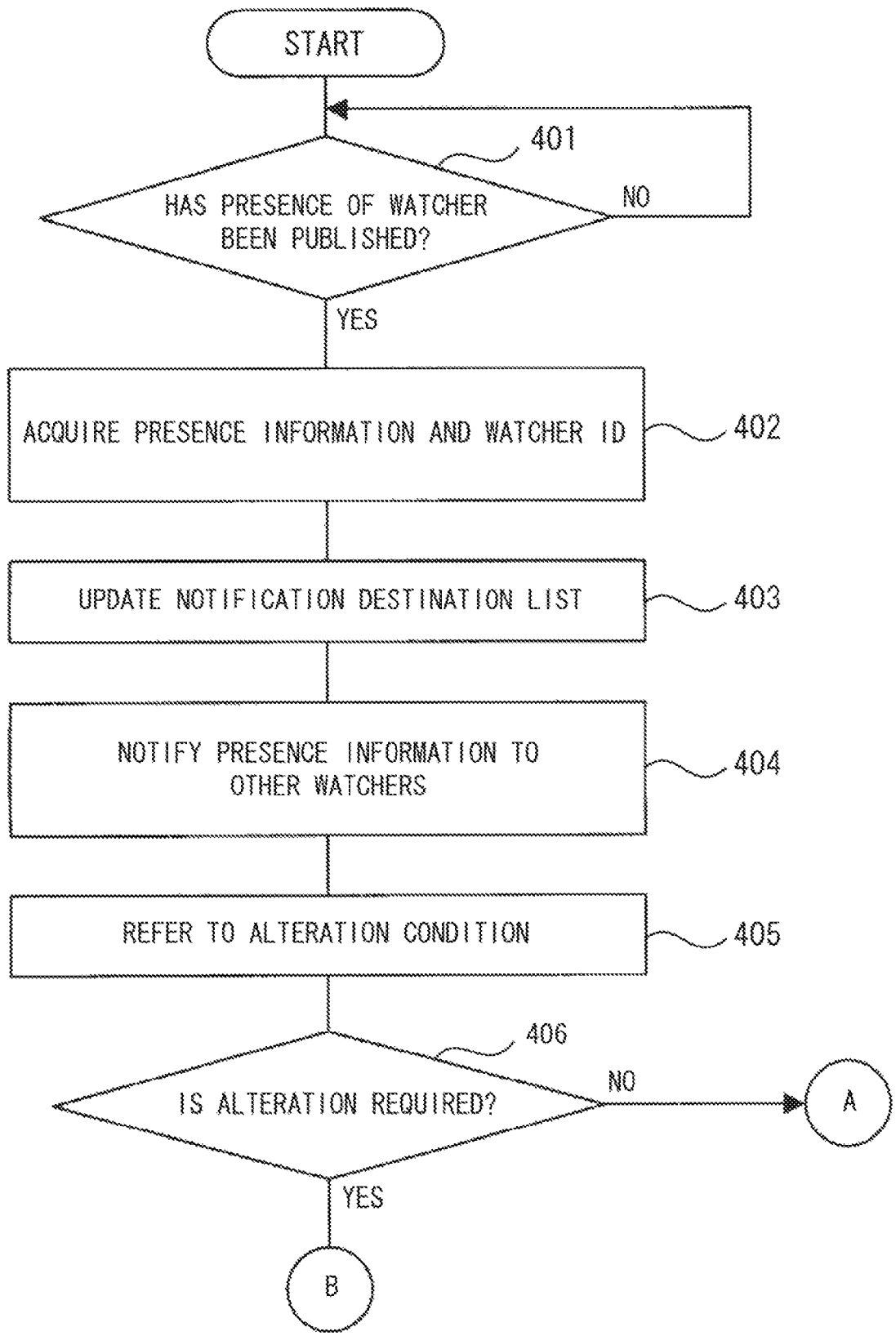
FIG. 17 depicts a processing procedure in which a control unit of a presence server device decides whether or not an alteration of a notification destination is required, according to an example of an embodiment of the present invention.
Figure 18:
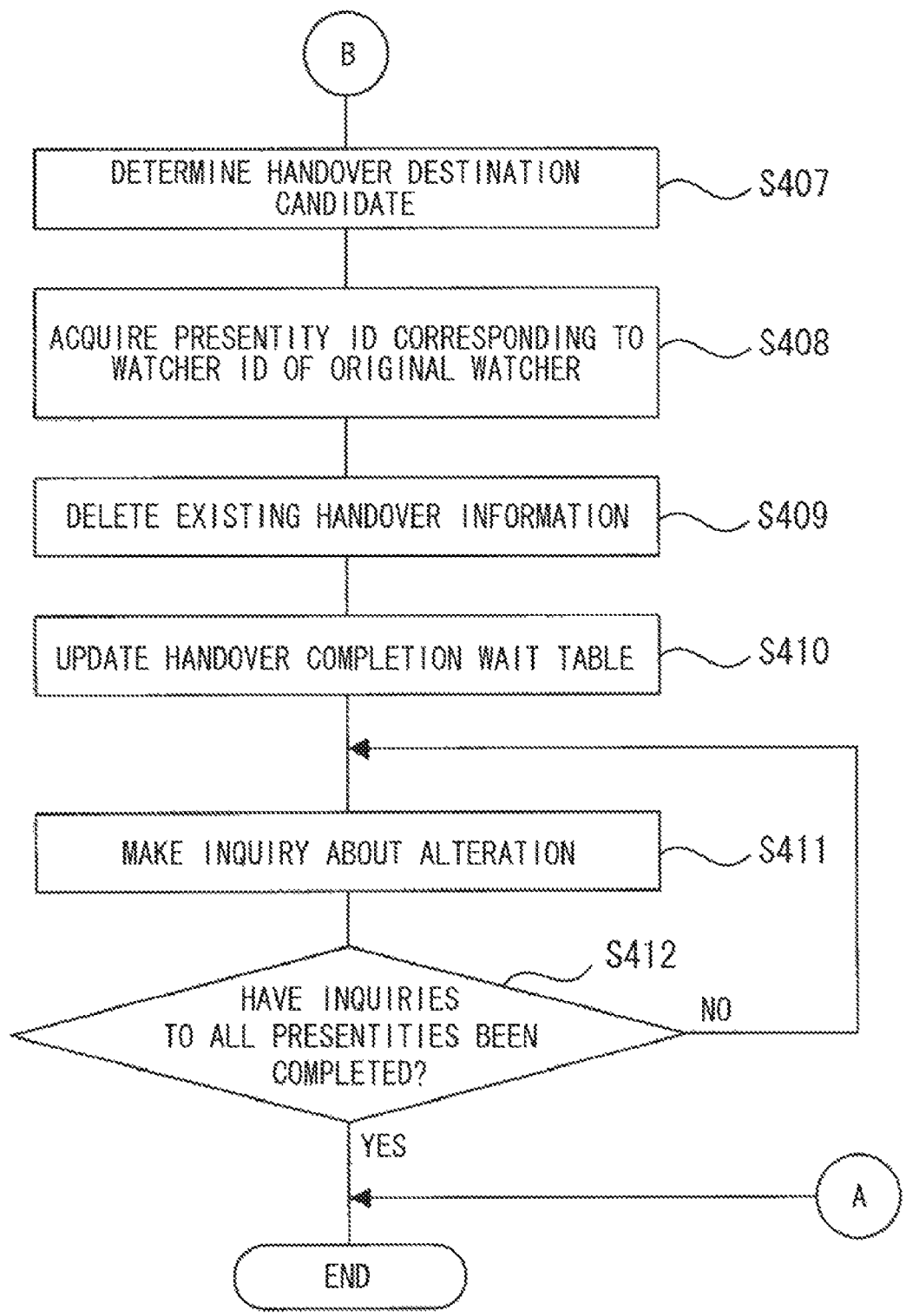
FIG. 18 depicts a processing procedure in which a control unit of a presence server device decides whether or not the alteration of the notification destination is required, according to an example of an embodiment of the present invention.

FIGS. 17 and 18 are examples of a processing procedure in which the control unit 10 of the presence server device 1

The control unit 10 judges whether or not the presence information of a watcher has been published, depending upon whether or not a presence setting command has been received from any of the watcher terminal devices 3a, 3b, 3c, 3d, . . . (step S401).

Subject to the judgment that the presence information of any watcher has not been published (S401: NO), the control unit 10 returns the processing to the step S401, and it waits till the judgment that the presence information of any watcher has been published.

Subject to the judgment that the presence information of any watcher has been published (S401: YES), the control unit 10 acquires the presence information and watcher ID of any watcher as have been transmitted together with the presence setting command (step S402).

The control unit 10 updates a notification destination list in which the watcher is a presentity, on the basis of the acquired presence information and watcher ID (step S403), and it provides the presence information to the watcher terminal devices 3a, 3b, 3c, 3d, . . . which the other watchers use (step S404).

Subsequently, the control unit 10 refers to an alteration condition in the storage unit 11 (step S405), and it decides whether or not the alteration is required, by comparing the acquired presence information of the watcher and the alteration condition (step S406).

In a case where the control unit 10 has decided that the alteration is not required, at the step S406 (S406: NO), it ends the process for deciding whether or not the alteration is required.

In this case, that notification of the presence information of a care-receiver whose notification destination is the pertinent watcher is continued.

In a case where the control unit 10 has decided that the alteration is required, at the step S406 (S406: YES), it determines a handover destination candidate by referring to a handover destination candidate list (step S407).

On this occasion, the control unit 10 determines as the handover destination candidate, the head watcher in the handover destination candidate list which has been created by referring to an attribute list.

Incidentally, it is also allowed that all watchers in the handover destination candidate list are determined as handover destination candidates, and that the care-receiver being a presentity makes an inquiry to-be-stated-later so as to select any of the plurality of handover destination candidates.

Subsequently, the control unit 10 acquires from a buddy list and the notification destination list, the presentity ID of the presence information whose notification destination is the watcher that has been decided to require the alteration, or the presentity ID of the presence information whose notification destination is the watcher of a handover source in a case where the pertinent watcher is the handover destination of the other watcher (step S408).

In the case where the watcher decided to require the alteration has handed over the notification destination of the other watcher, the control unit 10 deletes the existing handover information items concerned (the pertinent information in the buddy list, the notification destination list, and a handover completion wait table) (step S409).

The control unit 10 creates or updates the handover completion wait table which contains the watcher ID of the watcher decided to require the alteration, the handover destination candidate determined at the step S407, and the presentity ID acquired at the step S408 (step S410).

The handover wait completion table is a table which is stored in the temporary storage area 12 until the inquiry to be discussed below is completed.

Subsequently, the control unit 10 inquires of the presence terminal device 2 corresponding to the presentity ID acquired at the step S408, about the propriety of the alteration of the notification destination from the watcher decided to require the alteration, to the watcher of the handover destination candidate determined at the step S407 (step S411).

The inquiry processing at the step S411 is executed in such a way that the control unit 10 transmits the watcher ID and watcher name of the handover source and the watcher ID and watcher name of the handover destination candidate together with an alteration propriety inquiry command, to the pertinent presence terminal device 2.

Incidentally, on this occasion, the attribute information of the watcher may well be simultaneously transmitted.

Besides, in the case where the plurality of handover destination candidates have been determined and where an inquiry is made so as to select any of them, the control unit 10 transmits the watcher IDs and watcher names of the respective handover destination candidates.

The control unit 10 judges whether or not the inquiries to the presence terminal devices 2 corresponding to all the presentity IDs acquired at the step S408 have been completed (step S412).

In a case where the control unit 10 has judged that the inquiries to the presence terminal devices 2 corresponding to all the presentity IDs have not been completed (S412: NO), it returns the processing to the step S411 so as to make the inquiry to the presence terminal device 2 corresponding to the other presentity ID (S411).

In a case where the control unit 10 has judged that the inquiries to the presence terminal devices 2 corresponding to all the presentity IDs have been completed (S412: YES), it ends the process for deciding whether or not the alteration of the notification destination is required.

In this manner, owing to the processing procedure shown in the flow charts of FIGS. 17 and 18, whether or not the alteration is required is automatically decided in accordance with the state of each individual watcher.

Accordingly, each individual watcher need not perform the manipulation of designating the watcher of a handover destination from any of the watcher terminal devices 3a, 3b, 3c, 3d, . . . and transmitting an alteration request.

Next, the contents of the handover completion wait table which is stored, and the inquiry processing in the presence terminal device 2 which proceeds, in the case where whether or not the alteration is required has been decided to require the alteration, by the processing procedure shown in the flow charts of FIGS. 17 and 18, will be described by mentioning a practicable example.

The practicable example is a case where the presence information of a watcher specified by a watcher ID "user1" as had been the notification destination of presence information specified by a presentity ID "user5" has become "absent".

In a case where a presence application program for helpers has been ended in the watcher terminal device 3a which the watcher specified by the watcher ID "user1" uses, this watcher terminal device 3a transmits a presence setting command, the presence information "absent" and the watcher ID "user1" to the presence server device 1.

In accordance with the reception of the above transmission message from the watcher terminal device 3a, the control unit 10 of the presence server device 1 judges that the presence information of the watcher has been published (S401: YES). Since the acquired presence information is "absent" and agrees with an alteration condition, the control unit 10 decides that the alteration is required (S406: YES).

The control unit 10 of the presence server device 1 creates the list of handover destination candidates from the attribute list of watchers.

In this case, an attribute specified by the watcher ID "user1" is a "person in charge of Section-1, Department-A". Therefore, the control unit 10 extracts the watcher IDs "user3" and "user4" of the watcher who is the manager of the same section, and the watcher ID "user2" of the watcher who is a colleague, and it creates the handover destination candidate list in the order extracted.

The control unit 10 acquires the presence information of the watcher specified by the watcher ID "user3" at the head of the created handover destination candidate list. Since the presence information is "present", the control unit 10 judges that the presence information does not agree with any of alteration conditions "absent", "busy" and "under a business trip".

Accordingly, the control unit 10 determines the watcher specified by the watcher ID "user3", as the handover destination candidate (S407). The control unit 10 refers to a buddy list and a notification destination list.

There is no existing handover information concerning the watcher specified by the watcher ID "user3" determined as the handover destination candidate. Therefore, the control unit 10 acquires from the buddy list, the presentity IDs "user5" and "user6" of the presence information items whose notification destinations are the watcher specified by the watcher ID "user1" as has been decided to require the alteration (S408).

The control unit 10 creates the handover completion wait table which contains the watcher ID "user1" of the watcher decided to require the alteration, the watcher ID "user3" of the watcher determined as the handover destination candidate, and the acquired presentity IDs "user5" and "user6".

FIG. 19 depicts a content example of a handover completion wait table which is stored by the control unit 10 of the presence server device 1 in Embodiment 1.

As shown in the explanatory diagram of FIG. 19, the handover completion wait table contains the watcher ID of a handover source watcher decided to require an alteration, by the control unit 10 of the presence server device 1, the watcher ID of a watcher determined as a handover destination candidate, and an acquired presentity ID.

After the control unit 10 has stored the handover completion wait table, it performs inquiry processing to the presence terminal device 2 which corresponds to the presentity ID "user5".

On this occasion, the control unit 10 transmits an alteration propriety inquiry command, the watcher ID "user1" and watcher name "user1" of the watcher being the handover source, and the watcher ID "user3" and watcher name "user3" of the watcher being the handover destination candidate, to the presence terminal device 2.

Further, the control unit 10 performs inquiry processing to the presence terminal device 2 corresponding to the presentity ID "user6" of another presence information whose notification destination is the watcher decided to require the alteration.

Next, there will be described a process in the case where a response is made in the presence terminal device 2 to the inquiry processing which is executed by the control unit 10 of the presence server device 1.

Figure 20:
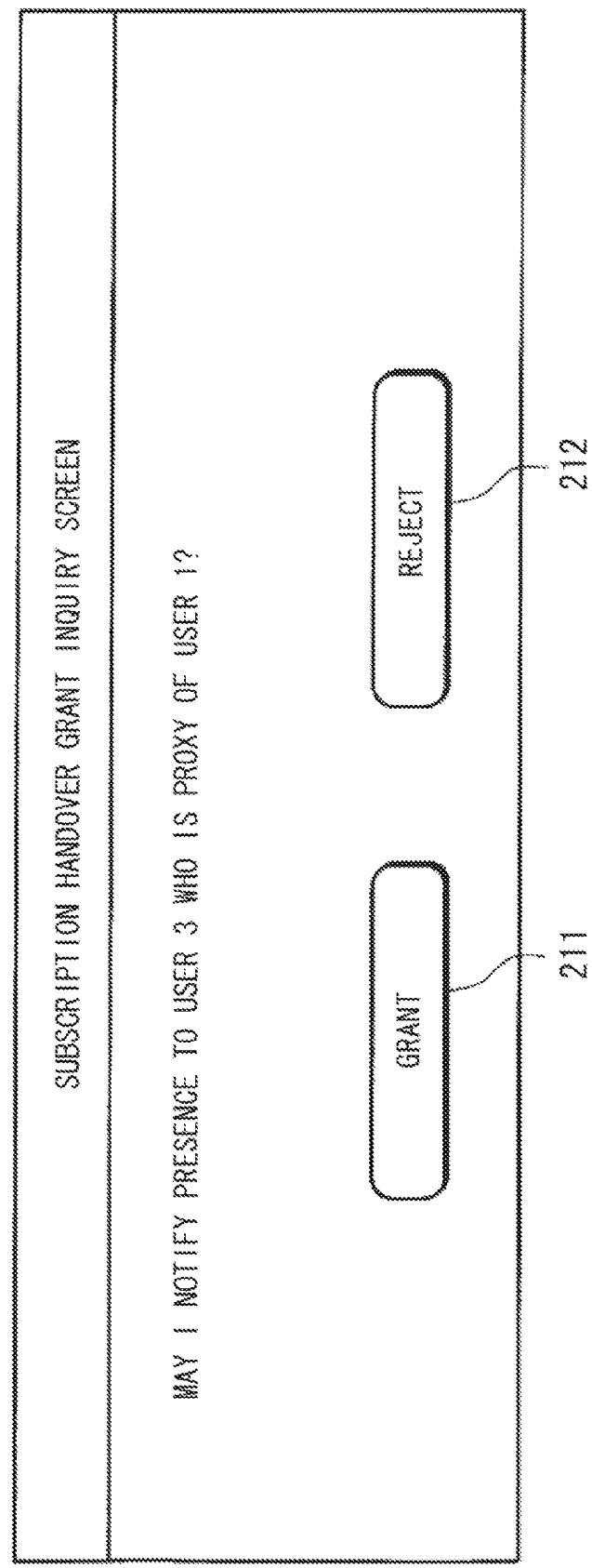
FIG. 20 depicts a screen example which is displayed through a display unit at a response to an alteration propriety inquiry in a presence terminal device according to an example of an embodiment of the present invention.

FIG. 20 depicts a screen example which is displayed through the display unit 25 at a response to an alteration propriety inquiry in the presence terminal device 2.

In a case where the control unit 20 of the presence terminal device 2 has received by the communication unit 23, an alteration propriety inquiry command which has been transmitted by the control unit 10 of the presence server device 1, it displays through the display unit 25, the alteration propriety inquiry screen as described below.

In the screen example in FIG. 20, there are displayed a "grant" button 211 which is utilized in case of giving a grant to the alteration propriety inquiry, and a "reject" button 212 which is utilized in case of giving a rejection.

Besides, in the display example in FIG. 20, there is displayed a message which asks the propriety of the alteration by indicating the watcher name ("user1") of a watcher who a handover source and the watcher name ("user3") of a watcher who is a handover destination candidate, and which the control unit 20 of the presence terminal device 2 has received together with the alteration propriety inquiry command.

A care-receiver (or care assistant) can respond to the inquiry about the alteration propriety by performing the manipulation of pressing the "grant" button 211 or the "reject" button 212.

In a case where the care-receiver (or care assistant) has pressed the "grant" button 211 by employing the input device connected to the control unit 20 through the input unit 23, this control unit 20 detects the press, and it transmits the content "grant" of the response, the watcher ID of the watcher being the handover source, and the watcher ID of the watcher being the handover destination candidate, to the presence server device 1 together with an alteration response command.

In a case where the care-receiver (or care assistant) has pressed the "reject" button 212 by employing the input device connected to the control unit 20 through the input unit 23, this control unit 20 detects the press, and it transmits the content "rejection" of the response, the watcher ID of the watcher being the handover source, and the watcher ID of the watcher being the handover destination candidate, to the presence server device 1 together with an alteration response command.

In both the case where the "grant" button 211 has been pressed and the case where the "reject" button 212 has been pressed, the alteration propriety inquiry screen shown in the screen example in FIG. 20 is closed.

Figure 21:
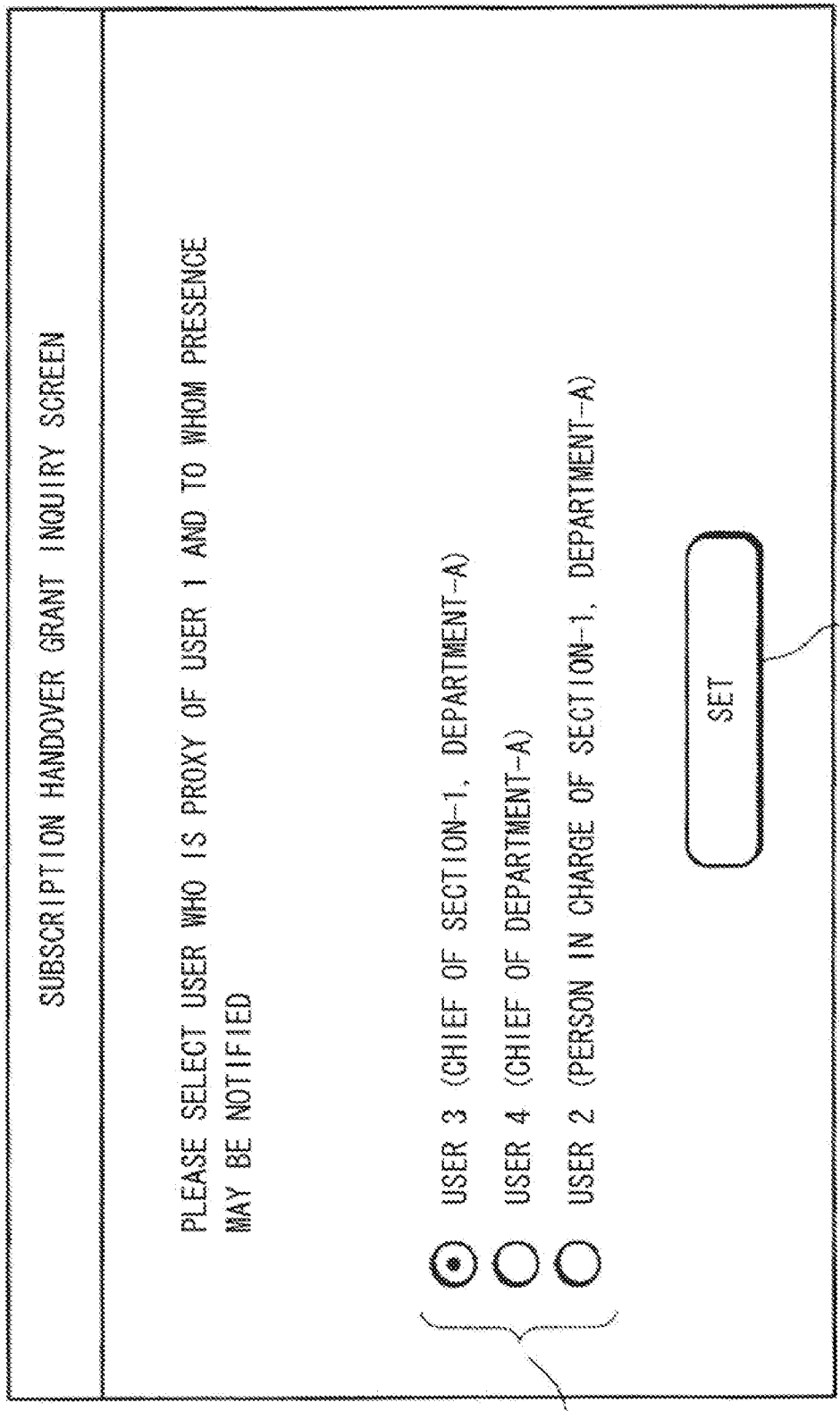
FIG. 21 depicts a screen example which is displayed through a display unit at a response to an alteration propriety inquiry in a presence terminal device according to an example of an embodiment of the present invention.

By the way, in a case where a plurality of handover destination candidates have been extracted and where an inquiry is made so as to select any of the plurality of handover candidates, an alteration propriety inquiry screen as shown in the next explanatory diagram of FIG. 21 is displayed through the display unit 25 of the presence terminal device 2.

FIG. 21 is the explanatory diagram showing a screen example which is displayed through the display unit 25 at a response to an alteration propriety inquiry in the presence terminal device 2.

In the screen example in FIG. 21, there are displayed a radio button 213 for selecting a watcher who is a handover destination candidate, and a "set" button 214 which is utilized in case of setting a watcher who is a handover destination.

Besides, in the screen example in FIG. 21, there is displayed a message which asks the alteration propriety by indicating the watcher name of a watcher who is a handover source and the watcher name of the watcher who is the handover destination candidate, and which the control unit 20 of the presence terminal device 2 has received together with an alteration propriety inquiry command.

In addition, the watcher names of the watchers being the handover destination candidates are displayed as the choices of the radio button 213 of the handover destination candidates, and the attributes of the individual watchers are displayed when they have been transmitted.

The attributes the "chief of Section-1, Department-A", the "chief of Department-A" and a "person in charge of Section-1, Department-A" of the respective watchers are displayed, whereby a care-receiver (or care assistant) can judge which of the watchers is granted as the handover destination, with the attributes as a criterion.

In a case where the care-receiver (or care assistant) has pressed the radio button 213 displayed in association with the watchers, by employing the input device connected to the control unit 20 through the input unit 23, so as to select any of the watchers, and where he/she has thereafter pressed the "set" button 214, the control unit 20 detects the setting, and it acquires the watcher ID of the watcher of the handover destination candidate selected with the radio button 213.

The control unit 20 transmits the content "grant" of the response, the watcher ID of the watcher of the handover source and the acquired watcher ID of the watcher of the handover destination candidate, to the presence server device 1 together with an alteration response command.

Incidentally, it is also allowed that, in a case where the "set" button 214 has been pressed without selecting any choice with the radio button 213, the control unit 20 transmits the content "rejection" of the response, the watcher ID of the watcher of the handover source and the watcher IDs of the watchers of all the handover destination candidates, to the presence server device 1 together with an alteration response command.

In a case where the "set" button 214 has been pressed, the alteration propriety inquiry screen shown by the screen example in FIG. 21 is closed.

Next, there will be described a process in the case where the control unit 10 of the presence server device 1 has received the response to the inquiry from the presence terminal device 2.

Figure 22:
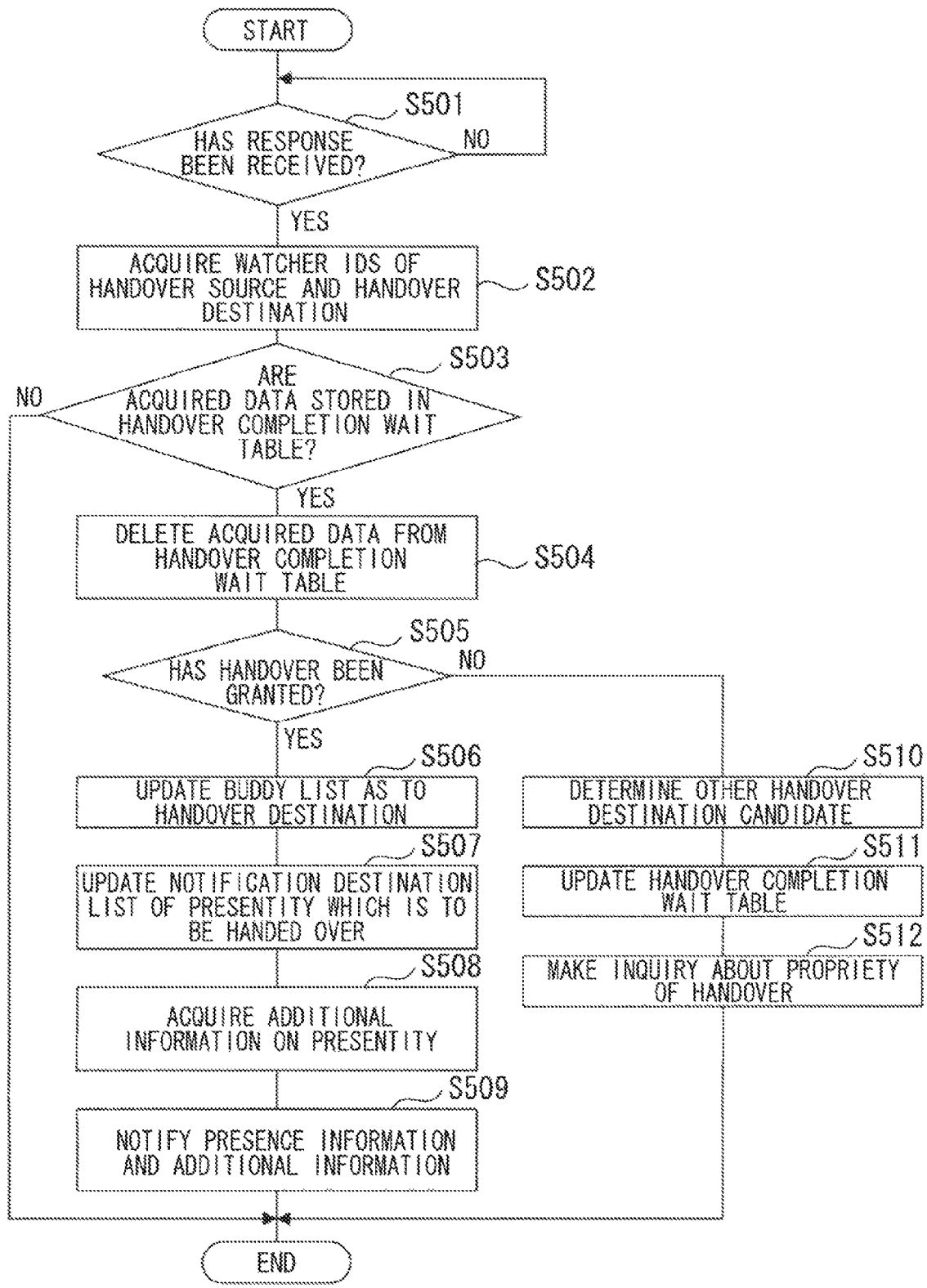
FIG. 22 depicts a processing procedure in a case where a control unit of a presence server device has received a response to an inquiry about alteration propriety, according to an example of an embodiment of the present invention.

FIG. 22 is a flow chart showing an example of a processing procedure in the case where the control unit 10 of the presence server device 1 has received a response to an inquiry about alteration propriety.

The control unit 10 judges whether or not the response to the inquiry about the alteration propriety has been received, depending upon whether or not an alteration response command transmitted from the presence terminal device 2 has been received by the communication unit 13 (step S501).

Subject to the judgment that the response to the inquiry about the alteration propriety has not been received (S501: NO), the control unit 10 returns the processing to the step S501, and it waits till the judgment that the response to the inquiry about the alteration propriety has been received.

Subject to the judgment that the response to the inquiry about the alteration propriety has been received (S501: YES), the control unit 10 acquires the watcher ID of a watcher being a handover source and the watcher ID of a watcher being a handover destination candidate as have been transmitted together with the alteration response command (step S502).

The control unit 10 judges whether or not the watcher ID of the watcher being the handover source and the watcher ID of the watcher being the handover destination candidate as have been acquired at the step S502 are stored in a handover completion wait table, by referring to the handover completion wait table (step S503).

Subject to the judgment that the watcher IDs are not stored in the handover completion wait table (S503: NO), the control unit 10 ends the process because the set of the watcher ID of the watcher being the handover source and the watcher ID of the watcher being the handover destination candidate as have been acquired at the step S502 does not require an alteration.

Subject to the judgment that the watcher IDs are stored in the handover completion wait table (S503: YES), the control unit 10 deletes the corresponding set of the watcher ID of the watcher being the handover source and the watcher ID of the watcher being the handover destination candidate, from the handover completion wait table (step S504).

The control unit 10 judges whether or not the content of the response transmitted together with the alteration response command is "grant" (step S505).

Subject to the judgment that the content is "grant" (S505: YES), the control unit 10 updates a buddy list with the watcher ID of the handover destination candidate as a notification destination after a handover (step S506), and it updates the notification destination list of the presentity ID of presence information which is to be handed over (step S507).

Thus, the notification destination of the presence information is altered and handed over.

Subsequently, the control unit 10 acquires the additional information of a presentity, namely, a care-receiver associated with the presentity ID (step S508).

The control unit 10 provides the additional information acquired at the step S508, to any of the watcher terminal devices 3*a*, 3*b*, 3*c*, 3*d*, . . . as used by the watcher of the notification destination, together with the newest presence information stored in the notification destination list (step S509), and it ends the process in the case where the response has been received.

Subject to the judgment that the handover has been "rejected" at the step S505 (S505: NO), the control unit 10 determines another handover destination candidate (step S510).

On this occasion, the control unit 10 refers to the created handover candidate list and determines the next watcher of the list as the next handover destination candidate.

The control unit 10 updates the handover completion wait table as to the handover destination candidate determined anew (step S511), it inquires of the corresponding presence terminal device 2 about the alteration propriety (step S512), and it ends the process in the case where the response has been received.

In a case where a response has been transmitted to the inquiry concerning the handover destination candidate determined anew, the processing procedure shown in the flow chart of FIG. 22 is similarly executed by the control unit 10.

FIG. 23 depicts a content example in the case where a buddy list in the storage unit 11 of the presence server device 1 has been updated by the alteration of a notification destination.

Incidentally, the content example shown in the explanatory diagram of FIG. 23 illustrates an example in which the content example of the buddy list shown in the explanatory diagram of FIG. 9 has been updated in such a way that the watcher specified by the watcher ID "user1" has become "absent", and that an alteration response command whose content is a "grant" is transmitted from the presence terminal device 2 in accordance with an inquiry about the propriety of an alteration to the watcher specified by the watcher ID "user3".

As shown in the explanatory diagram of FIG. 23, the watcher ID "user3" is added anew as a watcher who subscribes to presence information.

It is indicated that the watcher specified by the watcher ID "user3" hands over the notification destinations of the presence information items of presentity IDs "user5" and "user6".

Regarding the watcher ID "user3", the items "existence of handover" of both the presentity IDs are stored so as to become "yes".

Thus, it is indicated that the subscription to the presence information specified by the presentity ID "user5" or "user6", by the watcher specified by the watcher ID "user3", has handed over the notification destination from either watcher.

FIG. 24 depicts a content example in the case where a notification destination list in the storage unit 11 of the presence server device 1 has been updated by the alteration of a notification destination.

Incidentally, the content example shown in the explanatory diagram of FIG. 24 illustrates an example in the case where, in the content example of the notification destination list shown in the explanatory diagram of FIG. 12, the notification destinations of the presence information items specified by the presentity IDs "user5" and "user6" have been updated from the watcher specified by the watcher ID "user1" to the watcher specified by the watcher ID "user3".

As shown in the explanatory diagram of FIG. 24, the watcher ID "user3" of the watcher being a handover destination is stored in addition to the watcher ID "user1" of the watcher being a handover source, in those entries of the notification destination list which are associated with the presentity IDs "user5" and "user6".

Besides, "user1" is associated as the handover source watcher ID with the watcher ID "user3" of the watcher being the handover source.

In notifying the presence information of the presentity ID "user5" or "user6", the control unit 10 can recognize that the watcher of the watcher ID "user3" is handing over the notification destination, by referring to the notification destination list of the content example shown in the explanatory diagram of FIG. 24.

In notifying the presence information of the presentity ID "user5" or "user6", the control unit 10 recognizes that the watcher IDs of the watchers being the notification destinations are "user1" and "user3", by referring to the notification destination list of the content example shown in FIG. 24.

Since, however, the watcher ID "user1" agrees with the handover source watcher ID "user1" associated with the entry of the watcher ID "user3", the control unit 10 does not provide the presence information to the watcher terminal device 3a corresponding to the watcher ID "user1".

FIG. 25 depicts a content example of additional information which is stored in the storage unit 11 of the presence server device 1.

In the content example shown in the explanatory diagram of FIG. 25, information indicating the status of a care-receiver is stored as the additional information on the presentity, namely, the care-receiver of presentity ID "user5".

The control unit 10 of the presence server device 1 provides the additional information together with presence information, to the watcher terminal device 3c which is used by the watcher of watcher ID "user3" being a handover destination.

Thus, the watcher of the watcher ID "user3" being the handover destination can appropriately monitor the status of the care-receiver.

Figure 26:
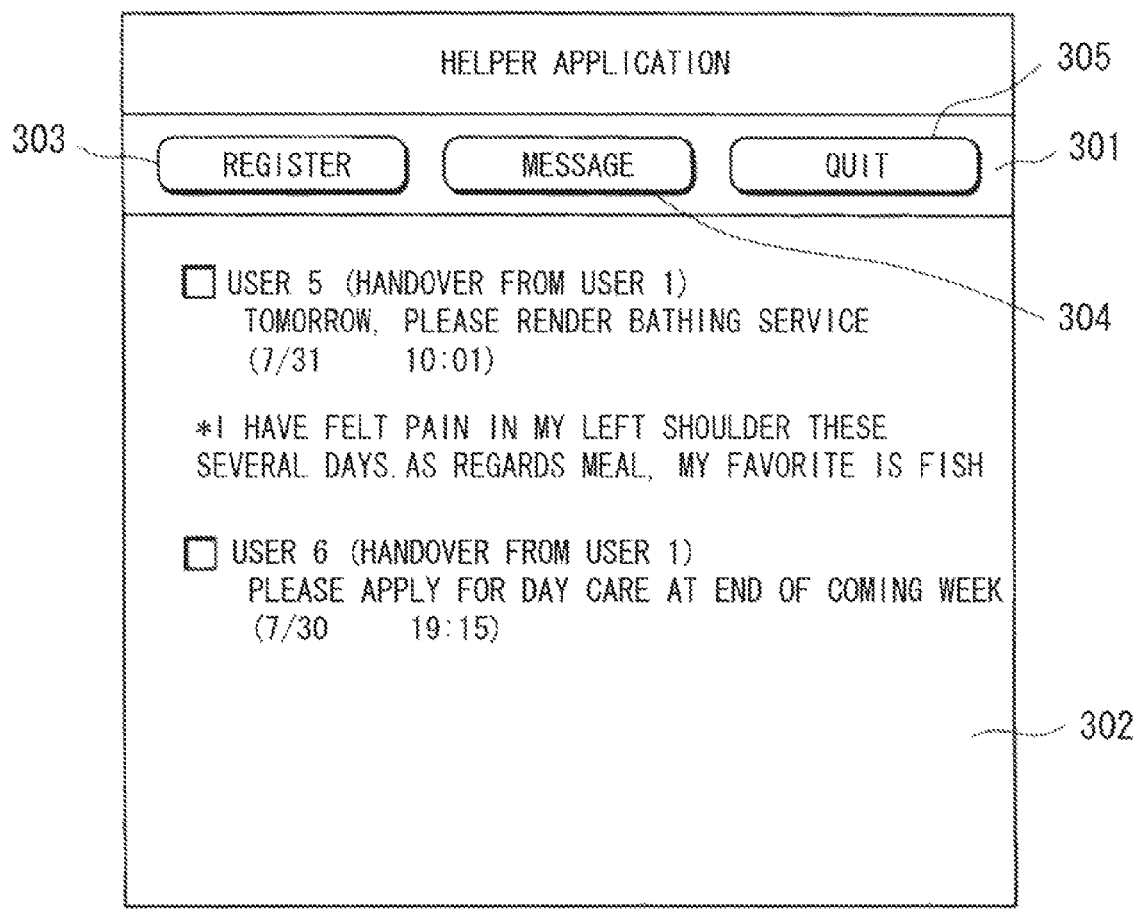
FIG. 26 depicts a screen example which is displayed through a display unit of a watcher terminal device being a handover destination according to an example of an embodiment of the present invention.

FIG. 26 depicts a screen example which is displayed through the display unit 35 of the watcher terminal device 3c being a handover destination.

In a case where the control unit 30 of any of the watcher terminal devices 3a, 3b, 3c, 3d, . . . has received additional information which is notified together with presence information, it displays the additional information through the display unit 35.

In the screen example in FIG. 26, it is indicated that the additional information is displayed together with the presence information, in a presence information display area 302.

Next, there will be described a case where a service provider (watcher) of watcher ID "user3" being the handover destination has further fallen into a state in which he/she does not accept the notification of the presence information due to absence or the like.

By way of example, the watcher of the watcher ID "user3" sets his/her presence information as "busy" in a screen which is displayed through the display unit 35 of the watcher terminal device 3c that he/she uses.

In this case, the control unit 30 of the watcher terminal device 3c detects the above setting, and it transmits a presence setting command, the presence information "busy" and the watcher ID to the presence server device 1.

The control unit 10 of the presence server device 1 judges that the presence of the watcher has been published, by receiving the presence setting command, and it executes a process for deciding whether or not the alteration of a notification destination is required.

Here, in the case where the watcher of the watcher ID "user3" is "busy", the control unit 10 decides that the alteration is required, by referring to an alteration condition.

In addition, since an watcher ID next to the watcher ID "user3" in a handover destination candidate list is "user4", the control unit 10 determines the watcher of the watcher ID "user4" as a handover destination candidate.

The watcher of the watcher ID "user3" decided to require the alteration has handed over the notification destination from another watcher (watcher ID "user1"). Therefore, the control unit 10 acquires the presentity IDs "user5" and "user6" of presence information items to which the watcher ID "user3" is subscribing in handover.

The control unit 10 deletes from a buddy list, entries in which the items of the "existence of handover" are "yes", within presentities corresponding to the watcher ID "user3".

As shown in the explanatory diagram of FIG. 23, the items of the "existence of handover" are "yes" in both the entries of the presentity IDs "user5" and "user6" corresponding to the watcher ID "user3". Therefore, both the entries are deleted by the control unit 10.

Likewise, the control unit 10 deletes from a notification destination list, the entries of the watcher ID "user3" with which the "handover source watcher ID" ("user1") is associated and which has been set as the notification destinations of the presentity IDs "user5" and "user6".

Subsequently, the control unit 10 executes processes for inquiries about the proprieties of the alterations, for the presence terminal devices 2, 2, . . . corresponding to the presentities of the presence information items to which the watcher ID "user3" decided to require the alteration was subscribing, respectively.

The control unit 10 receives responses to the inquiries, and it updates the buddy list and the notification destination list in accordance with the responses, thereby to alter the notification destinations of the presence information items of the presentity IDs "user5" and "user6".

Incidentally, on this occasion, the control unit 10 makes an inquiry also concerning a presentity ID "user7" to which the watcher ID "user3" decided to require the alteration was subscribing, and it alters the notification destination of the presence information of the presentity ID "user7".

FIG. 27 depicts a content example of a buddy list in the case where a notification destination has been further altered from the watcher terminal device 3c being a handover destination.

In the content example shown in the explanatory diagram of FIG. 27, it is indicated that, regarding a watcher ID "user3", presence subscriptions for presentity IDs "user5" and "user6" as handed over from a watcher of watcher ID "user1" have been deleted.

Further, it is indicated that a watcher of watcher ID "user4" has handed over notification destinations, and that the presence subscriptions of the watcher ID "user4" for the presentity IDs "user5" and "user6" have been added.

Besides, it is indicated that the watcher of the watcher ID "user4" has handed over a notification destination also concerning the presence subscription of the watcher of the watcher ID "user3" for a presentity ID "user7", and that the presence subscription of the watcher ID "user4" for the presentity ID "user7" has been added.

FIG. 28 depicts a content example of a notification destination list in the case where a notification destination has been further altered from the watcher terminal device 3c being a handover destination.

In the content example shown in the explanatory diagram of FIG. 28, it is indicated that the watcher ID "user3" of a watcher which had been a handover destination as the notification destination of a presentity ID "user5" has been deleted, and that a watcher ID "user4" has been stored anew.

Likewise, it is indicated that the watcher ID "user3" of the watcher which had been a handover destination as the notification destination of a presentity ID "user6" has been deleted, and that the watcher ID "user4" has been stored.

Besides, in the content example shown in the explanatory diagram of FIG. 28, it is indicated that the notification destination of that presence information of presentity ID "user7" whose notification destination had been the watcher of the watcher ID "user3" before has been altered to the watcher of the watcher ID "user4".

Thus, the presence information items of the presentity IDs "user5" and "user6" are thereafter notified to the watcher terminal device 3d which the watcher of the watcher ID "user4" uses.

In this way, the notification destination is handed over to any watcher reliably and appropriately.

Next, there will be described the notification of the presence information after the alteration of the notification destination.

Figure 29:
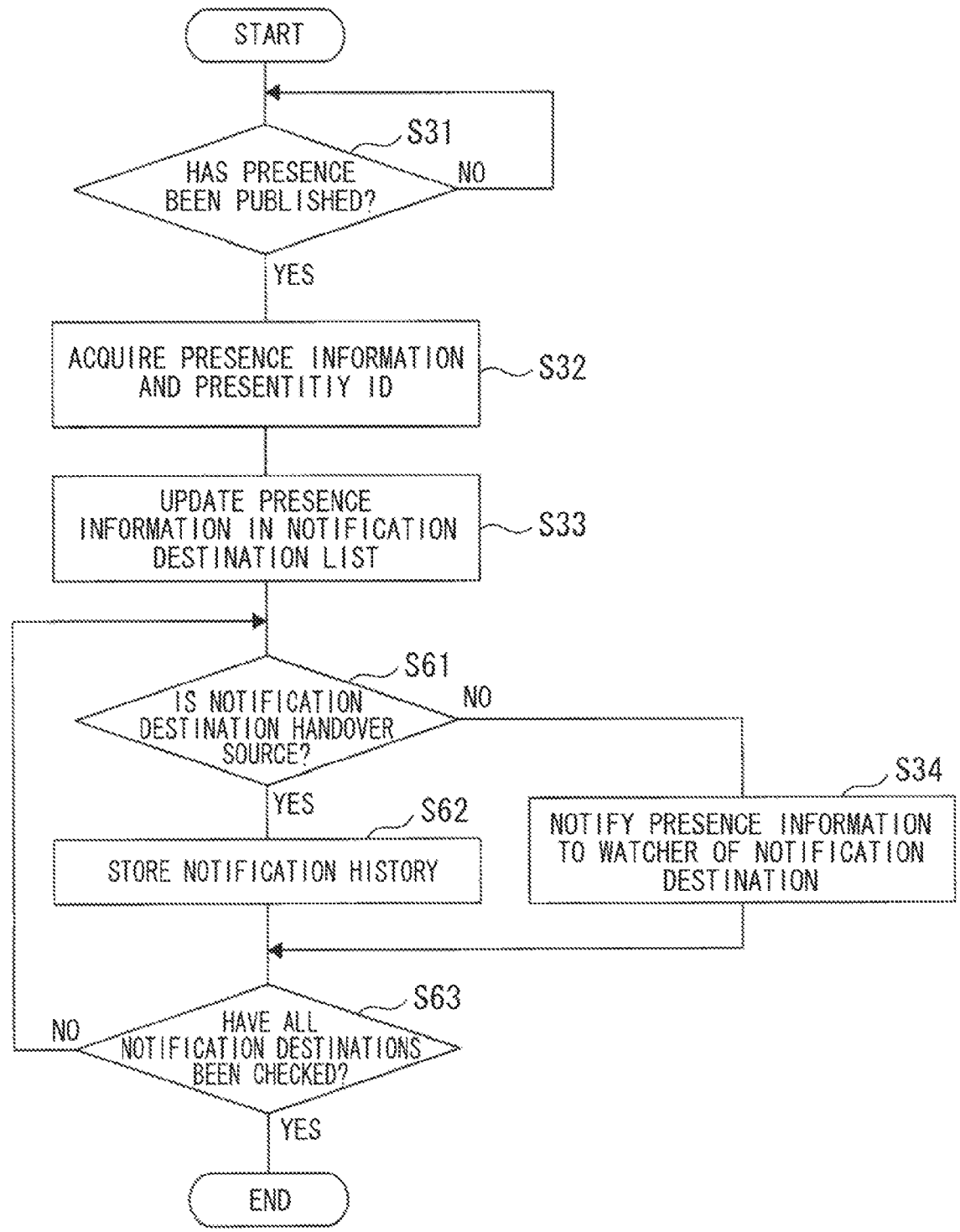
FIG. 29 depicts a processing procedure in the case where presence information has been notified after a control unit of a presence server device had altered a notification destination according to an example of an embodiment of the present invention.

FIG. 29 depicts a processing procedure in the case where presence information has been notified after the control unit 10 of the presence server device 1 had altered a notification destination.

By the way, in the processing procedure shown in the flow chart of FIG. 29, processing steps common to those in the case where presence information has been published, as shown in the flow chart of FIG. 13, are assigned the same step Nos. and shall be omitted from detailed description.

The control unit 10 judges that the presence information has been published (S31: YES), it acquires the presence information and the presentity ID (S32), and it updates the presence information in the notification destination list (S33). Subsequently, the control unit 10 refers to a notification destination list and checks whether or not the watcher ID of the notification destination corresponding to the presentity ID agrees with a handover source watcher ID associated with another notification destination, thereby to judge whether or not the watcher of the notification destination is the watcher of a handover source (step S61).

Subject to the judgment that the watcher of the notification destination is the watcher of the handover source (S61: YES), the control unit 10 stores the presence information, thereby to store the history of notifications to the watcher of a handover destination (step S62), and it judges whether or not all the notification destinations corresponding to the acquired presentity ID have been checked (step S63).

Subject to the judgment that the watcher of the notification destination is not the watcher of the handover source (S61: NO), the control unit 10 provides the presence information to one of the watcher terminal devices 3a, 3b, 3c, 3d, . . . corresponding to the watcher of the pertinent notification destination (S34), and it advances the processing to the step S63.

Subject to the judgment that all the notification destinations corresponding to the presentity ID acquired at the step S32 have not been checked (S63: NO), the control unit 10 returns the processing to the step S61 and checks whether or not the notification destination is the handover source, as to another notification destination (S61).

Subject to the judgment that all the notification destinations have been checked (S63: YES), the control unit 10 ends the process in the case where the presence information has been notified.

FIG. 30 depicts a content example of a notification history which is stored in the storage unit 10 of the presence server device 1.

In FIG. 30, there is shown the notification history of presence information items notified that have been while the notification destination of those presence information items of presentity IDs "user5" and "user6" whose notification destination is a watcher of watcher ID "user1" is being handed over to another watcher.

In the explanatory diagram of FIG. 30, there are illustrated examples of the notification history of those presence information items of presentity IDs "user7" and "user8" whose notification destination is a watcher ID "user2", and the notification history of that presence information of the presentity ID "user7" whose notification destination is a watcher ID "user3".

Even in a case where the notification destination is not being handed over, the notification history may well be stored.

In this manner, each time the presence information is notified to the watcher terminal device which corresponds to the watcher of the handover source, after an alteration, the history of the presence information is stored in association with the watcher ID of the watcher of the handover source.

Thus, in a case where the watcher of the handover source has been restored later into a state in which he/she accepts the presence information, he/she can confirm the history of the presence information notified to another watcher and monitor a state during his/her absence.

Next, there will be described a process in the case where the helper of the handover source (watcher ID "user1") has fallen into a present status again and a state in which he/she receives the presence information.

In a case where the helper of the watcher ID "user1" has started a presence application for helpers, in the watcher terminal device 3a, the control unit 30 runs the helper presence application program, thereby to transmit a presence setting command, presence information "present" and the watcher ID "user1" to the presence server device 1 through the communication unit 13.

There will be described the process which is executed in the presence server device 1 in accordance with the transmission of the above data.

Figure 31:
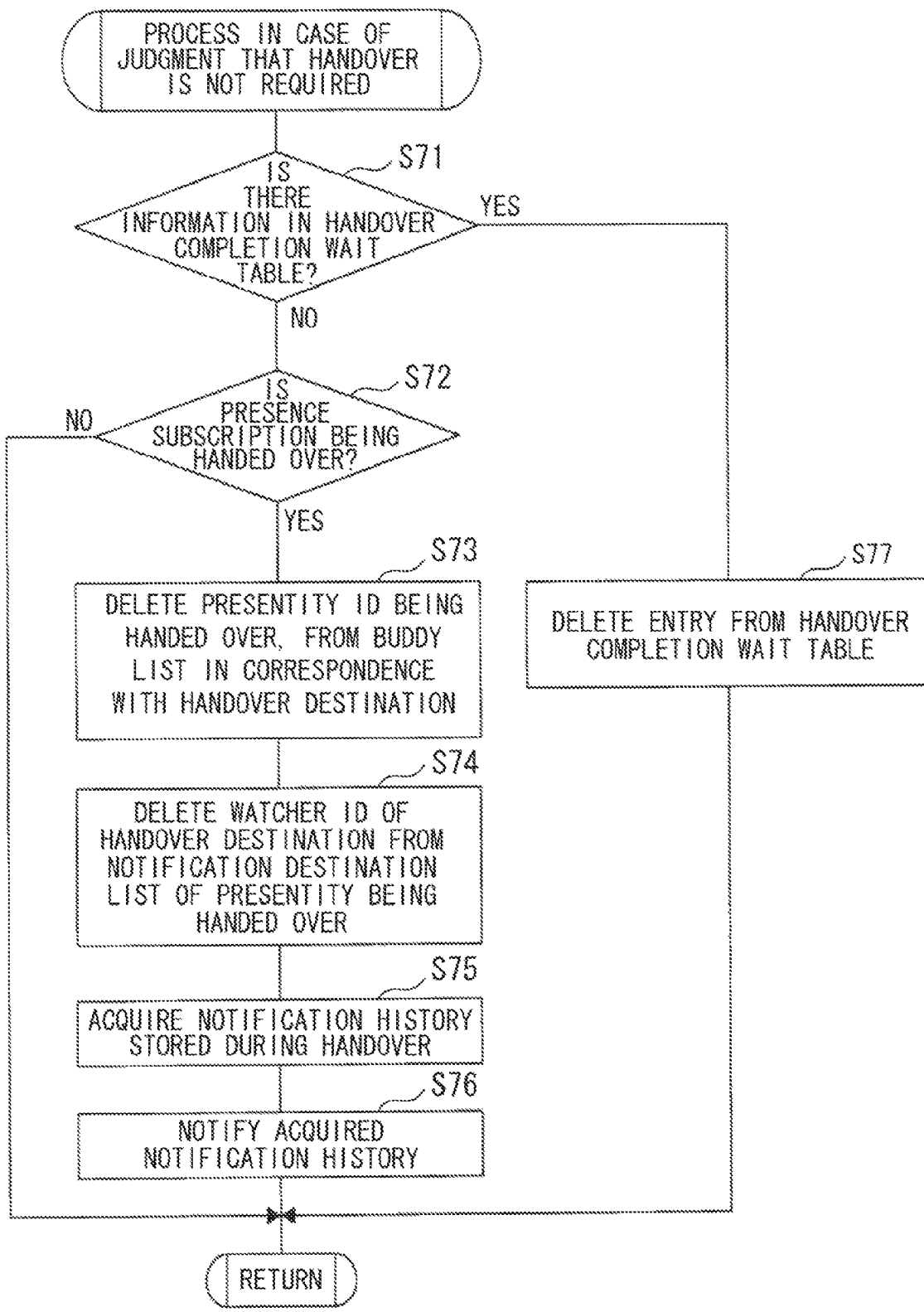
FIG. 31 depicts a processing procedure which is executed by a control unit of a presence server device in the case where a handover source has been restored into a state in which an alteration is not required, according to an example of an embodiment of the present invention.

FIG. 31 depicts a processing procedure which is executed in the case where a handover source has been restored into a state in which an alteration is not required, by the control unit 10 of the presence server device 1.

By the way, in the case where the control unit 10 has decided that the alteration is not required, at the step S406 within the processing procedure shown in the flow charts of FIGS. 17 and 18 (S406: NO), it executes the process shown in the flow chart of FIG. 31, before ending the processing procedure.

The control unit 10 refers to a handover completion wait table stored in the temporary storage area 12, and it judges whether or not there is information in a handover completion wait table, depending upon whether or not there is an entry in which an acquired watcher ID is stored as the watcher ID of the watcher of the handover source, on the basis of the watcher ID (step S71).

Subject to the judgment that there is not any information in the handover completion wait table (S71: NO), the control unit 10 refers to a buddy list and a notification destination list, and it judges whether or not a presence subscription is being handed over from the watcher of the pertinent watcher ID to another watcher (step S72).

Subject to the judgment that the presence subscription is not being handed over (S72: NO), the control unit 10 returns the processing to the processing procedure shown in the flow charts of FIGS. 17 and 18 and ends the process for deciding whether or not the alteration is required.

Subject to the judgment that the presence subscription is being handed over (S72: YES), the control unit 10 deletes from the buddy list, the entry of the presentity ID of presence information which is associated with the watcher ID of the watcher of a handover destination and whose notification destination is being handed over (step S73). Also, the control unit 10 deletes the entry of the watcher ID of the handover destination from the notification destination list of the presentity of the presence information whose notification destination is being handed over (step S74).

Subsequently, the control unit 10 acquires a notification history stored during the handover in association with the watcher ID of the handover source (step S75), it notifies the acquired notification history to the watcher terminal device 3a which corresponds to the watcher ID of the handover source decided not to require the alteration (step S76), and it returns the processing to the processing procedure shown in the flow charts of FIGS. 17 and 18.

Besides, in a case where the control unit 10 has judged at the step S71, that there is the information in the handover completion wait table (S71: YES), it deletes an entry in the handover completion wait table (step S77) because the alteration is not required. Then, the control unit 10 returns the processing to the processing procedure shown in the flow charts of FIGS. 17 and 18, and it ends the process for deciding whether or not the alteration is required.

Thus, in a case where the helper of the watcher ID "user1" has returned into the state in which he/she accepts the notification of the presence information, after or before the completion of the handover, the notification destination of the presence information items of the presentity IDs "user5" and "user6" is returned to the helper of the watcher ID "user1" as was the original notification destination.

By the way, in the transmission processing of the notification history at the step S76 within the processing procedure shown in the flow chart of FIG. 31, the notification history of the content example shown in the explanatory diagram of FIG. 30 is transmitted.

In this manner, according to the care support system, the control unit 10 of the presence server device 1 decides whether or not the alteration of the notification destination is required, automatically on the basis of the presence information of the service provider (watcher). Further, the control unit 1 inquires of the care-receiver (presentity) about the propriety of the alteration, whereby that notification of the presence information to the watcher which is not intended by the care-receiver can be avoided.

Moreover, according to the presence server device 1, once the response has been received to the inquiry about the propriety of the alteration, the grant or rejection indicated by the response is stored, whereby the inquiry is not repeatedly made in the case where the alteration of the notification destination has become necessary as to the same watcher again.

FIG. 32 depicts a content example of an alteration propriety table which is stored in the storage unit 11 of the presence server device 1.

As shown in the explanatory diagram of FIG. 32, in the alteration propriety table, the granted watcher IDs of watchers to whom notifications are granted and the rejected watcher IDs of watchers to whom notifications are rejected are stored in association with respective presentity IDs.

In the content example in FIG. 32, it is indicated that the presence information of a presentity ID "user5" has its notifications granted to watchers of watcher IDs "user1" and "user3", but that it has its notification rejected to a watcher of watcher ID "user2".

Likewise, it is indicated that the presence information of a presentity ID "user6" has its notifications granted to the watcher of the watcher ID "user1" and a watcher of watcher ID "user2", and that the presence information of a presentity ID "user7" has its notification granted to the watcher of the watcher ID "user3".

Figure 33:
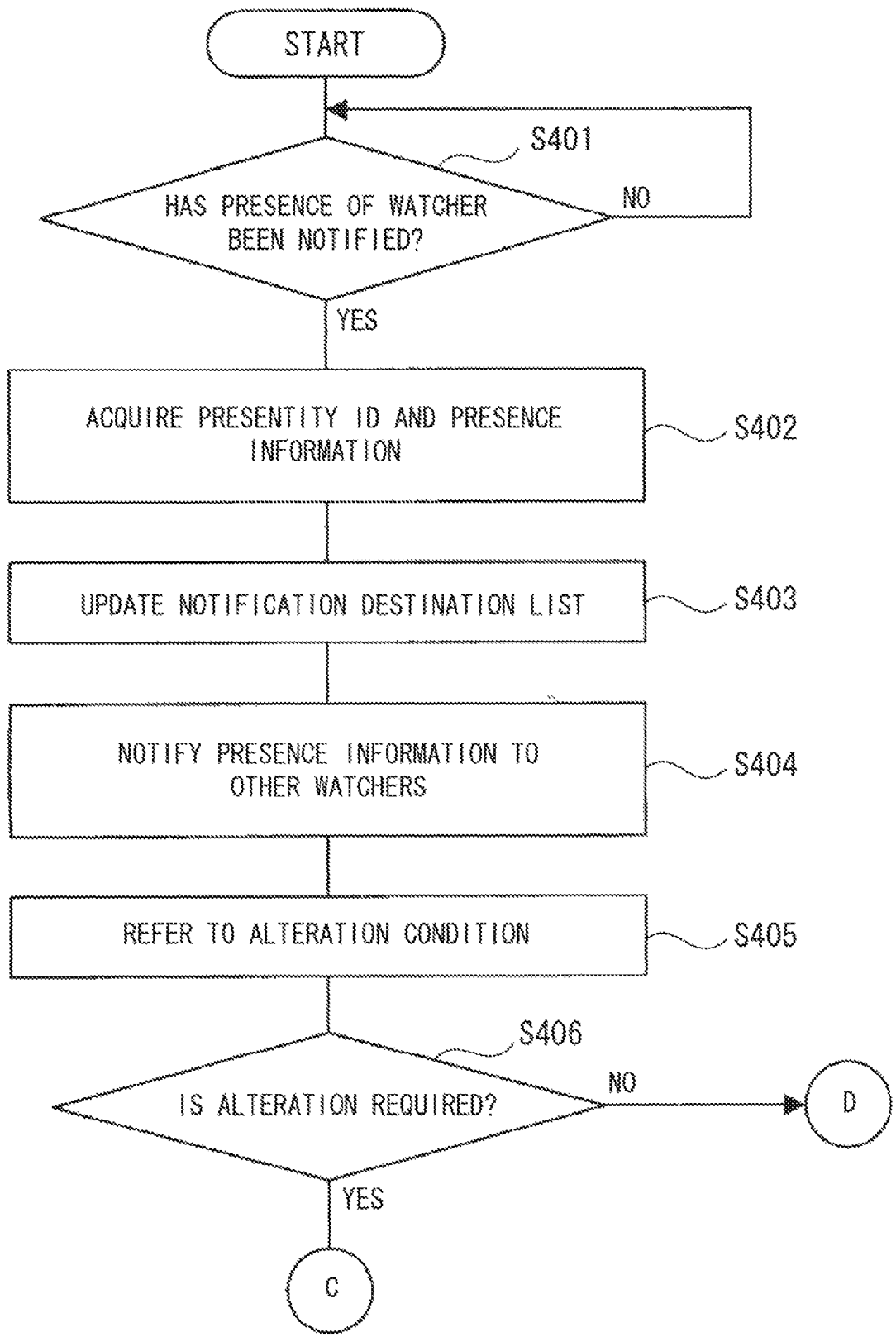
FIG. 33 depicts a processing procedure in which a control unit of a presence server device determines a handover destination candidate on the basis of an alteration propriety table according to an example of an embodiment of the present invention.
Figure 34:
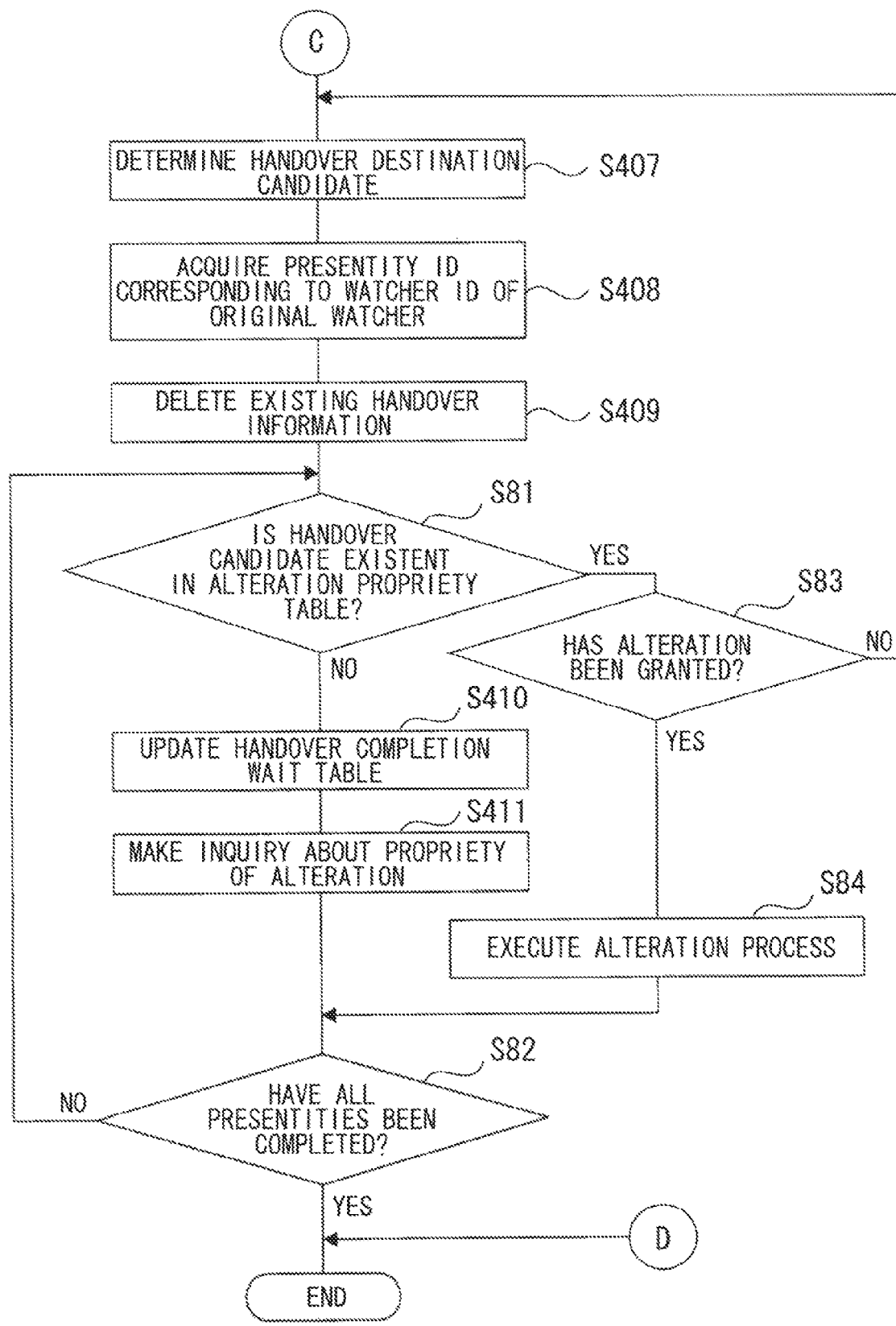
FIG. 34 depicts a processing procedure in which a control unit of a presence server device determines a handover destination candidate on the basis of an alteration propriety table according to an example of an embodiment of the present invention.

FIGS. 33 and 34 are flow charts showing an example of a processing procedure in which the control unit 10 of the presence server device 1 determines a handover destination candidate on the basis of an alteration propriety table.

By the way, in the processing procedure shown in the flow charts of FIGS. 33 and 34, processing steps common to those shown in the flow charts of FIGS. 17 and 18 are assigned the same step Nos. and shall be omitted from detailed description.

The control unit 10 determines the handover destination candidate (S407), and it judges whether or not an alteration propriety for a presentity ID acquired at a step S408 exists in the alteration propriety table, as to the watcher ID of the watcher of the handover destination candidate determined at the step S407 (step S81).

Subject to the judgment that the alteration propriety does not exist in the alteration propriety table (S81: NO), the control unit 10 needs to make an inquiry about the alteration propriety, and hence, it updates a handover completion wait table and executes an inquiry process (S410 and S411). Subsequently, the control unit 10 judges whether or not inquiries or alterations have been completed as to all presentities whose notification destinations are watchers decided to require the alterations (step S82).

In a case where the control unit 10 has judged at the step S81, that the alteration propriety exists in the alteration propriety table (S81: YES), it judges whether or not the alteration has been granted, depending upon whether or not the watcher ID is stored as an alteration grant watcher ID (step S83).

In a case where the control unit 10 has judged that the alteration has been rejected (S83: NO), it returns the processing to the step S407, and it determines another handover destination candidate and executes the later processing.

In a case where the control unit 10 has judged at the step S83, that the alteration has been granted (S83: YES), it executes an alteration process by updating a buddy list and a notification destination list (step S84), and it advances the processing to the step S82.

At the step S84, the control unit 10 may well notify presence information to that one of the watcher terminal devices 3a, 3b, 3c, 3d, ... which the watcher of the granted notification destination uses.

In a case where the control unit 10 has judged at the step S82, that the inquiries or alterations have not been completed as to all the presentities (S82: NO), it returns the processing to the step S81.

In a case where the control unit 10 has judged that the inquiries or alterations have been completed as to all the presentities whose notification destinations of the presence information are the watchers decided to require the alterations (S82: YES), it ends the process for deciding whether or not the alterations are required, and determining the handover destination candidates, on the basis of the alteration propriety table.

Next, there will be described a process in which the control unit 10 creates and updates the alteration propriety table that is referred to as stated above, in accordance with a response to the inquiry about the alteration propriety.

Figure 35:
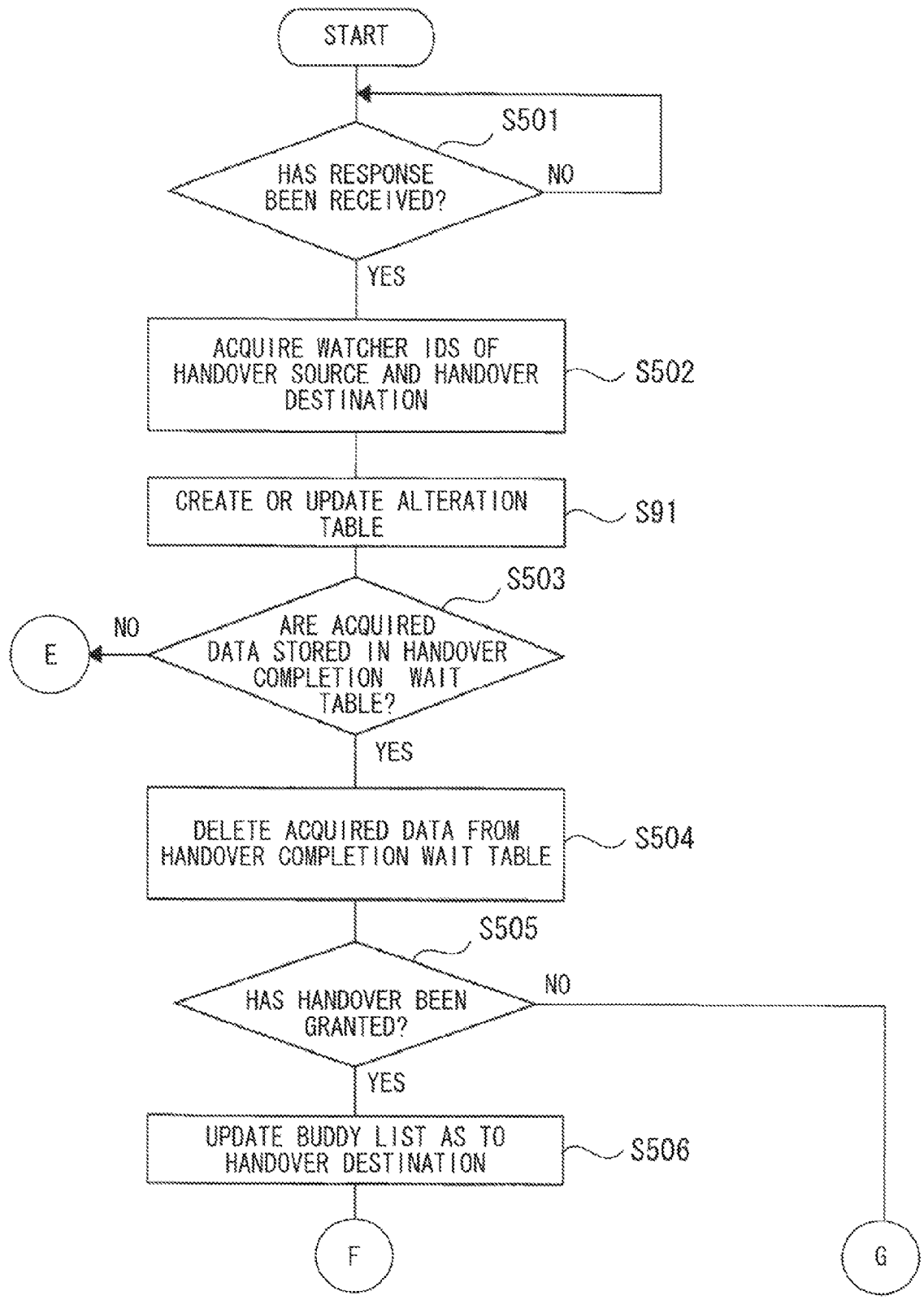
FIG. 35 depicts a processing procedure in which a control unit of a presence server device creates and updates an alteration propriety table in accordance with a response to an inquiry about an alteration propriety according to an example of an embodiment of the present invention.
Figure 36:
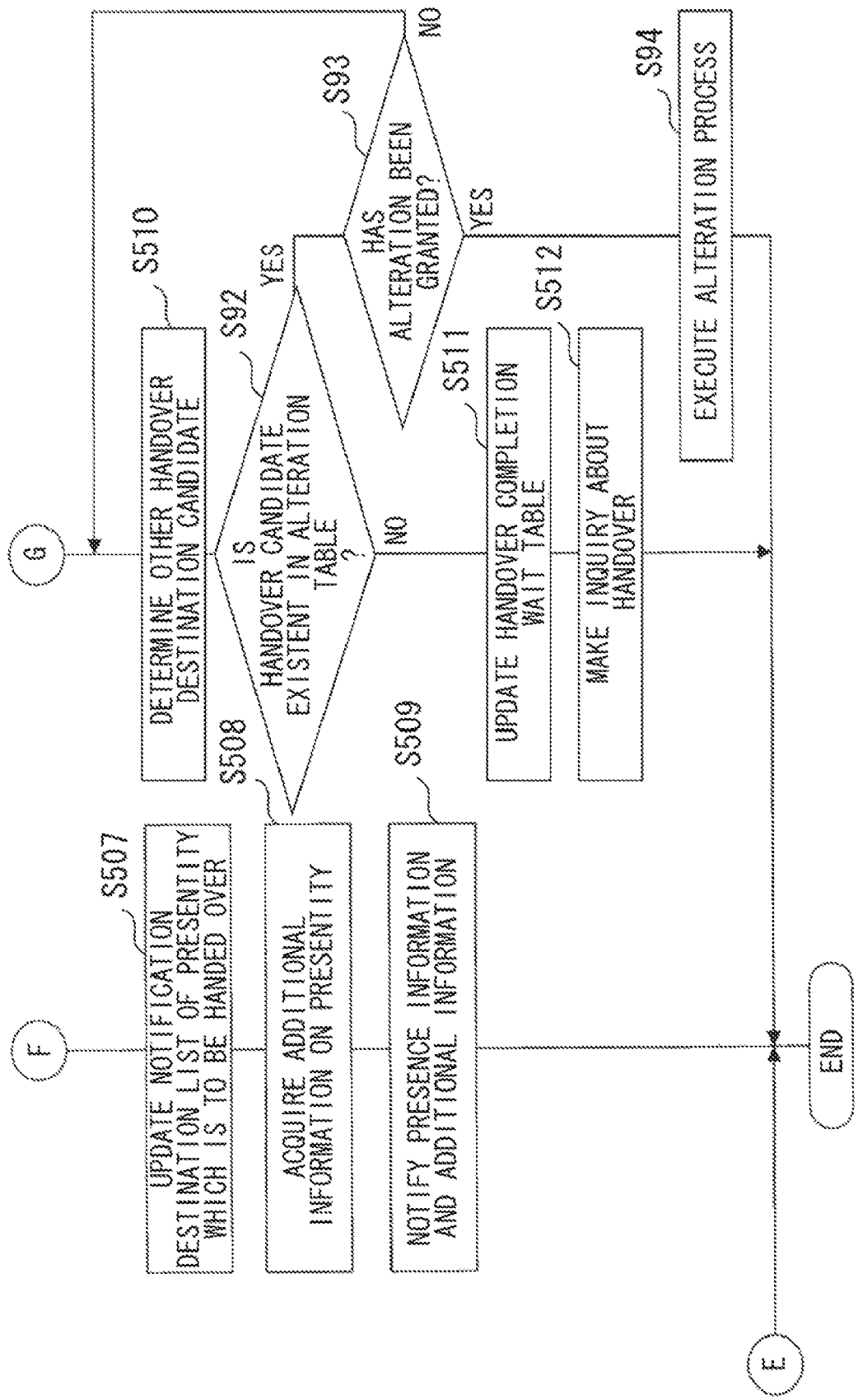
FIG. 36 depicts a processing procedure in which a control unit of a presence server device creates and updates an alteration propriety table in accordance with the response to an inquiry about the alteration propriety according to an example of an embodiment of the present invention.

FIGS. 35 and 36 depict a processing procedure in which the control unit 10 of the presence server device 1 creates and updates an alteration propriety table in accordance with a response to an inquiry about an alteration propriety.

By the way, in the processing procedure shown in the flow charts of FIGS. 35 and 36, processing steps common to those in the case where the response to the inquiry about the alteration propriety has been received as shown in the flow chart of FIG. 22 are assigned the same step Nos. and shall be omitted from detailed description.

The control unit 10 judges that the response to the inquiry has been received (S501: YES), and it acquires the watcher ID of a handover source and the watcher ID of a handover destination candidate (S502). Thereafter, the control unit 10 creates the alteration propriety table for storing the watcher ID of the handover destination candidate to-be-granted or the watcher ID of the handover destination candidate to-be-rejected, or updates the alteration propriety table already stored, by adding the watcher ID into this table, on the basis of the content of the response (step S91).

Besides, in a case where the control unit 10 has judged that the content of the response to the inquiry is "rejection" (S505: NO), it determines another handover destination candidate (S510).

The control unit 10 judges whether or not the watcher ID of the determined handover destination candidate exists in the alteration propriety table as to a presentity ID which corresponds to the presence terminal device 2 having transmitted the response to the inquiry (step S92).

Subject to the judgment that the watcher ID does not exist in the alteration propriety table (S92: NO), the control unit 10 needs to make an inquiry about the alteration propriety, and hence, it updates a handover completion wait table and executes an inquiry process (S511 and S512). Thereafter, the control unit 10 ends the process in the case where the response has been received.

Subject to the judgment that the watcher ID exists in the alteration propriety table (S92: YES), the control unit 10 judges whether or not the alteration has been granted, depending upon whether or not the watcher ID is stored as an alteration grant watcher ID (step S93).

In a case where the control unit 10 has judged that the alteration has been rejected (S93: NO), it returns the processing to the step S510 and determines another handover destination candidate, and it advances the processing.

In a case where the control unit 10 has judged at the step S93, that the alteration has been granted (S93: YES), it executes an alteration process by updating a buddy list and a notification destination list (step S94). Thereafter, the control unit 10 ends the process in the case where the response has been received.

At the step S94, the control unit 10 may well notify presence information to that one of the watcher terminal devices 3a, 3b, 3c, 3d, . . . which the watcher of the granted notification destination uses.

Owing to the processing procedures shown in the flow charts of FIGS. 33 through 36, it is avoided to repeatedly execute the process of the inquiry about the alteration propriety of the notification destination to the same watcher, as to the presence terminal device 2 of the same presentity.

Accordingly, the troublesomeness of the manipulation of a care-receiver being the presentity is relieved.

In this manner, according to the care support system in Embodiment 1, even when a helper having subscribed to presence information on the care-receiver of whom the helper is in charge has fallen into a state where he/she cannot accept the notification of the presence information, the presence information of the care-receiver (presentity) is reliably notified to any other service provider (watcher) such as a helper or a manager, without fail.

Whether or not the alteration is required is automatically decided in accordance with the state of the service provider (watcher). Further, the alteration process can be automatically executed without the necessity that the service provider (watcher) designates the watcher of a handover destination and then makes an alteration request.

Besides, before the alteration to the watcher who is the handover destination determined automatically, the inquiry process is executed to the presentity, whereby the notification of the presence information to any watcher not intended by the presentity is avoided, and the appropriate handover of the presence information subscription can be realized.

In control unit 10 of the presence server device 1 has created or updated the alteration propriety table in the case where it has received the response to the inquiry about the alteration propriety.

However, this configuration is not restrictive, but an alteration propriety table may well be previously stored in the storage unit 11 by associating granted watcher IDs and rejected watcher IDs with respective presentity IDs.

Besides, in the case where the control unit 10 of the presence server device 1 has decided to require the alteration, on the basis of the presence information of the watcher, it has created and stored the handover completion wait table during the execution of the inquiry about the propriety of the alteration to the handover destination candidate.

However, it is not indispensable to store the handover completion wait table, but this table need not be stored in such a case where the inquiry process is not executed.

Owing to the storage of the handover completion wait table, however, the control unit 10 can recognize if the inquiry about the alteration propriety is being made as to any notification destination, before the completion of the inquiry.

In the case where the control unit 10 has received the response to the inquiry about the alteration propriety, it alters the notification destination, only when the response agrees with the set of the watcher ID and the presentity ID as stored in the handover completion wait table.

Thus, in such a case where the watcher of the watcher ID decided to require the alteration has reverted into the state in which he/she accepts the presence information, the actual alteration can be avoided when the notification destination should not be altered though the inquiry about the alteration propriety is being made.

By the way, in the case of the configuration in which the handover completion wait table is not stored, the notification destination may well be altered without executing any inquiry process to the presence terminal device 2 about the propriety of the alteration (handover) to the watcher determined as the handover destination candidate.

In a case where the head watcher of a handover destination candidate list is in the state in which he/she accepts the presence information, this watcher is altered to the next notification destination.

On this occasion, the alteration propriety table previously stored may well be referred to.

Thus, the presence information is reliably notified to any of the watcher terminal devices 3a, 3b, 3c, 3d, . . . , and any watcher can reliably accept and confirm the presence information.

The alteration conditions which are referred to in the case of deciding whether or not the alteration is required have been contents which correspond to state information items such as "present", "absent", "under a business trip" and "busy".

However, the invention is not restricted to these alteration conditions, but alteration conditions corresponding to positional information items may well be employed.

In this case, it is also allowed that each watcher is caused to carry a card using the RFID, or the like, and that the control unit 10 of the presence server device 1 acquires the positional information so as to utilize the existence or nonexistence of the watcher within a desired range, as the alteration condition.

The alteration conditions can be set in accordance with the contents of the presence information items of the watchers.

An example follows for a case where an information communication system is applied to an operation situation management system (e.g. facility management system) for reliably managing the operation situations of the facilities of a factory.

Figure 37:
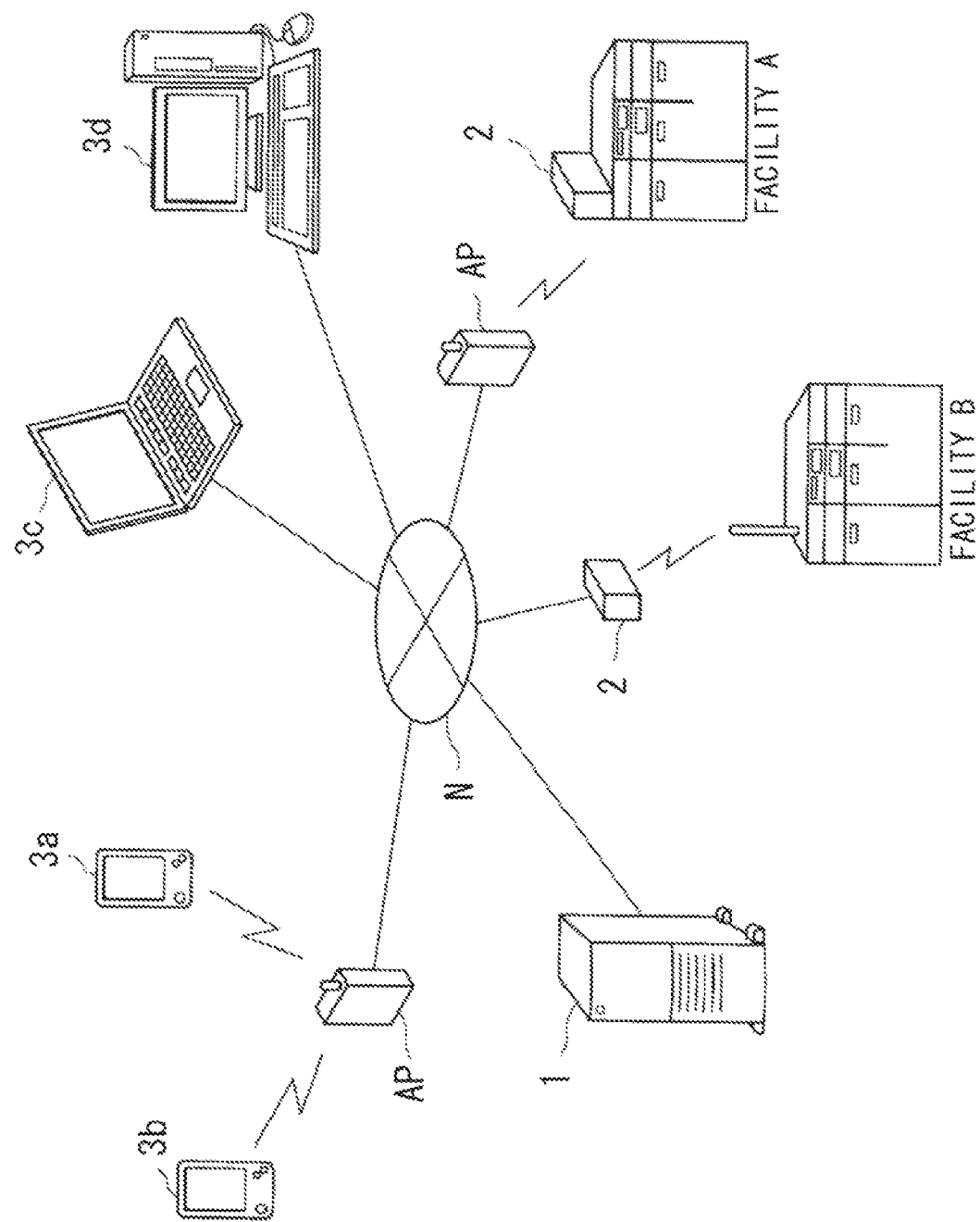
FIG. 37 depicts a configuration of an operation situation management system according to an example of an embodiment of the present invention.

FIG. 37 depicts a configuration of another operation situation management system The operation situation management system configures a presence system by including a presence server device 1 which is connected to a network N such as a LAN within the factory, presence terminal devices 2, 2, . . . , and a plurality of watcher terminal devices 3a, 3b, . . . .

The operation situation management system in FIG. 37 is utilized for the monitoring of the facilities and the maintenance of the respective facilities by the maintenance operators of these facilities of the factory. Watchers in the operation situation management system in FIG. 2 are the maintenance operators. Also in FIG. 2, watcher IDs "user1", "user2", "user3" and "user4" are respectively allocated to the watchers. The respective watchers use the watcher terminal devices 3a, 3b, 3c and 3d.

Besides, presentities in the operation situation management system in FIG. 2 are the facilities whose operation situations are to be watched. The presentity IDs of the respective facilities are "machineA", "machineB", "machineC" "machineD", . . . . In FIG. 37, the watchers are also presentities in the detect that processes are executed in accordance with the presence information items of the maintenance operators being the watchers, and the presentity information items of the watchers are published from the watcher terminal devices 3a, 3b, 3c and 3d to the presence server device 1.

The configuration of the operation situation management system as the presence system which includes the presence server device 1, the presence terminal devices 2, 2, . . . , the watcher terminal devices 3a, 3b, 3c, 3d, . . . and the network N is similar to that of the care support system.

In the operation situation management system, however, the presentities are the facilities as stated above.

Accordingly, the facilities cannot register and publish the presence information items by using the presence terminal devices 2, 2, . . . by themselves.

Each of the presence terminal devices 2, 2, . . . is a computer device which utilizes a temperature sensor, an infrared radiation sensor, etc., and which detects the temperature of a specified place within the facility, and the existence or nonexistence and movement of an object so as to automatically register the presence information in accordance with the detected temperature and the detected existence or nonexistence and movement of the object.

By way of example, the presence terminal device 2 disposed for the facility A utilizes the temperature sensor which measures the temperature of the cooling water of the facility A. In a case where the temperature measured by the temperature sensor is a predetermined value or above, the presence terminal device 2 publishes the presence information for reporting this situation, to the presence server device 1.

Besides, each of the presence terminal devices 2, 2, . . . may well have the function of publishing the presence information for making a request for the maintenance of the facility, in a case where various information items detected by utilizing the sensors have fulfilled one or more conditions.

Besides, in the operation situation management system, the presence information of each individual facility is not notified to the watcher terminal devices 3a, 3b, 3c, 3d, . . . which are used by all the maintenance operators, but it is notified to any of the watcher terminal devices 3a, 3b, 3c, 3d, . . . as used by the maintenance operator in charge of the corresponding facility.

In the operation situation management system, however, the job of a subscription request by the maintenance operator being the watcher is not performed because each presentity is the facility.

The presence information items are notified to the watcher terminal devices 3a, 3b, 3c, 3d, . . . which are used by the individual watchers (granted watchers) who have been put in charges of the respective presentities beforehand.

In this manner, the operation situations (circumstances, abnormality/normality information items, and maintenance requests) of the individual facilities are notified to the maintenance operators in charges of the respective facilities, and the operation situation management system capable of notifying the circumstances in individual devices in real time can be realized.

In addition, also in the operation situation management system, the situations of the individual facilities being the presentities are to be always grasped by any of the maintenance operators, in the same manner as in the care support system.

Accordingly, the presence information of each facility is to be reliably notified to any of the watcher terminal devices 3a, 3b, 3c and 3d.

Therefore, the information communication system is applied also to the operation situation management system.

Thus, in a case, for example, where the state of the watcher terminal device 3a which is used by the maintenance operator in charge of the facility A has changed from a state in which the maintenance operator could accept the notification of the presence information, into a state in which he/she cannot accept the notification of the presence information, for such a reason that the pertinent maintenance operator in charge begins the maintenance job another of the facilities, the presence server device 1 executes a process in which the notification destination of the presence information is altered to any of the watcher terminal devices 3b, 3c, 3d, . . . as used by the other maintenance operator, so as to be appropriately handed over.

The details of a configuration and the process for realizing the appropriate handover of the notification destination among the watcher terminals 3a, 3b, 3c, 3d, . . . be described below.

Figure 38:
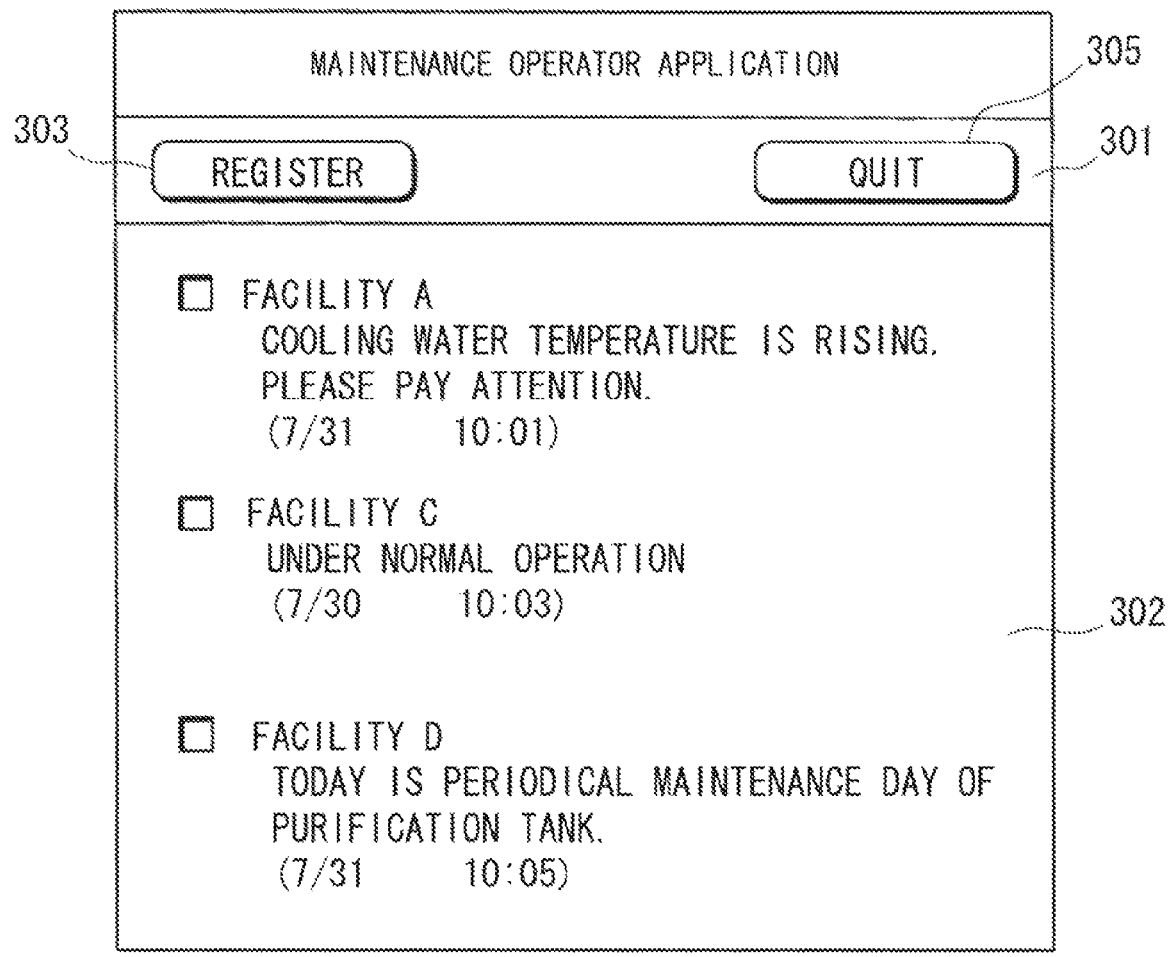
FIG. 38 depicts a screen example which is displayed through a display unit of each of multiple watcher terminal devices according to an example of an embodiment of the present invention.

FIG. 38 depicts a screen example which is displayed through the display unit 35 of each of the watcher terminal devices 3a, 3b, 3c, 3d, . . . .

The screen example shown in the explanatory diagram of FIG. 38 is displayed in such a way that the control unit 30 of each of the watcher terminal devices 3a, 3b, 3c, 3d, . . . loads and runs a presence application program for the maintenance operators as stored in the storage unit 31 of each watcher terminal device.

The form of the screen example shown in the explanatory diagram of FIG. 38 is the same as that of the screen example shown in the explanatory diagram of FIG. 3.

In the screen example in FIG. 38, there are displayed the newest presence information items which express the operation situations of the "facility A" having the presentity ID "machineA", the "facility C" having the presentity ID "machineC", and the "facility D" having the presentity ID "machineD".

A "register" button 303 in the screen example in FIG. 38 is a button which is used when the maintenance operator being the watcher registers his/her presence information.

The maintenance operator can set his/her state information such as "under patrol", "under inspection", "at work" or "holiday", by manipulating the mouse or the like of the input unit 33 of each watcher terminal device and pressing the "register" button 303, thereby to publish the state information as the presence information of the watcher.

Besides, each of the watcher terminal devices 3a, 3b, 3c, 3d, . . . registers message information corresponding to the presentity to-be-watched, in a case where the maintenance operator falls into a state in which he/she cannot accept the notification of the presence information (for example, "at work" or "holiday"), when he/she registers his/her state or after he/she has registered his/her state.

The registration of the message information will now be described more concretely.

In a screen displayed in the case where the "register" button 303 has been pressed, the watcher terminal device displays radio buttons which correspond to the respective choices of the state information, an edit box with which the message information can be inputted every presentity, and the "register" button with which the control unit 30 is instructed to execute a transmission process.

In a case where the control unit 30 of the watcher terminal device has detected the press of the "register" button 303 through the input unit 33, it transmits the set state information (presence information) to the presence server device 1.

In a case where the message information has been registered, the control unit 30 transmits the registered message information to the presence server device 1.

In a case where the presence information transmitted from any of the watcher terminal devices 3a, 3b, 3c, 3d, . . . has been received, the control unit 10 of the presence server device 1 stores the presence information in association with the watcher ID of the pertinent watcher terminal device.

Besides, in a case where the message information has been received, the control unit 10 stores this message information in the temporary storage area 12 of the presence server device 1 together with the presentity ID of the corresponding presentity.

Next, there will be described a buddy list and a notification destination list which are stored in the storage unit 11 of the presence server device 1.

In the operation situation management system (e.g. facility management system), a process for a propriety concerning a request for a subscription to the presence information is not executed.

Accordingly, the buddy list and the notification destination list are created beforehand in accordance with the arrangement of the facilities and the arrangement of the operators in charges in the factory, and they are stored in the storage unit 11 of the presence server device 1.

FIGS. 39A and 39B are explanatory diagrams showing content examples of a buddy list and a notification destination list which are stored in the storage unit 11 of the presence server device 1, respectively.

FIG. 39A shows the content example of the buddy list, while FIG. 39B shows the content example of the notification destination list.

In the example of the buddy list shown in the explanatory diagram of FIG. 39A, it is indicated that the watcher of watcher ID "user1" subscribes to the presence information items of the presentity IDs "machineA", "machineC" and "machineD".

It is indicated that the watcher of watcher ID "user2" subscribes to the presence information of the presentity ID "machineB".

Further, in the content example of the buddy list shown in the explanatory diagram of FIG. 39A, any of the watchers does not hand over the notification destination from the other watcher.

In the example of the notification destination list shown in the explanatory diagram of FIG. 39B, it is indicated that the maintenance operator (watcher) of the watcher ID "user1" is set as the notification destination, for the newest presence information of the "facility A" associated with the presentity ID "machineA", in correspondence with the buddy list in FIG. 39A.

Likewise, it is indicated that the watcher of the watcher ID "user2" is set as the notification destination, for the newest presence information of the "facility B" associated with the presentity ID "machineB".

It is indicated that the watcher of the watcher ID "user1" is set as the notification destination, for the newest presence information of the "facility C" associated with the presentity ID "machineC".

It is indicated that the watcher of the watcher ID "user1" is set as the notification destination, for the newest presence information of the "facility D" associated with the presentity ID "machineD".

Further, in the content example of the notification destination list shown in the explanatory diagram of FIG. 39B, any of the notification destinations of the presence information items is not handed over.

Also in the operation situation management system in, the control unit 10 of the presence server device 1 decides whether or not an alteration is required, by comparing the presence information of each watcher with an alteration condition.

Besides, in a case where the control unit 10 of the presence server device 1 has decided that the alteration is required, it handles a charge assignment table which indicates the operators in-charges to whom notifications have been granted beforehand, as an alteration propriety table, without executing an inquiry process, and it determines a handover destination candidate on the basis of the charge assignment table and executes an alteration process.

FIGS. 40A and 40B are explanatory diagrams showing content examples of alteration conditions and a charge assignment table which are stored in the storage unit 11 of the presence server device 1, respectively.

FIG. 40A shows the content examples of the alteration conditions, while FIG. 40B shows the content example of the charge assignment table (alteration propriety table).

The explanatory diagram of FIG. 40A indicates that, for the presence information whose notification destination is the watcher of the watcher ID "user1", the notification destination is to be altered in a case where the presence information of the watcher is "at work" or "holiday".

Likewise, it is indicated that, for the presence information whose notification destination is the watcher of the watcher ID "user2", the notification destination is to be altered in a case where the presence information of the watcher is "at work".

As shown in the explanatory diagram of FIG. 40B, in the charge assignment table, the watcher IDs of the operators in charges, that is, the watcher IDs of the watchers to whom the notifications of the presence information items are granted are stored in association with the presentity IDs of the respective facilities.

In the example shown in the explanatory diagram of FIG. 40B, it is indicated that, as to the presence information of the presentity ID "machineA", the notifications to the watcher terminal devices 3a, 3b and 3d which are respectively used by the watchers of the watcher IDs "user1", "user2" and "user4" are granted.

Likewise, it is indicated that, as to the presence information of the presentity ID "machineB", the notification to the watcher terminal device 3b which is used by the watcher of the watcher ID "user2" is granted.

The control unit 10 of the presence server device 1 notifies the presence information published from each of the presence terminal devices 2, 2, . . . to any of the watcher terminal devices 3a, 3b, 3c, 3d, . . . by referring to the buddy list and the notification destination list respectively shown in FIGS. 39A and 39B.

In addition, also in the operation situation management system, the control unit 10 of the presence server device 1 decides whether or not the alteration of a notification destination is required, by comparing the presence information of the watcher as published from any of the watcher terminal devices 3a, 3b, 3c, 3d, . . . and the alteration condition indicated in the explanatory diagram of FIG. 40A. In a case where the alteration is required, the control unit 10 executes a process for altering the notification destination.

Further, in altering the notification destination, the control unit 10 of the presence server device 1 determines a handover destination on the basis of the charge assignment table which is shown in the explanatory diagram of FIG. 40B, and which corresponds to the alteration propriety table.

Figure 41:
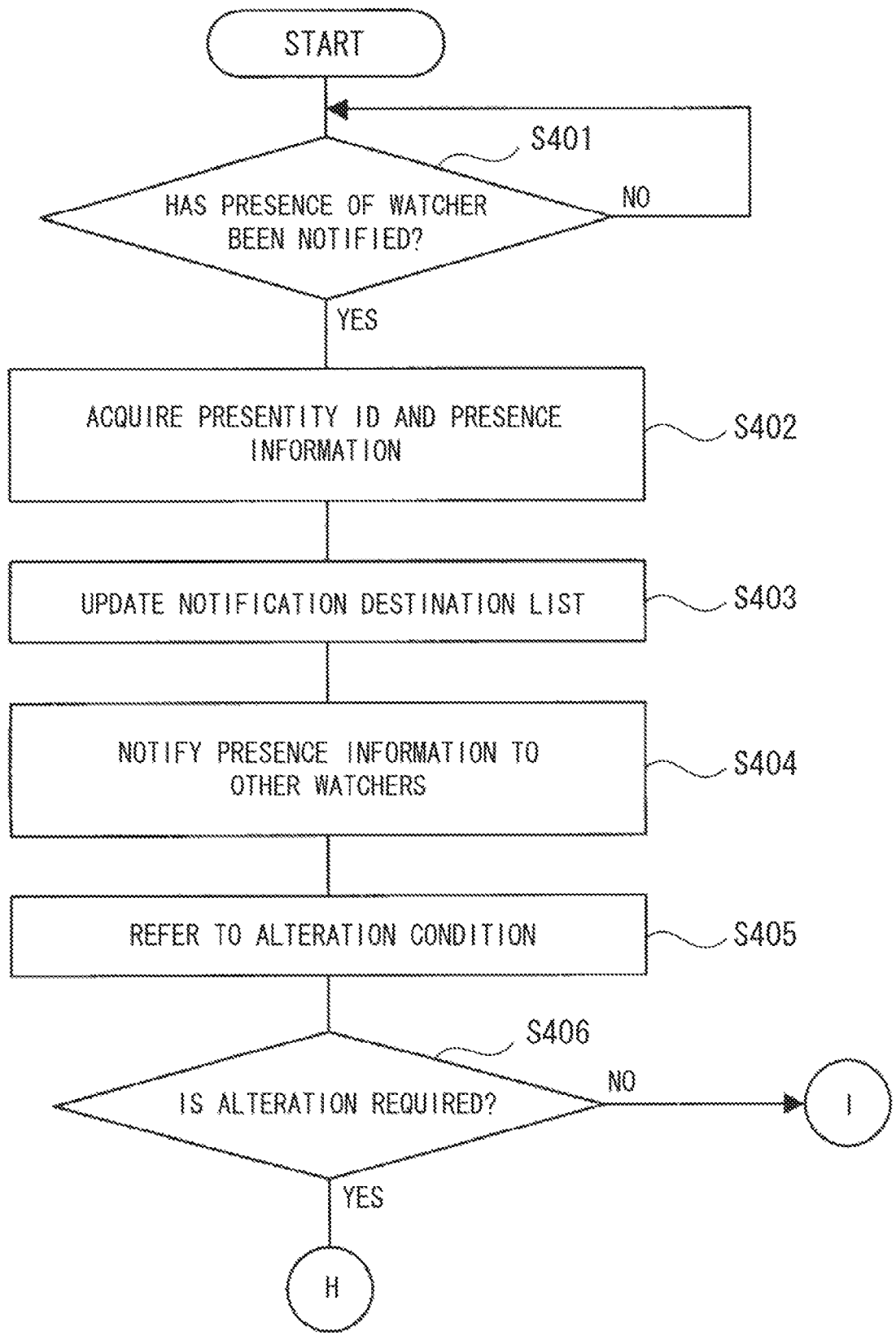
FIG. 41 depicts a processing procedure in which a control unit of a presence server device determines a handover destination candidate on the basis of a charge assignment table, according to an example of an embodiment of the present invention.
Figure 42:
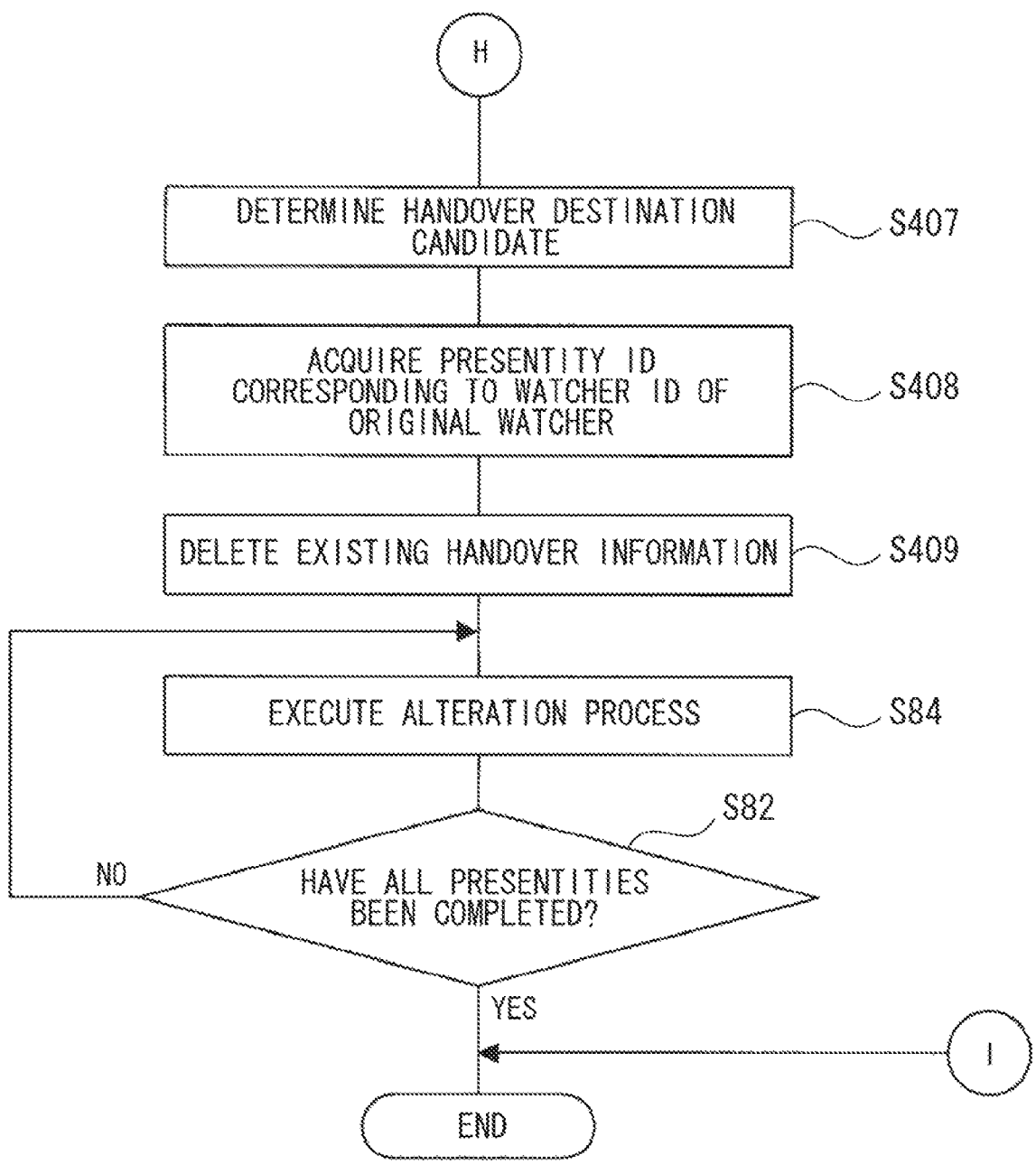
FIG. 42 depicts a processing procedure in which a control unit of a presence server device determines a handover destination candidate on the basis of a charge assignment table, according to an example of an embodiment of the present invention.

FIGS. 41 and 42 are flow charts showing an example of a processing procedure in which the control unit 10 of the presence server device 1 in Embodiment 2 determines a handover destination candidate on the basis of a charge assignment table.

By the way, in the processing procedure shown in the flow charts of FIGS. 41 and 42, processing steps common to those shown in the flow charts of FIGS. 33 and 34 are assigned the same step Nos. and shall be omitted from detailed description.

The control unit 10 refers to an alteration condition indicated in the explanatory diagram of FIG. 40A, as to the presence information of each watcher (S405), and it decides whether or not the alteration of a notification destination is required (S406).

Subject to the decision that the alteration is required (S406: YES), the control unit 10 determines the handover destination candidate on the basis of the charge assignment table (alteration propriety table) (S407).

Concretely, the control unit 10 determines the handover destination candidate as described below.

The control unit 10 acquires the presentity ID of the presence information to which the watcher decided to require the alteration is subscribing, by referring to a buddy list.

The control unit 10 refers to the charge assignment table and reads out watcher IDs stored as the operators in-charges (granted watchers) of the presentity ID acquired from the buddy list, in the order of a list. Besides, the control unit 10 reads out the watcher ID stored at the highest level except the original watcher decided to require the alteration.

In a case where a state indicated by the presence information is not a state decided to require the alteration, with reference to the presence information of the read-out watcher ID and in the light of the alteration condition, the watcher of the read-out watcher ID is determined as the handover destination candidate.

Subsequently, the control unit 10 acquires the presentity ID of the presence information whose notification destination is the original watcher decided to require the alteration, by referring to the buddy list and a notification destination list (S408).

In addition, the control unit 10 deletes existing handover information which relates to the original watcher decided to require the alteration (S409).

Besides, the control unit 10 executes an alteration process for actually altering the notification destination to the next handover destination candidate determined with reference to the charge assignment table (S84). Further, the control unit 10 judges whether or not alterations have been completed for all the presentities of the presence information whose notification destination had been the watcher decided to require the alteration (S82).

Subject to the judgment that the alterations have not been completed for all the presentities (S82: NO), the control unit 10 returns the processing to the step S84 and executes the alteration process as to the next presentity (S84).

Subject to the judgment that the alterations have been completed for all the presentities (S82: YES), the control unit 10 ends the process for deciding whether or not the alteration is required, and the process for determining the handover destination candidate, as based on the alteration conditions and the charge assignment table.

FIGS. 43A and 43B are explanatory diagrams showing content examples in the cases where a buddy list and a notification destination list in the storage unit 11 of the presence server device 12 have been updated by the alterations of notification destinations, respectively.

FIG. 43A shows the content example generated after the buddy list shown in FIG. 39A has been updated, while FIG. 43B shows the content example generated after the notification destination list shown in FIG. 39B has been updated.

Incidentally, the content examples shown in the explanatory diagrams of FIGS. 43A and 43B illustrate examples of the buddy list and the notification destination list into which the buddy list and the notification destination list respectively shown in the explanatory diagrams of FIGS. 39A and 39B have been updated an alteration process executed in such a way that the watcher of watcher ID "user1" had begun a maintenance job and that he/she had registered his/her presence information "at work" in the watcher terminal device 3a.

In a case where the presence information of the watcher of the watcher ID "user1" has become "at work", the control unit 10 of the presence server device 1 decides that the notification destinations of the presence information items of presentity IDs "machineA", "machineC" and "machineD" whose notification destinations are the pertinent watcher are to be altered.

As a handover destination candidate concerning the presence information of the presentity ID "machineA", a watcher ID "user2" stored next to the watcher ID "user1" is determined on the basis of the charge assignment table shown in FIG. 40B.

In addition, as shown in the explanatory diagram of FIG. 43A, "machineA" is added as the presentity ID of presence information to which the watcher ID "user2" subscribes, by an alteration process based on the control unit 10.

Regarding the entry of the presentity ID "machineA" of the watcher ID "user2", the "existence of handover" is stored in association so as to become "yes".

The buddy list shown in the explanatory diagram of FIG. 43A indicates that the subscription to the presence information of the presentity ID "machineA" by the watcher of the watcher ID "user2" has handed over a notification destination from any watcher.

Besides, as shown in the explanatory diagram of FIG. 43B, in the notification destination list of the presentity ID "machineA", the watcher ID "user2" of the watcher being a handover destination is stored in addition to the watcher ID "user1" of the watcher being a handover source.

In addition, the watcher ID "user1" is associated with the watcher ID "user2" of the watcher being the handover source, as the handover source watcher ID.

Likewise, as to the presentity IDs "machineC" and "machineD" whose notification destinations were the watcher ID "user1", the notification destination is added, and the handover source watcher ID "user1" is associated.

In notifying the presence information of the presentity ID "machineA", the control unit 10 can recognize that the watcher of the watcher ID "user2" is handing over the notification destination, by referring to the notification destination list of the content example shown in the explanatory diagram of FIG. 43B.

The control unit 10 executes the alteration process as stated above, and in notifying the presence information to the watcher terminal device 3b of the handover destination for the first time, the control unit 10 also notifies the message information stored in the temporary storage area 12 in association with the pertinent presentity, by handling this message information similarly to additional information.

Figure 44:
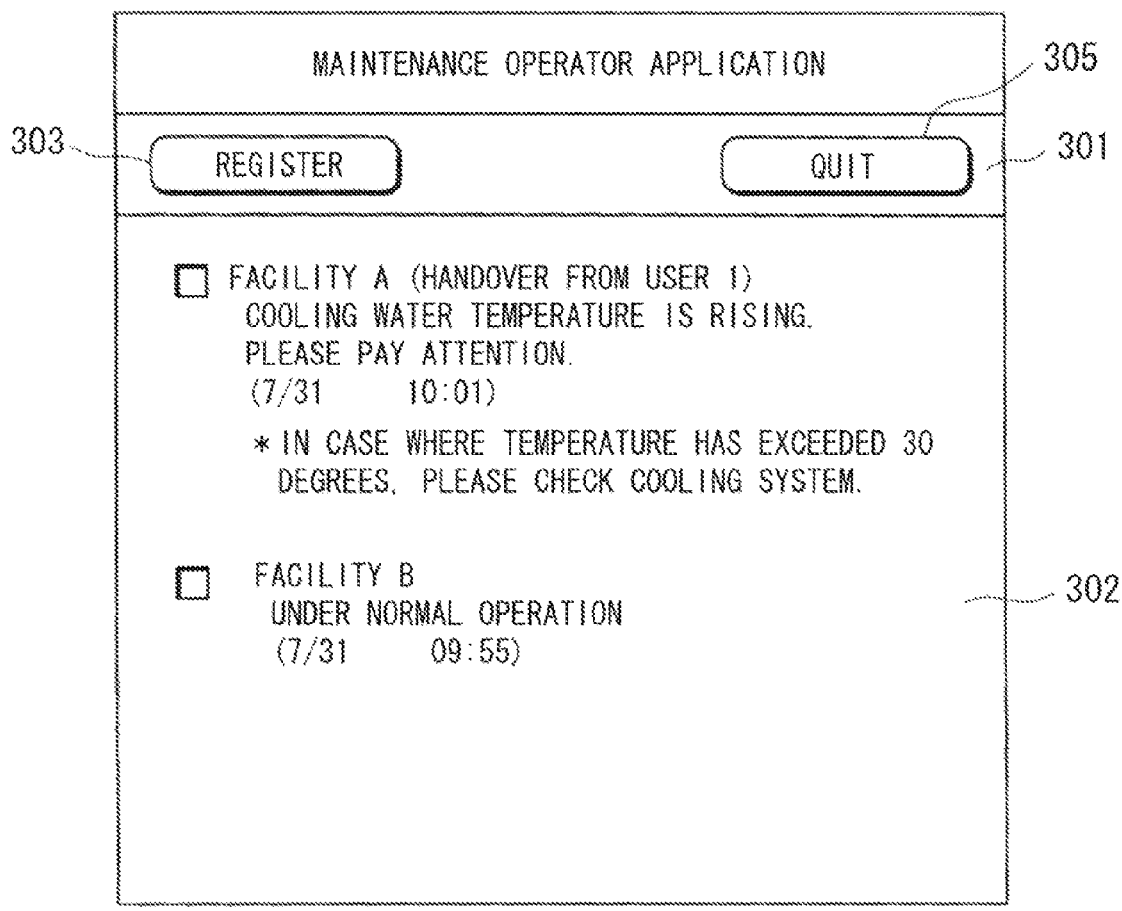
FIG. 44 depicts a screen example which is displayed through a display unit of a watcher terminal device being a handover destination, according to an example of an embodiment of the present invention.

FIG. 44 depicts a screen example which is displayed through the display unit 35 of the watcher terminal device 3b being a handover destination.

In a case where the control unit 30 of each of the watcher terminal devices 3a, 3b, 3c, 3d, . . . has received message information notified together with presence information, it displays the message information through the display unit 35.

In the screen example in FIG. 44, it is indicated that the message information from the original watcher of a presentity "facility A" is displayed in a presence information display area 302, together with the presence information of the presentity "facility A".

Thus, a maintenance operator being a watcher who uses the watcher terminal device 3b of a handover destination can know the past information and disposal method of the device to-be-watched handed over, in detail, and he/she can grasp the situation of the presentity more accurately.

In this manner, in the case of the configuration in which the information communication system is applied to the operation situation management system for monitoring the individual facilities in the factory, whereby the situation of each of the facilities is automatically notified to the maintenance operator in charge, not to all the maintenance operators; even when the maintenance operator in charge has fallen into the state where he/she cannot accept the notification, the notification destination is automatically altered, and any of the other maintenance operators can reliably hand over the notification, thereby to monitor the situation.

As described above, the example in which the information communication system is applied to the care support system, and the example in which it is applied to the operation situation management system has been illustrated in Embodiment 2.

The information communication system disclosed herein is not restricted to the examples, but it is also applicable to systems such as an alarm system in which the states of devices to-be-watched are reliably watched.

Besides, the information communication system is applicable to job status management systems (i.e. job state management system) and various alarm systems in dangerous places which need to be watched at all times.

Also in these cases, when the presentities are "things", they are difficult to respond to the inquiries about the proprieties of subscriptions and the proprieties of alterations. Therefore, the notification destinations have been determined on the basis of the alteration propriety table.

On this occasion, however, the information communication system can be applied by a configuration in which the inquiries about handovers concerning the individual presentities are collectively transmitted to a manger.

In this manner, excellent advantages are brought forth in the respective systems by applying the information communication system.

Whether or not the alteration of the notification destination is required is decided in accordance with the state of the granted notification destination, and the next notification destination is automatically determined.

Accordingly, any alteration request accompanying the designation of the next notification destination is unnecessary.

The notification destination is altered to the external device (second terminal device) which accepts the notification, in accordance with the state of the notification destination. Therefore, the appropriate handover of the notification destination of the presence information is permitted, and the presence information is reliably notified to any terminal device.

Incidentally, it is also allowed to simultaneously execute a process in which an alteration request is accepted irrespective of the state of the notification destination, and in which the notification destination is altered in compliance with the alteration request.

In determining the next notification destination, a next notification destination candidate is extracted, and an inquiry about the propriety of an alteration concerning the notification destination candidate is made to the notification source.

Only in a case where the reply that the alteration is proper is sent from the notification source, the notification destination candidate as to which the alteration has been decided to be proper is altered as the next notification destination. Therefore, the notification of the presence information to any notification destination not intended by the notification source is avoided, and the reliable and appropriate handover of the notification destination of the presence information is permitted.

The inquiry about the propriety of the alteration concerning the next notification destination candidate is made to the notification source, and in a case where the reply that the alteration is improper has been sent from the notification source, an inquiry concerning another notification destination candidate is made anew.

Thus, the notification of the presence information to any notification destination not intended by the notification source is avoided, and the reliable and appropriate handover of the notification destination of the presence information is permitted.

It can be recognized that the notification destination after the alteration has handed over the other notification destination of the presence information. Further, since the notification destination before the alteration is associated, the notification destination before the alteration can be recognized.

Thus, in a case where the notification destination before the alteration has fallen into a state in which it accepts the presence information, the notification destination can be restored to the original one, and the reliable and appropriate handover of the notification destination of the presence information is permitted.

In a case where the notification destination before the alteration is in a state in which it is decided not to require the alteration, the notification destination is restored to the original one. It is therefore avoided that the notification destination before the alteration is restored to the original notification destination though the former notification destination is still in the state in which it does not accept the presence information, so that the reliable and appropriate handover of the notification destination of the presence information is permitted.

An inquiry concerning the notification destination candidate as to which the inquiry about the alteration propriety has been once replied is not repeatedly made. Therefore, processing in the notification source is relieved, and the efficient, reliable and appropriate handover of the notification destination of the presence information is permitted.

At least one embodiment of the present invention may also be embodied as computer readable data including executable instructions that are recorded on a computer readable recording medium. The computer readable recording medium is any data storage device that can store the data, including the executable instructions, and which can be read by a computer system so as to provide the computer system with the executable instructions included in the recorded data for execution. Examples of the computer readable recording medium include read-only memory (ROM), random-access memory (RAM), CD-ROMs, magnetic tapes, floppy disks, optical data storage devices, etc. The computer readable recording medium may also be distributed over network coupled computer systems so that the computer readable code is stored and executed in a distributed fashion.

Examples of embodiments of the present invention have been disclosed herein, and although specific terms are employed, they are used and are to be interpreted in a generic and descriptive detect only and not for purpose of limitation. Accordingly, it will be understood by those of ordinary skill in the art that various changes in form and details may be made therein without departing from the spirit and scope of the present invention as set forth in the claims.

The invention claimed is:

1. An information communication apparatus comprising:
a control unit configured to execute processing and a communication unit configured to connect to a network,
the control unit performs operations including:
an acceptance operation to accept first presence information that has been transmitted from a first terminal device connected to be communicable through a network;
an acquisition operation to acquire a notification destination to which the first presence information is destined and to map the notification destination to a transmission source of the first presence information, the notification destination corresponding to a second terminal device;
a decision operation to decide whether or not an alteration of the notification destination is required according to a state of the notification destination as indicated by second presence information accepted from the second terminal device;
a selection operation to select, if alteration is required, a third terminal device to succeed the second terminal device;
an alteration operation to alter the notification destination to reflect the third terminal device; and
a notification operation to notify the first presence information to the third terminal device corresponding to the altered notification destination;
wherein the selection operation comprises:
a detection operation to detect at least one next notification destination candidate, from among the terminal devices that can accept the publication of the presence information; and
an inquiry operation which transmits an inquiry message to the terminal device being the notification source of the presence information, about a propriety of the alteration to a next notification destination candidate detected by the detection operation;
wherein the selection operation selects the notification destination candidate as to which a response to the inquiry of the inquiry operation, from the terminal device being the notification source, indicates that the alteration is proper, as a next notification destination; and
wherein in a case where the response to the inquiry of the inquiry operation, from the notification source, indicates that the alteration is improper, another notification destination candidate is detected by the detection operation, and an inquiry is made again by the inquiry operation, about a propriety of the alteration to the detected other notification destination candidate.

2. An information communication apparatus comprising:
a control unit configured to execute processing and a communication unit configured to connect to a network,
the control unit performs operations including:
an acceptance operation to accept first presence information that has been transmitted from a first terminal device connected to be communicable through a network;
an acquisition operation to acquire a notification destination to which the first presence information is destined and to map the notification destination to a transmission source of the first presence information, the notification destination corresponding to a second terminal device;
a decision operation to decide whether or not an alteration of the notification destination is required according to a state of the notification destination as indicated by second presence information accepted from the second terminal device;
a selection operation to select, if alteration is required, a third terminal device to succeed the second terminal device;
an alteration operation to alter the notification destination to reflect the third terminal device; and
a notification operation to notify the first presence information to the third terminal device corresponding to the altered notification destination;
wherein the selection operation comprises:
a detection operation to detect at least one next notification destination candidate, from among the terminal devices that can accept the publication of the presence information;
an inquiry operation which transmits an inquiry message to the terminal device being the notification source of the presence information, about a propriety of the alteration to a next notification destination candidate detected by the detection operation;

wherein the selection operation selects the notification destination candidate as to which a response to the inquiry of the inquiry operation, from the terminal device being the notification source, indicates that the alteration is proper, as a next notification destination;

a candidate storage table which stores a new notification destination candidate that has been detected in association with the notification destination decided to require the alteration, in a case where the alteration decision operation has decided that the alteration is required; and a candidate deletion operation which deletes the notification destination candidate stored in association with the notification destination, in a case where the alteration decision operation has decided that the alteration is not required, on the basis of state information of the notification destination as acquired by the acquisition operation, before the response to the inquiry of the inquiry operation about the alteration propriety is accepted;

wherein the alteration operation does not alter the notification destination as to the notification destination for which the association with the notification destination candidate has been deleted.

3. An information communication apparatus comprising:
a control unit configured to execute processing and a communication unit configured to connect to a network, the control unit performs operations including:
an acceptance operation to accept first presence information that has been transmitted from a first terminal device connected to be communicable through a network;

an acquisition operation to acquire a notification destination to which the first presence information is destined and to map the notification destination to a transmission source of the first presence information, the notification destination corresponding to a second terminal device;

a decision operation to decide whether or not an alteration of the notification destination is required according to a state of the notification destination as indicated by second presence information accepted from the second terminal device;

a selection operation to select, if alteration is required, a third terminal device to succeed the second terminal device;

an alteration operation to alter the notification destination to reflect the third terminal device;

a notification operation to notify the first presence information to the third terminal device corresponding to the altered notification destination;

wherein the alteration operation comprises a notification destination storage table which stores information for identifying the notification destination after the alteration, in association with the information for identifying the notification destination of the presence information as registered in association with the information for identifying the transmission source of the presence information, in case of altering the notification destination; and a notification stop operation which stops the notification to the notification destination after the alteration, as based on the notification operation, in a case where the presence information has been acquired from the terminal device specified by the information for identifying the notification destination before the alteration, as stored in the notification destination storage table, and where the alteration decision operation has decided that the alteration is not required, on the basis of the acquired presence information;

wherein the alteration operation alters the notification destination of the accepted presence information to the notification destination before the alteration as stored in the notification destination storage table.

4. An information communication apparatus comprising:
a control unit configured to execute processing and a communication unit configured to connect to a network, the control unit performs operations including:
an acceptance operation to accept first presence information that has been transmitted from a first terminal device connected to be communicable through a network;

an acquisition operation to acquire a notification destination to which the first presence information is destined and to map the notification destination to a transmission source of the first presence information, the notification destination corresponding to a second terminal device;

a decision operation to decide whether or not an alteration of the notification destination is required according to a state of the notification destination as indicated by second presence information accepted from the second terminal device;

a selection operation to select, if alteration is required, a third terminal device to succeed the second terminal device;

an alteration operation to alter the notification destination to reflect the third terminal device;

a notification operation to notify the first presence information to the third terminal device corresponding to the altered notification destination;

wherein the selection operation comprises:
a detection operation to detect at least one next notification destination candidate, from among the terminal devices that can accept the publication of the presence information; and an inquiry operation which transmits an inquiry message to the terminal device being the notification source of the presence information, about a propriety of the alteration to a next notification destination candidate detected by the detection operation;

wherein the selection operation selects the notification destination candidate as to which a response to the inquiry of the inquiry operation, from the terminal device being the notification source, indicates that the alteration is proper, as a next notification destination; and a creation operation which creates and stores alteration propriety information indicating the external device that is granted or rejected as the notification destination, every notification source of the presence information, on the basis of a response to the inquiry of the inquiry operation, from the notification source about the alteration propriety;

wherein the alteration operation determines the external device which is granted as the notification destination, as a next notification destination on the basis of the alteration propriety information.

5. An information communication system comprising:
a first terminal device which publishes presence information;

second terminal devices which accept the notification of the presence information; and a central device which relays communications between the first and second terminal devices;

said central device including the following, an acceptance unit which accepts the notification of the presence information from said first terminal device;

a notification destination storage unit to store a listing as to which ones amongst the second terminal devices represent notification destinations according to the presence information;

an acquisition unit to acquire state information indicating states of the notification destinations stored in said notification destination storage unit;

a decision unit to decide whether or not alterations of notification destinations are required according to the state information, respectively;

an alteration unit to determine third terminal devices as successor notification destinations on the basis of the state information and then to alter the respective notification destinations to reflect the third terminal devices; and a notification unit to notify the presence information to the notification destinations after the alterations unit;

wherein the determination, by the alteration unit, of third terminal devices as successor notification destinations comprises:

a detection unit to detect at least one next notification destination candidate, from among the terminal devices that can accept the publication of the presence information; and an inquiry unit which transmits an inquiry message to the terminal device being the notification source of the presence information, about a propriety of the alteration to a next notification destination candidate detected by the detection operation;

wherein the determination by the alteration unit of the notification destination candidate as to which a response to the inquiry of the inquiry unit, from the terminal device being the notification source, indicates that the alteration is proper, as a next notification destination; and wherein in a case where the response to the inquiry of the inquiry operation, from the notification source, indicates that the alteration is improper, another notification destination candidate is detected by the detection unit, and an inquiry is made again by the inquiry unit, about a propriety of the alteration to the detected other notification destination candidate.

6. An information communication method for causing a computer connected to a network to execute operations, the method comprising:

accepting, by the computer, first presence information transmitted from a first terminal device which is connected to be communicable through a network;

specifying a second terminal device as a notification destination to which the first presence information is destined;

mapping the notification destination to a transmission source of the first presence information;

deciding whether or not an alteration of the notification destination is required according to a state of the notification destination as indicated by second presence information accepted from the second terminal device;

selecting, if alteration is required, a third terminal device to succeed the second terminal device; and notifying the first presence information to the third terminal device corresponding to the altered notification destination;

wherein the selecting comprises:

detecting at least one next notification destination candidate, from among the terminal devices that can accept the publication of the presence information; and transmitting an inquiry message to the terminal device being the notification source of the presence information, about a propriety of the alteration to a next notification destination candidate detected by the detection operation;

wherein the selecting selects the notification destination candidate as to which a response to the inquiry of the inquiry operation, from the terminal device being the notification source, indicates that the alteration is proper, as a next notification destination; and wherein in a case where the response to the inquiry of the inquiry message, from the notification source, indicates that the alteration is improper, another notification destination candidate is detected by the detecting, and an inquiry is made again by the inquiry operation, about a propriety of the alteration to the detected other notification destination candidate.

7. A non-transitory machine-readable medium comprising machine-executable instructions for performing a method, execution of which by a machine facilitates operation of an information communication apparatus, the method comprising:

accepting first presence information transmitted from a first terminal device which is connected to be communicable through a network;

specifying a second terminal device as a notification destination to which the first presence information is destined;

mapping the notification destination to a transmission source of the first presence information;

deciding whether or not an alteration of the notification destination is required according to a state of the notification destination as indicated by second presence information accepted from the second terminal device;

selecting, if alteration is required, a third terminal device to succeed the second terminal device; and notifying the first presence information to the third terminal device corresponding to the altered notification destination;

wherein the selecting comprises:

detecting at least one next notification destination candidate, from among the terminal devices that can accept the publication of the presence information; and transmitting an inquiry message to the terminal device being the notification source of the presence information, about a propriety of the alteration to a next notification destination candidate detected by the detection operation;

wherein the selecting selects the notification destination candidate as to which a response to the inquiry of the inquiry operation, from the terminal device being the notification source, indicates that the alteration is proper, as a next notification destination; and wherein in a case where the response to the inquiry of the inquiry message, from the notification source, indicates that the alteration is improper, another notification destination candidate is detected by the detecting, and an inquiry is made again by the inquiry operation, about a propriety of the alteration to the detected other notification destination candidate.

* * * * *